(12) United States Patent
King et al.

(10) Patent No.: US 12,719,767 B1
(45) Date of Patent: Aug. 25, 2026

(54) TELECOMMUNICATIONS SIGNALING GOVERNANCE SYSTEM AND METHOD FOR INTERCONNECT-AWARE SESSION CONTROL

(71) Applicant: FoneTech Connect, LLC, Peachtree Corners, GA (US)

(72) Inventors: David Alan King, Peachtree Corners, GA (US); Linda Lorimer King, Peachtree Corners, GA (US); Nathan Jess Nelson, Peachtree Corners, GA (US)

(73) Assignee: FoneTech Connect, LLC, Peachtree Corners, GA (US)

(*) Notice: Subject to any disclaimer, the term of this patent is extended or adjusted under 35 U.S.C. 154(b) by 0 days.

(21) Appl. No.: 19/634,155

(22) Filed: Mar. 31, 2026

Related U.S. Application Data

(63) Continuation-in-part of application No. 19/351,902, filed on Oct. 7, 2025, now Pat. No. 12,615,334.

(Continued)

(51) Int. Cl.
*H04M 15/08* (2006.01)
*H04L 41/5003* (2022.01)

(Continued)

(52) U.S. Cl.
CPC ................................ *H04L 41/5003* (2013.01)

(58) Field of Classification Search
None
See application file for complete search history.

(56) References Cited

U.S. PATENT DOCUMENTS 7,145,898 B1 * 12/2006 Elliott ..................... H04L 12/66 379/900
2016/0127808 A1 * 5/2016 Wong ................ G06F 16/24573 379/112.04

(Continued)

OTHER PUBLICATIONS

"Stuart Jacobs, "Overview of Current and Future Networks," in Security Management of Next Generation Telecommunications Networks and Services , IEEE, 2014, pp. 63-138, doi: 10.1002/9781118741580.ch2." (Year: 2014).*

(Continued)

*Primary Examiner* — Christopher B Robinson
(74) *Attorney, Agent, or Firm* — H. Brock Kolls

(57) ABSTRACT

The present invention relates to telecommunications signaling governance systems and methods for controlling establishment of communication sessions between carrier networks. A signaling message is received and processed to extract a call context including calling and called party identifiers. Interconnect attributes are used to resolve an interconnect governance domain associated with a traffic exchange relationship. Authoritative telecommunications datasets are accessed to determine carrier assignments and contextual attributes. A compiled interconnect policy bundle associated with the governance domain is retrieved and applied to perform dual-context evaluation of origin and destination conditions. Based on the evaluation, a deterministic enforcement action is applied at the signaling layer prior to downstream propagation, including allowing, rejecting, or otherwise controlling the communication session. A governance record including evaluation results and enforcement actions is stored in a compliance evidence ledger, enabling real-time, domain-specific, and auditable control of signaling behavior.

24 Claims, 17 Drawing Sheets

Related U.S. Application Data

(60) Provisional application No. 64/011,289, filed on Mar. 20, 2026, provisional application No. 64/011,283, filed on Mar. 20, 2026.

(51) Int. Cl.

| | |
|---|---|
| ***H04M 3/22*** | (2006.01) |
| ***H04M 3/42*** | (2006.01) |
| ***H04W 12/00*** | (2021.01) |

(56) References Cited

U.S. PATENT DOCUMENTS

| | | | | |
|---|---|---|---|---|
| 2019/0312979 | A1* | 10/2019 | Sharma | G06F 16/24573 |
| 2022/0345863 | A1* | 10/2022 | Mueck | H04W 56/001 |
| 2022/0360663 | A1* | 11/2022 | Kempson | H04M 3/42306 |
| 2024/0273411 | A1* | 8/2024 | Mueck | H04L 9/3263 |

OTHER PUBLICATIONS

"R. Falk and S. Fries, "Security Governance for Enterprise VoIP Communication," 2008 Second International Conference on Emerging Security Information, Systems and Technologies, Cap Esterel, France, 2008, pp. 279-286, doi: 10.1109/SECURWARE.2008.25." (Year: 2008).*

* cited by examiner

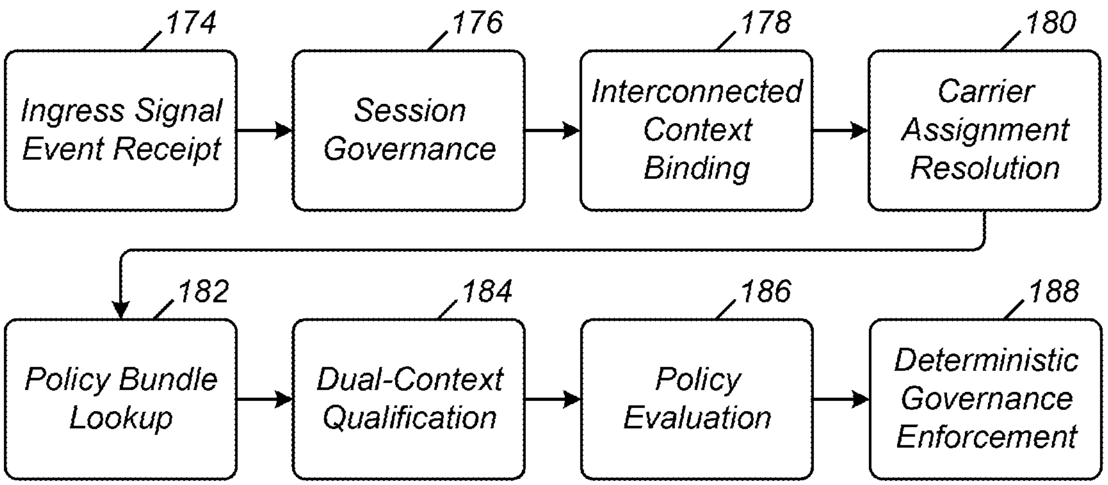
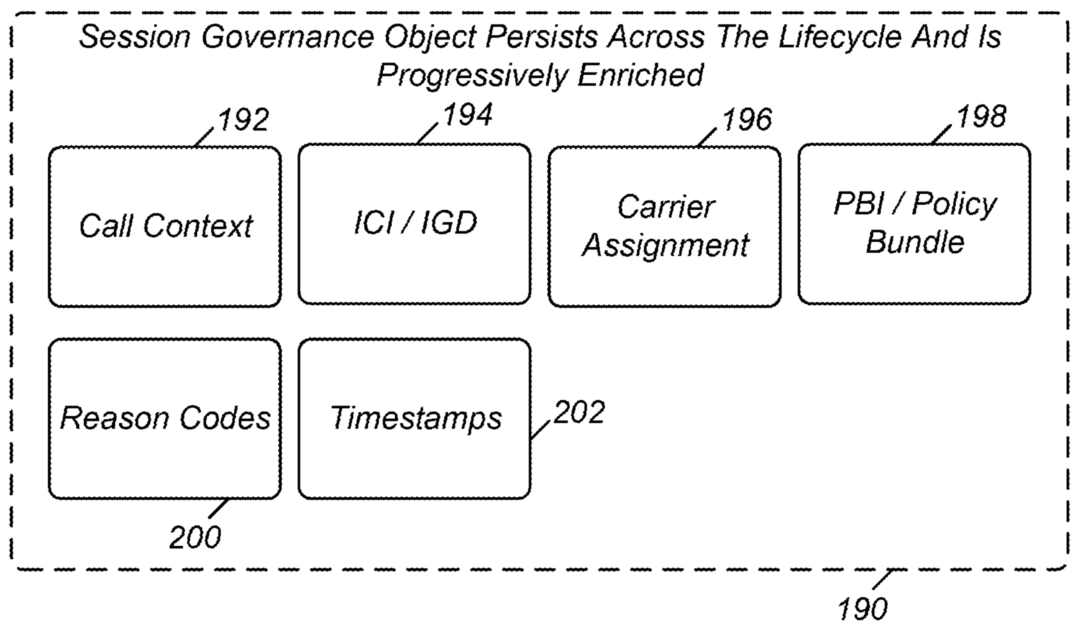
Fig. 11

Fig. 17
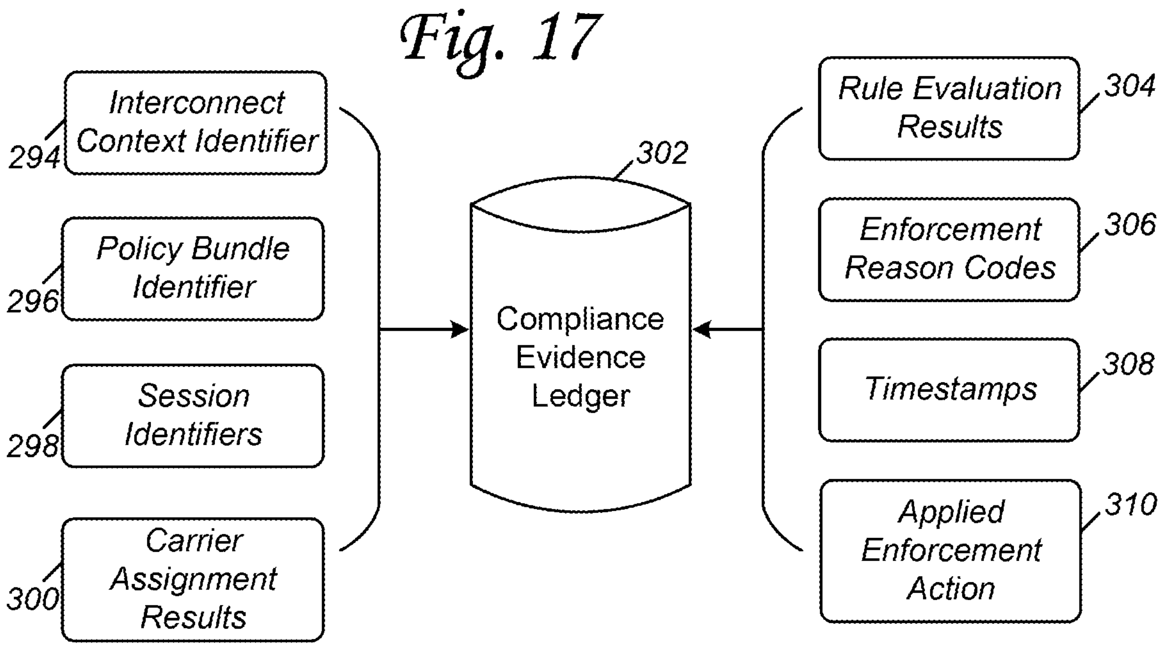
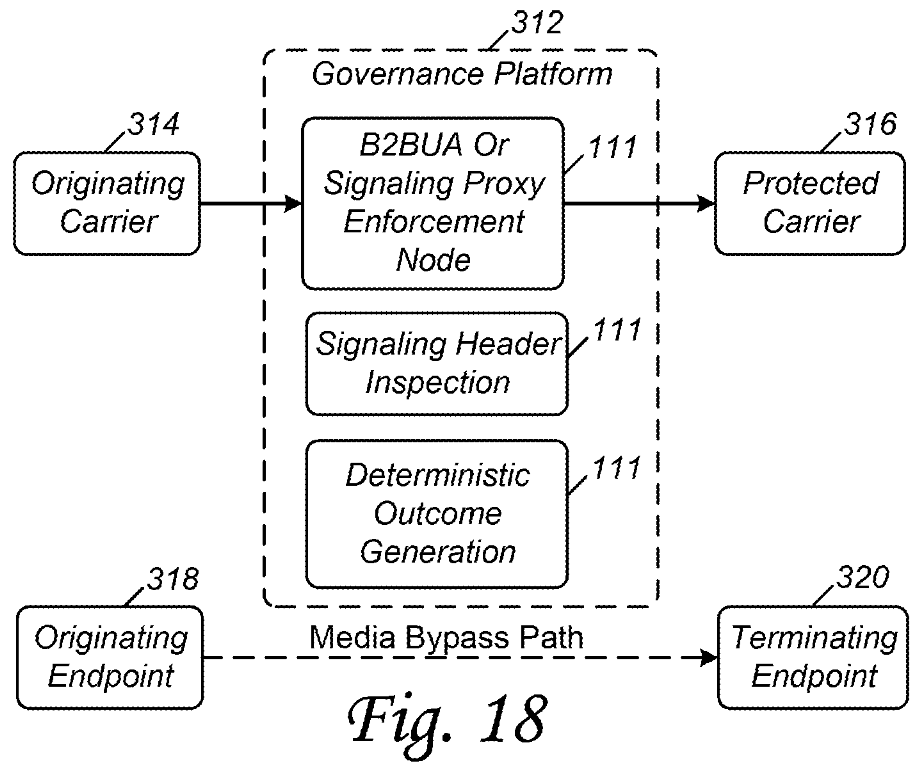
Fig. 18

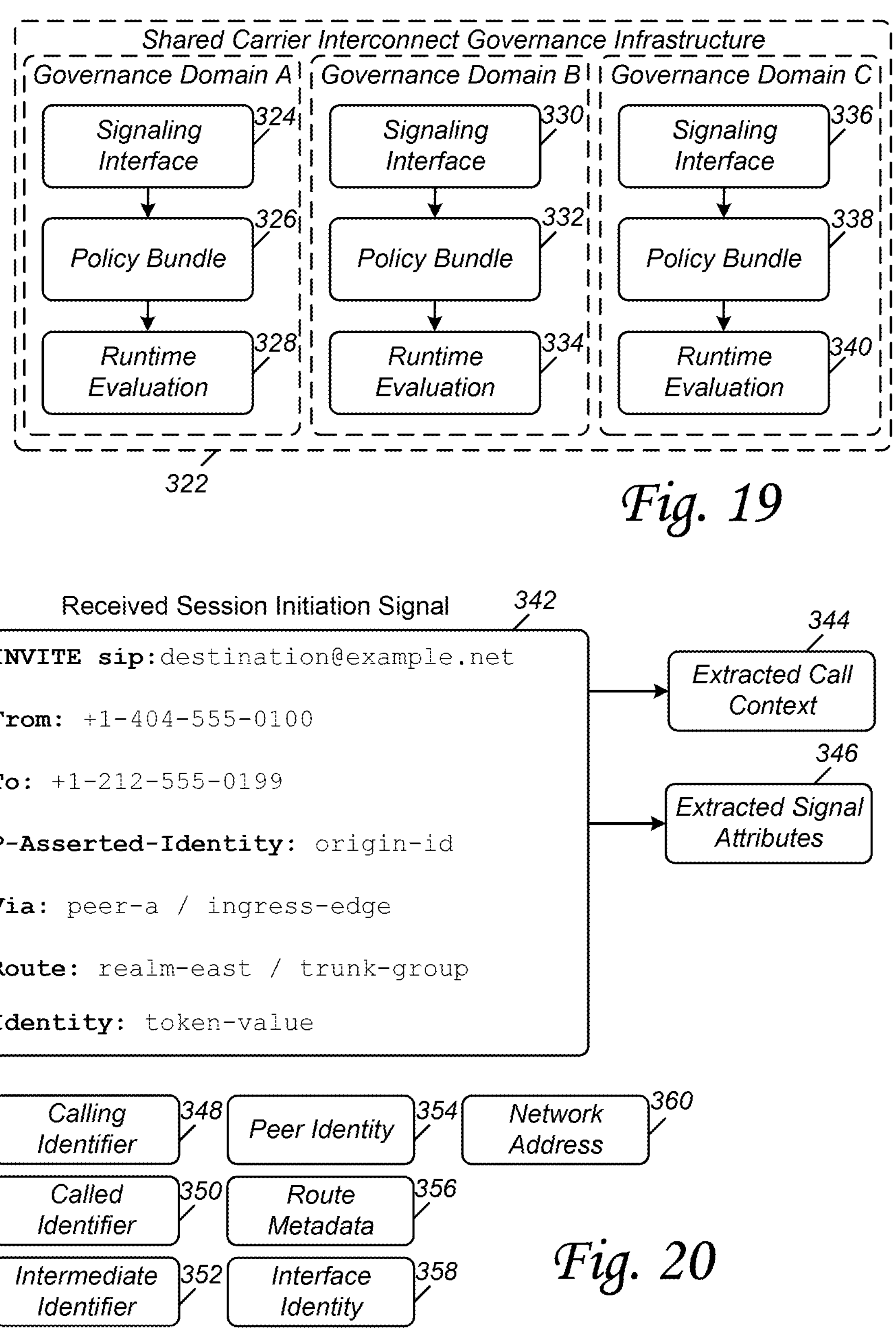
Shared Carrier Interconnect Governance Infrastructure
Governance Domain A
Signaling Interface
324
Policy Bundle
326
Runtime Evaluation
328
Governance Domain B
Signaling Interface
330
Policy Bundle
332
Runtime Evaluation
334
Governance Domain C
Signaling Interface
336
Policy Bundle
338
Runtime Evaluation
340
322
Fig. 19
Received Session Initiation Signal
342
INVITE sip:destination@example.net
From: +1-404-555-0100
To: +1-212-555-0199
P-Asserted-Identity: origin-id
Via: peer-a / ingress-edge
Route: realm-east / trunk-group
Identity: token-value
Extracted Call Context
344
Extracted Signal Attributes
346
Calling Identifier
348
Called Identifier
350
Intermediate Identifier
352
Peer Identity
354
Route Metadata
356
Interface Identity
358
Network Address
360
Fig. 20

TELECOMMUNICATIONS SIGNALING GOVERNANCE SYSTEM AND METHOD FOR INTERCONNECT-AWARE SESSION CONTROL

CROSS-REFERENCE TO RELATED APPLICATIONS

This application contains subject matter that is related to the subject matter of the following co-pending application. The below-listed application is hereby incorporated herein by reference in its entirety:

This is a U.S. non-provisional application that is a continuation in part of a U.S. non-provisional application Ser. No. 19/351,902, inventor David Alan King et al., entitled "SYSTEMS AND METHODS FOR ALLOCATING ORIGINATING CALLING PARTY IDENTIFIERS ACROSS TELECOMMUNICATIONS SERVICE BOUNDARIES", filed Oct. 7, 2025,

- which is a continuation in part of a U.S. non-provisional application Ser. No. 19/054,244, inventor David Alan King et al., entitled "MANAGING BRAND IDENTITY, BRAND SECURITY, AND BRAND REPUTATION ACROSS COMMUNICATION NETWORKS", filed Feb. 14, 2025, now U.S. Pat. No. 12,464,073,
- which claimed the benefit of U.S. provisional application, Ser. No. 63/707,442, inventor David Alan King et al., entitled "SYSTEMS AND METHODS FOR OPTIMIZING CALL CENTER TRAFFIC THROUGH SHAPING AND ROUTE SELECTION", filed Oct. 15, 2024, and
- which is a continuation in part of a U.S. non-provisional application Ser. No. 18/791,501, inventor David Alan King et al., entitled "ORIGINATING CALLING PARTY IDENTIFIER LIFECYCLE MANAGEMENT", filed Aug. 1, 2024, now U.S. Pat. No. 12,244,761,
- which is a continuation in part of a U.S. non-provisional application Ser. No. 18/676,164, inventor David Alan King et al., entitled "MANAGING AN ORGANIZATION'S BRAND IDENTITY, BRAND SECURITY, AND BRAND REPUTATION DELIVERED BY A COMMUNICATION NETWORK", filed May 28, 2024, now U.S. Pat. No. 12,107,990.

This is a U.S. non-provisional application that also claims the benefit of the following U.S. provisional patent applications:

- U.S. provisional application, Ser. No. 64/011,283, inventor David Alan King et al., entitled "DETERMINISTIC INTERCONNECT GOVERNANCE DOMAIN ENGINE FOR MULTI-INTERFACE NETWORK SESSION ADMISSION CONTROL", filed Mar. 20, 2026; and
- U.S. provisional application, Ser. No. 64/011,289, inventor David Alan King et al., entitled "DYNAMIC GOVERNANCE DOMAIN RESOLUTION FOR INTERCONNECTED COMMUNICATIONS SESSIONS USING POLICY BUNDLES AND TELCOM INTERCONNECT POLICY LANGUAGE (TIPL)", filed Mar. 20, 2026.

TECHNICAL FIELD OF THE INVENTION

This invention relates to telecommunications network control systems, and particularly to systems and methods for governing signaling associated with establishment and management of communication sessions between carrier networks.

BACKGROUND OF THE INVENTION

Before our invention, telecommunications networks relied on a variety of signaling control and validation approaches to manage communication session establishment between interconnected carrier networks. As signaling traffic increased in volume, complexity, and regulatory scrutiny, these prior approaches became increasingly strained in their ability to provide consistent and reliable governance of signaling behavior across diverse interconnect relationships.

In many implementations, signaling governance was applied using generalized or globally scoped rule sets that did not adequately account for the specific interconnect relationship through which a signaling message was conveyed. This often resulted in inconsistent enforcement, where signaling associated with one carrier relationship was treated the same as signaling associated with a materially different relationship, leading to improper allowance or rejection of communication sessions. Additionally, prior approaches frequently lacked the ability to dynamically resolve interconnect context based on signaling attributes, instead relying on static configurations that could become outdated or misaligned with actual network routing conditions.

Another limitation of prior approaches involved insufficient integration of authoritative telecommunications datasets during signaling evaluation. Carrier assignment, number portability, jurisdictional classification, and compliance status were often determined using incomplete, locally cached, or outdated data sources. This could result in inaccurate determinations of originating or terminating carrier identity and, in turn, incorrect signaling decisions that propagated through downstream networks.

Further shortcomings arose from the inability of existing systems to perform coordinated evaluation of both originating and destination aspects of a communication session. Many approaches evaluated signaling based primarily on origin-side characteristics or applied limited destination-side checks, allowing sessions that only partially satisfied governance conditions to proceed. This lack of comprehensive evaluation increased the risk of non-compliant or unauthorized signaling reaching downstream carrier networks.

Prior approaches also frequently lacked deterministic, real-time enforcement capabilities within the signaling path. In many cases, signaling messages were permitted to propagate to downstream networks before enforcement actions were applied, or enforcement was performed through asynchronous or advisory mechanisms. This introduced latency, inconsistency, and increased exposure to network misuse, as signaling decisions were not reliably applied before session establishment processes were initiated.

In addition, prior approaches often provided limited visibility into how signaling governance decisions were made. Logging mechanisms were fragmented, unstructured, or insufficiently correlated with actual processing steps, making it difficult to reconstruct decision paths, validate compliance, or resolve disputes between carriers. The absence of a unified and auditable record of signaling evaluation and enforcement further compounded operational and regulatory challenges.

In addition to the foregoing limitations, existing telecommunications signaling systems do not provide effective mechanisms for enforcing governance obligations that are specific to a defined interconnect relationship between carrier networks. In many inter-carrier environments, the exchange of signaling traffic is governed not only by protocol-level requirements but also by contractual terms, regulatory obligations, operational constraints, and carrier-specific policies that are unique to a particular traffic exchange relationship. These governance conditions may include, without limitation, authorized originating carrier requirements, number ownership or right-to-use constraints, jurisdictional restrictions, regulatory compliance conditions, identity validation requirements, and interconnect-specific operational thresholds.

Conventional signaling systems, including signaling proxies, session border controllers, and routing engines, are generally configured to process signaling messages based on protocol conformance, routing logic, or generalized policy rules that are applied across broad network scopes. Such systems do not resolve signaling messages to a specific interconnect governance domain representing the traffic exchange relationship through which the signaling message is conveyed. As a result, governance conditions that are specific to a given interconnect relationship are not consistently or deterministically enforced at the signaling boundary between carrier networks.

This lack of interconnect-specific governance enforcement results in signaling traffic being permitted to traverse carrier boundaries without verification that the communication session satisfies the contractual, regulatory, or operational conditions applicable to that particular interconnect relationship. In many cases, enforcement of such conditions is deferred to downstream systems, performed through manual processes, or applied after signaling propagation has already occurred, thereby increasing the risk of non-compliant traffic reaching protected carrier networks and reducing the effectiveness of governance controls.

Accordingly, there exists a need for a telecommunications signaling governance system that is capable of resolving a signaling message to a defined interconnect governance domain associated with a specific traffic exchange relationship, and of applying domain-specific governance conditions in a deterministic manner prior to downstream signaling propagation. There is further a need for such a system to integrate authoritative telecommunications datasets, interconnect context resolution, and compiled policy execution within a unified signaling-layer enforcement architecture, thereby enabling consistent and auditable enforcement of governance conditions at carrier interconnect boundaries.

The present invention addresses these and other shortcomings by providing a telecommunications signaling governance system configured for deployment between carrier networks. For these reasons and shortcomings, as well as other reasons and shortcomings, there is a long-felt need that gives rise to the present invention.

SUMMARY OF THE INVENTION

The shortcomings of the prior art are overcome and additional advantages are provided through the provision of a telecommunications signaling governance system configured for deployment between carrier networks. The system includes a signaling interface configured to receive a signaling message associated with establishment of a communication session between a first carrier network and a second carrier network, one or more processors, and a non-transitory memory storing instructions executable by the one or more processors.

In operation, the system receives the signaling message and instantiates a session governance object corresponding to the communication session. The session governance object is configured to persist throughout a governance evaluation lifecycle and to store structured data associated with the communication session, including a calling party identifier, a called party identifier, one or more signaling attributes derived from the signaling message, and one or more governance-related attributes including an interconnect context identifier, an associated policy bundle identifier, authoritative telecommunications dataset results, interconnect governance domain-specific constraints, and policy-derived governance parameters.

The system determines one or more interconnect attributes associated with the signaling message, wherein the interconnect attributes include attributes associated with an interconnect signaling interface, signaling peer identity, network addressing information, routing metadata, or other interconnect-related characteristics independent of the content of the signaling message. Based at least in part on the interconnect attributes, the system resolves an interconnect context identifier corresponding to an interconnect governance domain associated with a traffic exchange relationship between the first carrier network and the second carrier network.

The system further determines a policy bundle identifier associated with the interconnect governance domain and initiates retrieval, from a policy store, of a compiled interconnect policy bundle corresponding to the policy bundle identifier. The compiled interconnect policy bundle comprises a machine-executable representation of governance conditions associated with the interconnect governance domain.

The system further determines, using one or more authoritative telecommunications datasets, one or more governance-relevant attributes associated with the communication session, including but not limited to carrier assignment, number ownership or portability status, jurisdictional classification, routing eligibility, regulatory compliance status, identity validation results, and interconnect authorization indicators, derived from one or more of numbering assignment records, portability or routing services, carrier registries, compliance or mitigation databases, jurisdiction datasets, identity verification sources, or other authoritative data sources. The resulting governance attributes are incorporated into the session governance object.

The system evaluates the communication session using the session governance object and the compiled interconnect policy bundle by performing a dual-context qualification in which an origin context and a destination context, each derived from one or more signaling attributes and authoritative telecommunications dataset results, are evaluated against the compiled interconnect policy bundle to determine whether one or more governance conditions are satisfied.

Based on the evaluation, the system applies, before downstream signaling propagation, a deterministic governance enforcement action governing the establishment or continuation of the communication session.

The system further records, in a compliance evidence ledger, a structured governance record associated with the communication session, the governance record including at least the interconnect context identifier, the policy bundle identifier, one or more evaluation results, one or more enforcement reason codes, and one or more timestamps, thereby providing an auditable record of the governance evaluation lifecycle.

Additional shortcomings of the prior art are overcome, and additional advantages are provided through the provision of a telecommunications signaling governance system configured for deployment between carrier networks. The system includes a signaling interface configured to receive a signaling message associated with the establishment of a communication session between a first carrier network and a second carrier network, one or more processors, and a non-transitory memory storing instructions executable by the one or more processors.

In operation, the system receives the signaling message, resolves an interconnect context identifier corresponding to an interconnect governance domain based on interconnect attributes independent of signaling message content, retrieves a compiled interconnect policy bundle associated with the interconnect governance domain, determines an origin context and a destination context using authoritative telecommunications datasets, performs a dual-context qualification using the compiled interconnect policy bundle, and applies, prior to or in lieu of downstream signaling propagation, a deterministic governance enforcement action governing the communication session, while recording a corresponding governance record in a compliance evidence ledger.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings, in which:

FIG. 11 illustrates one example of a deterministic session governance evaluation lifecycle in which a signaling message is received, a session governance object is instantiated, an interconnect context is resolved, carrier assignment is determined, a policy bundle is retrieved, dual-context qualification is performed, policy evaluation is executed, and a deterministic governance enforcement action is applied with associated compliance recording;

FIG. 17 illustrates one example of a compliance evidence ledger configured to record evaluation data associated with a communication session, including an interconnect context identifier, a policy bundle identifier, session identifiers, carrier assignment results, rule evaluation results, enforcement reason codes, timestamps, and an applied enforcement action;

FIG. 18 illustrates one example of a signaling-only enforcement mode in which signaling associated with a communication session is processed by the telecommunications signaling governance system while media associated with the communication session bypasses the system and flows directly between carrier networks;

FIG. 19 illustrates one example of a multi-domain deployment in which multiple interconnect governance domains are maintained within a shared infrastructure, each domain having an associated signaling interface, policy bundle, and runtime evaluation process that is logically isolated from other domains;

FIG. 20 illustrates one example of a signaling message and extraction of call context and signaling attributes, including a calling party identifier, a called party identifier, an intermediate identifier, peer identity, route metadata, interface identity, and network address, from the received signaling message.

Figure 1:
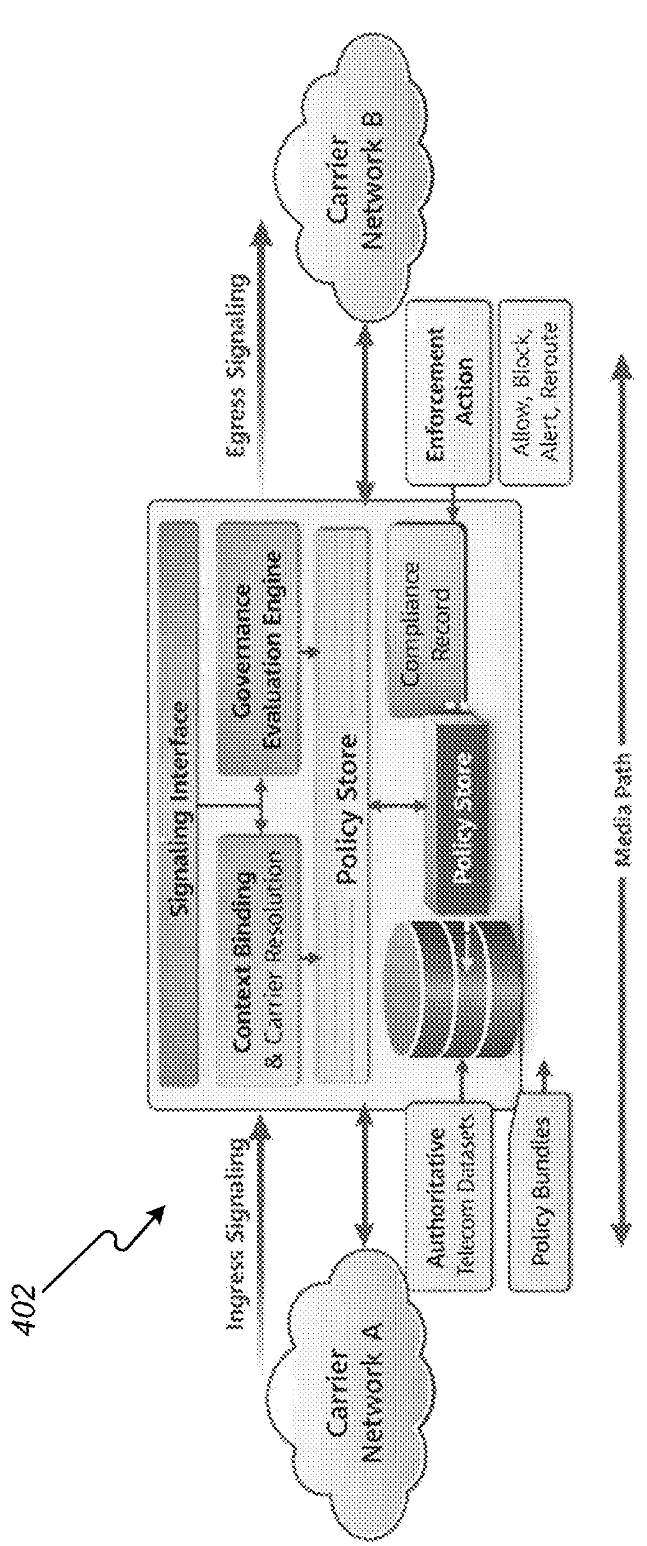
FIG. 1 illustrates one example of a telecommunications signaling governance system overview, including signaling ingestion, context resolution, policy evaluation, deterministic enforcement, and compliance recording between carrier networks while a media path bypasses the system.

The detailed description explains the preferred embodiments of the invention, together with advantages and features, by way of example, with reference to the drawings.

DETAILED DESCRIPTION OF THE INVENTION

The present invention relates generally to telecommunications signaling governance systems operating at carrier interconnect boundaries and, more particularly, to systems and methods for governing signaling associated with communication session establishment between carrier networks in a controlled, deterministic, and domain-specific manner.

Modern telecommunications networks rely on the exchange of signaling messages between interconnected carrier networks to establish, route, and manage communication sessions. These signaling messages, which may include session initiation requests and associated metadata, traverse complex interconnect relationships defined by trunk groups, routing domains, peering arrangements, and contractual carrier agreements. As network interconnection has grown in scale and heterogeneity, the ability to consistently enforce carrier-specific governance requirements at these interconnection points has become increasingly difficult.

Conventional approaches to signaling governance often rely on static rule sets, loosely coupled validation systems, or post-event analytics that operate outside the real-time signaling path. Such approaches frequently lack the ability to resolve the specific interconnect context in which a signaling message is received, resulting in governance decisions that are either overly generalized or inconsistently applied across different carrier relationships. In addition, existing systems often fail to incorporate authoritative telecommunications data sources in a coordinated manner, leading to incomplete or inaccurate determinations of carrier identity, routing eligibility, jurisdictional constraints, or regulatory compliance status.

Further limitations arise from the inability of existing systems to perform coordinated evaluation of both originating and destination aspects of a communication session within a unified governance framework. In many cases, a signaling message may satisfy certain originating carrier conditions while simultaneously violating destination-related constraints such as routing eligibility, tariff restrictions, or jurisdictional requirements. Traditional systems are not structured to perform such dual-context evaluations in a deterministic and pre-propagation manner, thereby allowing invalid or non-compliant signaling to propagate deeper into downstream networks.

Another challenge lies in the lack of deterministic enforcement mechanisms that operate prior to downstream signaling propagation. Existing solutions often permit signaling messages to reach protected carrier networks before enforcement actions are applied, increasing the risk of network misuse, fraud, improper routing, or regulatory noncompliance. Additionally, many systems do not maintain a unified, auditable record of the evaluation process, making it difficult to reconstruct decision paths, validate compliance, or support dispute resolution between carriers.

Accordingly, there exists a need for a telecommunications signaling governance system that is capable of operating in line with signaling traffic, resolving a signaling message to a specific interconnect governance domain, and applying a domain-specific set of governance conditions in a deterministic and low-latency manner. There is further a need for such a system to incorporate authoritative telecommunications datasets during runtime evaluation, to perform coordinated evaluation of both origin and destination contexts, and to enforce governance outcomes prior to downstream signaling propagation.

The present invention addresses these needs by providing a telecommunications signaling governance system configured to receive signaling messages associated with communication session establishment between carrier networks and to perform a structured, multi-stage evaluation process that transforms the signaling message into a governed signaling outcome. In one aspect, the system extracts a call context interconnect attributes independent of signaling message content and determines interconnect attributes that are used in a deterministic evaluation sequence to resolve an interconnect context identifier corresponding to a specific interconnect governance domain. This domain represents a defined traffic exchange relationship between carrier networks and serves as the basis for selecting applicable governance logic.

In another aspect, the system retrieves a compiled interconnect policy bundle associated with the resolved interconnect governance domain based on a policy bundle identifier corresponding to the interconnect governance domain.

The compiled interconnect policy bundle comprises an executable representation of governance conditions that are pre-associated with the domain and optimized for runtime evaluation during active session handling. The system further determines carrier assignment and related governance attributes using one or more authoritative telecommunications datasets, thereby grounding the evaluation in externally validated data sources.

In certain embodiments, the system constructs and maintains a session governance object used to coordinate and manage execution across the governance evaluation lifecycle that persists across the lifecycle of the signaling event and is progressively enriched with call context data, interconnect context binding results, carrier assignment determinations, policy bundle references, intermediate evaluation states, and final enforcement outcomes. This structured data representation enables coordinated evaluation across multiple stages while preserving continuity and traceability of the evaluation process.

In a further aspect, the system performs a dual-context qualification in which an origin context and destination context derived from signaling attributes and authoritative telecommunications dataset results are independently determined and evaluated against the compiled interconnect policy bundle. The system enforces governance conditions that may require both contexts to satisfy domain-specific rules before allowing the communication session to proceed with downstream signaling propagation, thereby preventing scenarios in which partial compliance would otherwise permit improper signaling propagation.

Following evaluation, the system applies a deterministic governance enforcement action at the signaling layer prior to downstream propagation of the signaling message to a receiving carrier network. Such enforcement actions may include allowing the session to proceed, rejecting the session, throttling signaling, diverting signaling to a specialized handling path, or otherwise controlling the signaling flow based on the evaluation result. Because the enforcement is performed before downstream signaling propagation, the system protects carrier networks from receiving non-compliant or unauthorized signaling requests.

The system may further record, in a compliance evidence ledger, a comprehensive record of the evaluation process, including the interconnect context identifier, policy bundle identifier, evaluation results, enforcement actions, reason codes, and timestamps. This record provides an auditable trail that supports regulatory compliance, operational transparency, and inter-carrier accountability.

By integrating interconnect context resolution at carrier interconnect boundaries, authoritative data-driven evaluation, compiled policy execution, dual-context qualification, and pre-propagation deterministic enforcement within a unified runtime system, the present invention provides a technical solution that improves the operation, reliability, and governance of telecommunications signaling between carrier networks.

Definitions

In the present invention, the term "signaling message" is intended to mean a protocol-level communication used to establish, manage, modify, or terminate a communication session between network elements, including messages containing session control data, routing information, and associated metadata.

In the present invention, the term "communication session" is intended to mean a logical association between two or more endpoints established via signaling, independent of any corresponding media flow.

In the present invention, the term "call context" is intended to mean a structured set of data extracted from a signaling message that includes at least a calling party identifier and a called party identifier, and one or more additional signaling attributes or governance-related attributes, and may further include signaling attributes, routing metadata, and network-derived parameters associated with a communication session.

In the present invention, the term "interconnect attribute" is intended to mean a machine-derived or signaling-derived value associated with a signaling message that characterizes a network interface, routing path, peer relationship, or signaling environment through which the signaling message is conveyed, which may be derived independently of signaling message content.

In the present invention, the term "interconnect context identifier" is intended to mean a structured identifier generated based on one or more interconnect attributes, the identifier uniquely corresponding to an interconnect governance domain associated with a traffic exchange relationship between carrier networks.

In the present invention, the term "interconnect governance domain" is intended to mean a logically defined scope representing a specific traffic exchange relationship between two or more carrier networks, within which a corresponding set of governance conditions is applied.

In the present invention, the term "compiled interconnect policy bundle" is intended to mean a machine-executable representation of governance conditions that has been preprocessed or compiled for efficient runtime evaluation within the telecommunications signaling governance system.

In the present invention, the term "policy store" is intended to mean a memory-based or persistent data repository configured to store compiled interconnect policy bundles and to support low-latency retrieval of such bundles during runtime processing.

In the present invention, the term "authoritative telecommunications dataset" is intended to mean a data source that provides externally validated or system-trusted information relating to telecommunications identifiers, carrier assignments, routing information, jurisdictional classifications, or regulatory compliance attributes.

In the present invention, the term "carrier assignment" is intended to mean a determination of a carrier entity associated with a calling party identifier or a called party identifier based on one or more authoritative telecommunications datasets.

In the present invention, the term "origin context" is intended to mean a structured set of attributes associated with a calling party identifier, including at least a normalized identifier and one or more carrier-related, regulatory, or authorization attributes derived from authoritative telecommunications datasets.

In the present invention, the term "destination context" is intended to mean a structured set of attributes associated with a called party identifier, including at least a normalized identifier and one or more routing, jurisdictional, or eligibility attributes derived from authoritative telecommunications datasets.

In the present invention, the term "dual-context qualification" is intended to mean a coordinated evaluation process in which both an origin context and a destination context are independently and collectively evaluated against a compiled interconnect policy bundle.

In the present invention, the term "session governance object" is intended to mean a structured data construct instantiated in memory for a communication session and configured to store and progressively update call context data, interconnect context data, carrier assignment data, policy references, evaluation results, and enforcement outcomes.

In the present invention, the term "deterministic governance enforcement action" is intended to mean a signaling-layer control action that is selected based on a defined and repeatable evaluation outcome and applied prior to downstream signaling propagation, such that identical inputs produce consistent enforcement results.

In the present invention, the term "compliance evidence ledger" is intended to mean a persistent data store configured to record structured governance records associated with communication sessions, including evaluation data, enforcement actions, and associated metadata for audit and traceability purposes.

In the present invention, the term "signaling-only enforcement mode" is intended to mean an operational mode in which signaling messages are processed and governed by the telecommunications signaling governance system while media associated with the communication session bypasses the system.

In the present invention, the term "governance evaluation engine" is intended to mean one or more processing components configured to evaluate a communication session against a compiled interconnect policy bundle using structured session data.

In the present invention, the term "telecommunications signaling governance system" is intended to mean a machine-implemented system comprising one or more processors and memory that is configured to receive, process, evaluate, and control signaling messages exchanged between carrier networks to govern communication session establishment or continuation.

In the present invention, the term "signaling interface" is intended to mean a network-facing interface configured to receive and transmit signaling messages and to perform protocol-aware parsing, normalization, and forwarding of such messages within the telecommunications signaling governance system.

In the present invention, the term "processor" is intended to mean one or more hardware processing units configured to execute machine-readable instructions that transform signaling messages and associated data into governed signaling outcomes.

In the present invention, the term "non-transitory memory" is intended to mean a physical storage medium storing instructions that, when executed by one or more processors, cause the telecommunications signaling governance system to perform operations including context extraction, evaluation, and enforcement of signaling behavior.

In the present invention, the term "normalization" is intended to mean transformation of signaling-derived data into a standardized or canonical format suitable for consistent evaluation and comparison across different signaling protocols, data sources, or network environments.

In the present invention, the term "evaluation" is intended to mean execution of one or more machine-implemented operations in which structured data associated with a communication session is processed against a compiled interconnect policy bundle to produce one or more determination results.

In the present invention, the term "governance condition" is intended to mean a machine-evaluable rule or constraint defined within a compiled interconnect policy bundle that specifies criteria under which a communication session is permitted, restricted, or modified.

In the present invention, the term "policy bundle identifier" is intended to mean a reference value that uniquely identifies a compiled interconnect policy bundle within a policy store and enables retrieval of the bundle for runtime evaluation.

In the present invention, the term "runtime" is intended to mean a period during which the telecommunications signaling governance system is actively processing signaling messages and performing evaluation and enforcement operations in response to received signaling events.

In the present invention, the term "real-time" is intended to mean processing that occurs within a time interval compatible with operational timing constraints of a signaling system, such that the processing is performed during active handling of a communication session rather than after completion of the session.

In the present invention, the term "downstream signaling propagation" is intended to mean transmission of a signaling message from the telecommunications signaling governance system toward a receiving carrier network or downstream network element following processing by the system.

In the present invention, the term "signaling-layer enforcement" is intended to mean application of a control action to a signaling message at a protocol or session-control level without requiring modification of an associated media path.

In the present invention, the term "media path" is intended to mean a communication channel carrying user data associated with a communication session, separate from signaling messages used to establish or manage the session.

In the present invention, the term "low-latency retrieval" is intended to mean retrieval of data, including compiled interconnect policy bundles, within a time interval compatible with signaling protocol timing constraints.

In the present invention, the term "deterministic" is intended to mean that a given set of inputs to the telecommunications signaling governance system will produce a consistent and reproducible output without reliance on non-deterministic or externally variable factors.

In the present invention, the term "rule evaluation state" is intended to mean an intermediate or final result produced during evaluation of a communication session against a compiled interconnect policy bundle, including pass, fail, or conditional outcomes.

In the present invention, the term "reason code" is intended to mean a structured data value associated with an evaluation or enforcement outcome that indicates a basis for the outcome in a machine-readable and auditable form.

In the present invention, the term "timestamp" is intended to mean a recorded time value associated with a signaling event, evaluation step, or enforcement action, used to establish temporal ordering and traceability.

In the present invention, the term "logically isolated" is intended to mean that one interconnect governance domain operates independently from another such that governance conditions, policy bundles, and enforcement actions associated with one domain do not affect unrelated domains.

In the present invention, the term "distributed" is intended to mean that components of the telecommunications signaling governance system, including policy stores or enforcement nodes, may be deployed across multiple computing systems or network locations while operating in a coordinated manner.

Additional System Operation and Implementation Details

Low-Latency/Time-Constrained Processing: In an exemplary embodiment, the telecommunications signaling governance system is configured to perform context extraction, interconnect context resolution, policy bundle retrieval, and governance evaluation within a bounded processing interval for a given interconnect governance domain compatible with signaling protocol timing constraints. The system may utilize in-memory data structures, precompiled policy artifacts, and optimized lookup tables to ensure that deterministic governance enforcement actions are applied prior to downstream signaling propagation without introducing unacceptable signaling delay. This improves system responsiveness relative to prior approaches that perform delayed or asynchronous evaluation.

Compiled Policy Optimization: In an exemplary embodiment, compiled interconnect policy bundles are generated through a preprocessing stage in which governance conditions are transformed into executable rule graphs, decision trees, or other machine-optimized representations. This compilation process may include rule normalization, dependency resolution, and elimination of redundant conditions, thereby reducing runtime computational overhead. As a result, the telecommunications signaling governance system can evaluate communication sessions more efficiently than systems relying on uncompiled or dynamically interpreted rule sets.

Policy Caching/Fast Retrieval: In some implementations, the policy store maintains compiled interconnect policy bundles within a distributed in-memory cache to support low-latency retrieval during runtime evaluation. The system may maintain active bundle pointers indexed by interconnect context identifier to enable direct retrieval of a compiled interconnect policy bundle, allowing direct access without repeated database queries. This caching mechanism reduces retrieval time and supports high-throughput signaling environments.

Distributed/Multi-Node Deployment: In an exemplary embodiment, the telecommunications signaling governance system is deployed across a plurality of distributed enforcement nodes, each configured to process signaling messages associated with a subset of network traffic. The nodes may share access to a common policy store or may maintain synchronized local copies of compiled interconnect policy bundles to ensure consistent enforcement within a given interconnect governance domain. Synchronization mechanisms ensure consistency of governance logic across nodes, enabling deterministic enforcement behavior even in distributed network environments.

Failure Handling/Fallback Logic: In an exemplary embodiment, the telecommunications signaling governance system includes fallback handling logic configured to address conditions in which one or more required datasets, policy bundles, or context resolution operations are unavailable or incomplete. In such cases, the system may apply a predefined fallback enforcement action, such as rejecting the communication session, allowing the session with restricted privileges, or routing the session to an alternate handling path. This ensures predictable system behavior under degraded operating conditions based on predefined governance conditions.

Dataset Conflict Resolution: In an exemplary embodiment, when multiple authoritative telecommunications datasets provide conflicting information associated with a calling party identifier or called party identifier, the telecommunications signaling governance system applies a conflict resolution strategy. The strategy may include prioritization of data sources, recency-based selection, confidence scoring, or rule-based reconciliation. The resolved data is then incorporated into the session governance object for evaluation.

Partial Data Handling: In some implementations, the telecommunications signaling governance system is configured to perform evaluation even when one or more expected data elements are missing or incomplete. The system may assign default values, apply conditional rules, or adjust evaluation weighting based on data availability. This allows governance evaluation to proceed in environments where signaling messages or dataset responses are partially populated.

Dynamic Policy Updates: In an exemplary embodiment, compiled interconnect policy bundles may be updated dynamically while the telecommunications signaling governance system is actively processing signaling messages. The system may support staged deployment, versioning, and atomic switching of policy bundles to ensure that updates do not disrupt ongoing session evaluations. This enables continuous adaptation of governance logic without requiring system downtime.

Security/Trust Boundary: In an exemplary embodiment, the telecommunications signaling governance system enforces trust boundaries between carrier networks by validating signaling message integrity, source authenticity, and interconnect authorization associated with an interconnect governance domain. The system may reject or flag signaling messages that originate from unauthorized peers or that exhibit anomalous attributes, thereby improving network security relative to prior approaches that rely on implicit trust assumptions.

Protocol-Agnostic Operation: In some implementations, the telecommunications signaling governance system is configured to operate across multiple signaling protocols by abstracting protocol-specific fields into a normalized call context representation. This allows governance evaluation to be performed consistently regardless of the underlying signaling protocol, enabling broader applicability across heterogeneous network environments.

Feedback/Operational Tuning: In an exemplary embodiment, governance records stored in the compliance evidence ledger may be analyzed to identify trends, anomalies, or recurring enforcement patterns. The telecommunications signaling governance system may use this information to refine compiled interconnect policy bundles, adjust governance conditions, or inform operator-driven updates. This creates a feedback mechanism that improves system performance over time.

Enforcement Granularity: In an exemplary embodiment, deterministic governance enforcement actions may be applied at varying levels of granularity, including session-level, signaling-message-level, or attribute-level control. For example, the system may modify specific signaling headers, including modification of signaling attributes, inject response codes, or selectively throttle signaling messages rather than fully allowing or rejecting a communication session.

Pre-Propagation Advantage: In an exemplary embodiment, enforcement actions are applied prior to downstream signaling propagation, such that the telecommunications signaling governance system actively controls whether and how a communication session is established within the network. This pre-propagation enforcement modifies the operation of network signaling infrastructure in real time, improving network control and reducing propagation of non-compliant signaling compared to systems that perform post-processing or advisory analysis.

Additional Embodiments Supporting System Operation

In an exemplary embodiment, a telecommunications signaling governance system configured for deployment between carrier networks can include a signaling interface configured to receive a signaling message associated with establishment of a communication session between a first carrier network and a second carrier network, one or more processors, and a non-transitory memory storing instructions. When executed, the instructions can cause the system to extract from the signaling message a call context comprising a calling party identifier and a called party identifier associated with the communication session. The system can further determine one or more interconnect attributes associated with the signaling message and resolve, based at least in part on the one or more interconnect attributes based on interconnect-level attributes rather than signaling content, an interconnect context identifier corresponding to an interconnect governance domain associated with a traffic exchange relationship between the first carrier network and the second carrier network. The system can determine, using one or more authoritative telecommunications datasets, a carrier assignment or other governance-relevant attributes, retrieve from a policy store based on the interconnect context identifier a compiled interconnect policy bundle associated with the interconnect governance domain, evaluate the call context against the compiled interconnect policy bundle to determine whether the communication session satisfies one or more governance conditions associated with the interconnect governance domain, and apply, before downstream signaling propagation to the second carrier network, a deterministic governance enforcement action governing establishment or continuation of the communication session.

In some implementations, the one or more interconnect attributes can include at least one of an ingress signaling interface identifier, an egress signaling interface identifier, an ingress network address, an egress network address, a signaling peer identifier, a route identifier, or routing metadata derived from the signaling message or associated network context.

In an exemplary embodiment, the interconnect governance domain can correspond to at least one of a trunk pair, a trunk group, a carrier pair relationship, a routing domain, a logical signaling relationship, or a peering relationship between the first carrier network and the second carrier network.

In some implementations, the one or more authoritative telecommunications datasets can include at least one of a numbering assignment record, a local number portability database, a local routing number service, an operating company number registry, a robocall mitigation database, or a jurisdiction dataset used to derive carrier assignment or contextual attributes.

In an exemplary embodiment, the deterministic governance enforcement action can include at least one of allowing the communication session, rejecting the communication session, throttling signaling associated with the communication session, segregating signaling associated with the communication session for specialized handling, such as diversion to an alternate processing path, or redirecting signaling associated with the communication session.

In some implementations, the instructions can further cause the telecommunications signaling governance system to record, in a compliance evidence ledger, a record comprising the interconnect context identifier, an identifier of the compiled interconnect policy bundle, an evaluation result, and the deterministic governance enforcement action applied to the communication session.

In an exemplary embodiment, a method of using a telecommunications signaling governance system can include receiving a signaling message associated with establishment of a communication session between a first carrier network and a second carrier network, resolving an interconnect context identifier corresponding to an interconnect governance domain associated with a traffic exchange relationship between the carrier networks, retrieving a compiled interconnect policy bundle associated with the interconnect governance domain, evaluating a call context against the compiled interconnect policy bundle, and applying, before downstream signaling propagation to the second carrier network, a deterministic governance enforcement action governing establishment or continuation of the communication session.

In an exemplary embodiment, a telecommunications signaling governance system configured for deployment between carrier networks can include a signaling interface configured to receive a signaling message associated with establishment of a communication session between a first carrier network and a second carrier network, one or more processors, and a non-transitory memory storing instructions. When executed, the instructions can cause the system to extract from the signaling message a call context comprising a calling party identifier and a called party identifier associated with the communication session, identify an interconnect governance domain associated with a traffic exchange relationship between the first carrier network and the second carrier network, and retrieve from a policy store a compiled interconnect policy bundle associated with the interconnect governance domain. The system can further determine, using one or more authoritative telecommunications datasets, an origin context and destination context derived from signaling attributes and authoritative telecommunications dataset results, perform a dual-context qualification by evaluating the origin context and the destination context against the compiled interconnect policy bundle, and apply, before downstream signaling propagation to the second carrier network, a deterministic governance enforcement action based on the dual-context qualification.

In some implementations, the origin context can include at least one of a normalized calling party identifier, an originating carrier identity, an operating company number ownership value, a regulatory compliance status, a robocall mitigation participation status, or a trunk authorization status derived from one or more authoritative telecommunications datasets.

In an exemplary embodiment, the destination context can include at least one of a normalized called party identifier, a destination carrier identity, a jurisdiction classification, a routing eligibility value, or a tariff eligibility value derived from one or more authoritative telecommunications datasets.

In some implementations, the dual-context qualification can require that both the origin context and the destination context satisfy one or more governance conditions defined within the compiled interconnect policy bundle before the telecommunications signaling governance system allows the communication session to proceed.

In an exemplary embodiment, the compiled interconnect policy bundle can include one or more governance conditions comprising at least one of a carrier authorization rule, a destination eligibility rule, a tariff eligibility rule, a jurisdiction restriction, or an interconnect-specific authorization rule applicable to the interconnect governance domain.

In some implementations, the interconnect governance domain is logically isolated from another interconnect governance domain such that governance conditions associated with one domain do not affect evaluation or enforcement decisions associated with an unrelated traffic exchange relationship.

In an exemplary embodiment, the deterministic governance enforcement action can include generation of a signaling-layer response comprising at least one of a rejection response, an allow continuation response, a governance alert, or an alternate handling action applied prior to downstream signaling propagation.

In an exemplary embodiment, a telecommunications signaling governance system configured for deployment between carrier networks can include a signaling interface configured to receive a signaling message associated with establishment of a communication session between a first carrier network and a second carrier network, a governance evaluation engine coupled to the signaling interface, a policy store accessible by the governance evaluation engine and storing compiled interconnect policy bundles associated with respective interconnect governance domains, one or more processors, and a non-transitory memory storing instructions. When executed, the instructions can cause the system to instantiate a session governance object for the communication session in response to receipt of the signaling message and populate the session governance object with a calling party identifier, a called party identifier, and one or more signaling attributes derived from the signaling message. The system can further determine, using the governance evaluation engine, an interconnect context identifier and a corresponding interconnect governance domain for the communication session, retrieve from the policy store a compiled interconnect policy bundle associated with the corresponding interconnect governance domain, evaluate the communication session using the session governance object and the compiled interconnect policy bundle, and apply, before downstream signaling propagation to the second carrier network, a deterministic governance enforcement action governing establishment or continuation of the communication session.

In some implementations, the governance evaluation engine can comprise at least one of a signaling proxy, a back-to-back user agent, a signaling gateway, or a cloud-hosted signaling enforcement service configured to process signaling messages and perform governance evaluation.

In an exemplary embodiment, the telecommunications signaling governance system can be configured in a signaling-only enforcement mode in which signaling associated with the communication session is terminated and re-originated by the telecommunications signaling governance system while media associated with the communication session bypasses the telecommunications signaling governance system.

In some implementations, the instructions can further cause the telecommunications signaling governance system to record, in a compliance evidence ledger, a governance record comprising the interconnect context identifier, an identifier of the compiled interconnect policy bundle, one or more evaluation results, one or more enforcement reason codes, and one or more timestamps associated with the communication session.

In an exemplary embodiment, the policy store can comprise a distributed in-memory policy store configured to support low-latency retrieval of the compiled interconnect policy bundle during evaluation of the communication session.

In some implementations, the policy store maintains logically isolated compiled interconnect policy bundles for a plurality of interconnect governance domains associated with different carrier traffic exchange relationships, such that governance conditions associated with one domain do not affect evaluation or enforcement in another domain.

Turning now to the drawings in greater detail, it will be seen that in FIG. 1, there is illustrated one example of a telecommunications signaling governance system overview 402 that provides a high-level representation of how signaling traffic is received, processed, governed, and forwarded between carrier networks while maintaining separation from the media path.

In an exemplary embodiment, the system 402 can be positioned logically between a first carrier network and a second carrier network such that signaling messages associated with the establishment of a communication session are intercepted and processed prior to downstream propagation. As illustrated, ingress signaling can be received from a first carrier network and introduced into the system 402 through a signaling interface. The signaling interface can serve as an entry point for parsing and normalizing signaling messages, enabling subsequent processing stages to operate on structured and consistent data.

The system 402 can include a context binding and carrier resolution function that determines attributes associated with the signaling message, including carrier identity, interconnect relationships, and attributes. This function can interact with authoritative telecommunications datasets, such as numbering databases or carrier registries, to determine carrier assignment and contextual metadata associated with the communication session. By incorporating external authoritative data sources into the processing flow, the system 402 can enhance the accuracy and reliability of governance decisions corresponding to an interconnect governance domain.

The system 402 can further include a governance evaluation engine that evaluates the signaling message against a compiled interconnect policy bundle retrieved from a policy store. The policy store can maintain precompiled governance logic associated with specific interconnect governance domains, allowing the governance evaluation engine to efficiently apply domain-specific rules during runtime. This arrangement can provide a technical advantage over prior approaches that rely on static or globally applied rule sets, as the system 402 can dynamically select and apply policy logic based on the resolved interconnect context.

In an exemplary embodiment, the governance evaluation engine can generate an evaluation result that determines whether the communication session satisfies one or more governance conditions. Based on this evaluation, the system 402 can apply a deterministic governance enforcement action prior to forwarding signaling toward the second carrier network. As illustrated in the figure, the enforcement action can include allowing the session to proceed, blocking the session, generating an alert, or rerouting signaling as appropriate. This enforcement is performed at the signaling layer, ensuring that control decisions are applied before the signaling message reaches the downstream carrier network.

The system 402 can also include a compliance recording function that generates a compliance evidence record corresponding to the processed communication session. This record can include identifiers, evaluation outcomes, policy bundle references, and enforcement actions, and can be stored in a persistent ledger or policy store for later audit and analysis. By maintaining structured records of governance decisions, the system 402 can support traceability and compliance verification.

As further illustrated in FIG. 1, the system 402 can operate in a signaling-only enforcement mode in which the media path associated with the communication session bypasses the system. While signaling messages are intercepted and governed, the actual media stream can flow directly between carrier networks. This separation addresses a technical challenge in telecommunications systems by allowing governance control without introducing latency or processing overhead into the media path.

The overview 402 demonstrates a coordinated architecture in which signaling ingestion, context resolution, policy retrieval, evaluation, enforcement, and compliance recording are integrated into a unified system. Each of these functional components can be implemented using one or more processors executing instructions stored in a non-transitory memory, thereby forming a machine-executed pipeline that transforms signaling data into controlled network behavior.

The technical problem addressed by the system 402 involves managing inter-carrier signaling traffic in a manner that is context-aware, deterministic, and scalable, while avoiding the inefficiencies and inconsistencies associated with prior approaches. Traditional systems may rely on static routing rules, limited dataset integration, or post-processing analysis, which can result in incomplete or delayed enforcement of governance policies. In contrast, the system 402 enables real-time, pre-propagation enforcement of signaling decisions based on dynamically resolved context and domain-specific policy bundles.

From a subject-matter eligibility perspective, the system 402 represents a concrete improvement to telecommunications network operation. The system is not merely performing abstract evaluation, but is instead controlling signaling behavior between carrier networks using structured data processing, integration of authoritative datasets, and deterministic enforcement actions applied at the signaling layer. The architecture shown in FIG. 1, therefore, provides a practical implementation that enhances network control, improves compliance enforcement, and supports reliable inter-carrier communication management.

Figure 2:
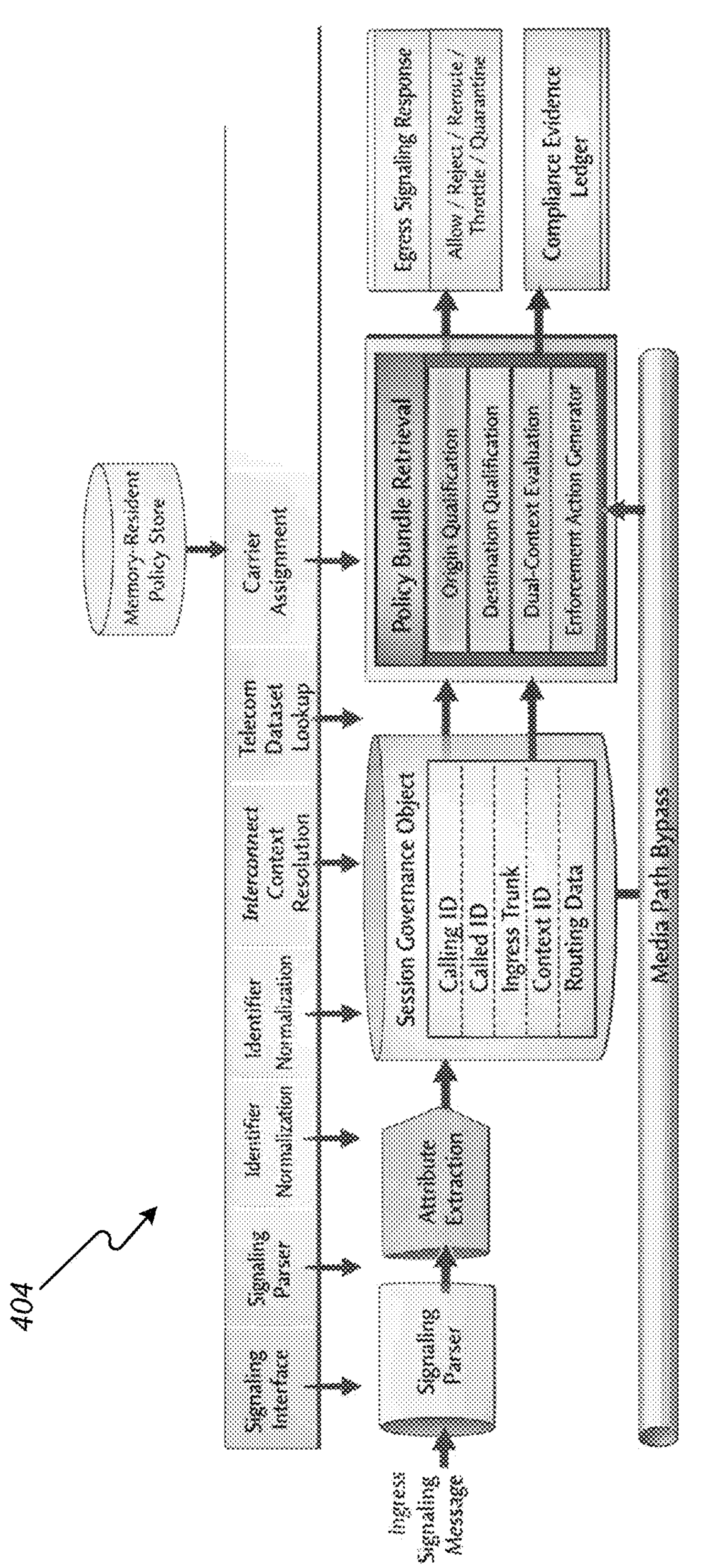
FIG. 2 illustrates one example of a runtime signaling governance processing pipeline including signaling parsing, attribute extraction, session governance object generation, interconnect context resolution, policy bundle retrieval, dual-context evaluation, enforcement action generation, and compliance evidence recording.

Referring to FIG. 2, there is illustrated one example of a runtime signaling governance processing pipeline 404 that provides a detailed view of how the telecommunications signaling governance system processes a signaling message to produce a deterministic enforcement outcome in a defined and deterministic processing sequence.

In an exemplary embodiment, the pipeline 404 can begin with the receipt of an ingress signaling message at a signaling interface, where the signaling message is parsed and normalized to extract protocol-specific fields. As illustrated, the signaling interface can feed a signaling parser and attribute extraction stage that derives structured attributes from the signaling message. These attributes can include identifiers such as a calling party identifier, a called party identifier, an ingress trunk identifier, and routing-related data. The extracted attributes can be normalized to ensure consistent formatting and compatibility with downstream processing stages.

The normalized attributes can then be used to populate a session governance object that serves as a structured representation of the communication session. The session governance object can include fields corresponding to identifiers, signaling attributes, and routing information, allowing the system to maintain a unified and persistent representation of the session throughout the evaluation process. This structured object can enable different processing components within the pipeline 404 to operate on a shared data model rather than on fragmented or transient data structures.

The pipeline 404 can further include a context resolution stage in which interconnect context information is determined based on interconnect attributes and signaling-independent network characteristics. This stage can identify an interconnect governance domain associated with the communication session and can perform carrier assignment using authoritative telecommunications dataset lookups. The dataset lookups can enrich the session governance object with additional attributes, such as carrier identity, jurisdictional classification, and regulatory status, thereby enabling more informed governance evaluation.

Following context resolution and enrichment, the pipeline 404 can perform policy bundle retrieval based on the interconnect context identifier from a memory-resident policy store. The retrieved compiled interconnect policy bundle can correspond to the resolved interconnect governance domain and can be structured in a precompiled format optimized for rapid evaluation. By retrieving a domain-specific compiled policy bundle, the system can avoid evaluating irrelevant rules and can maintain low-latency processing suitable for in-session signaling control.

The pipeline 404 can then execute a governance evaluation stage that includes origin qualification, destination qualification, and combined evaluation of the communication session. In this stage, the system can apply the compiled interconnect policy bundle to the enriched session governance object to determine whether governance conditions are satisfied. The evaluation can produce rule-level results and aggregated outcomes that reflect whether both origin-side and destination-side conditions meet the requirements defined for the interconnect governance domain.

Based on the evaluation results, the pipeline 404 can proceed to an enforcement action generation stage. This stage can produce a signaling-layer response that governs the communication session prior to downstream signaling propagation. The enforcement action can include allowing the session to proceed, rejecting the session, throttling signaling, segregating signaling for alternate handling, or directing signaling to an alternate handling path. Because the enforcement action is determined in a deterministic manner based on the evaluated policy conditions, the system can ensure consistent behavior across similar signaling events.

The pipeline 404 can also include a compliance evidence recording stage in which a governance record is generated and stored in a compliance evidence ledger. This record can include identifiers, evaluation results, enforcement actions, and timestamps associated with the communication session. The compliance evidence ledger can provide a persistent and queryable record of system behavior, supporting auditing, troubleshooting, and regulatory compliance.

As further illustrated in FIG. 2, the pipeline 404 can operate in a signaling-only enforcement configuration in which the media path bypasses the processing stages. While signaling messages are intercepted and processed through the pipeline 404, the media stream associated with the communication session can flow directly between carrier networks. This separation allows the system to exert control over session establishment without introducing latency or processing overhead into the media path.

The pipeline 404 addresses a technical problem associated with coordinating multiple data transformations, external dataset integrations, and policy evaluations within the time constraints required for telecommunications signaling. Prior approaches may perform partial or delayed evaluation, rely on static rule sets, or lack a unified data model, resulting in inconsistent or inefficient enforcement. By organizing the processing steps into a structured pipeline and by using a session governance object as a shared data structure, the system can achieve consistent, low-latency, and context-aware governance of signaling traffic.

From a technical standpoint, the pipeline 404 represents a machine-executed sequence of operations that transforms an incoming signaling message into a controlled network outcome. Each stage performs a specific data processing function, and the combined pipeline produces a deterministic enforcement result that directly affects signaling behavior between carrier networks. This demonstrates that the system is implementing a concrete improvement in telecommunications signaling control rather than performing abstract analysis.

The arrangement shown in FIG. 2 therefore provides a detailed illustration of how the telecommunications signaling governance system operates at runtime to process signaling messages, apply domain-specific governance logic, and enforce communication control decisions in a deterministic and auditable manner.

Figure 3:
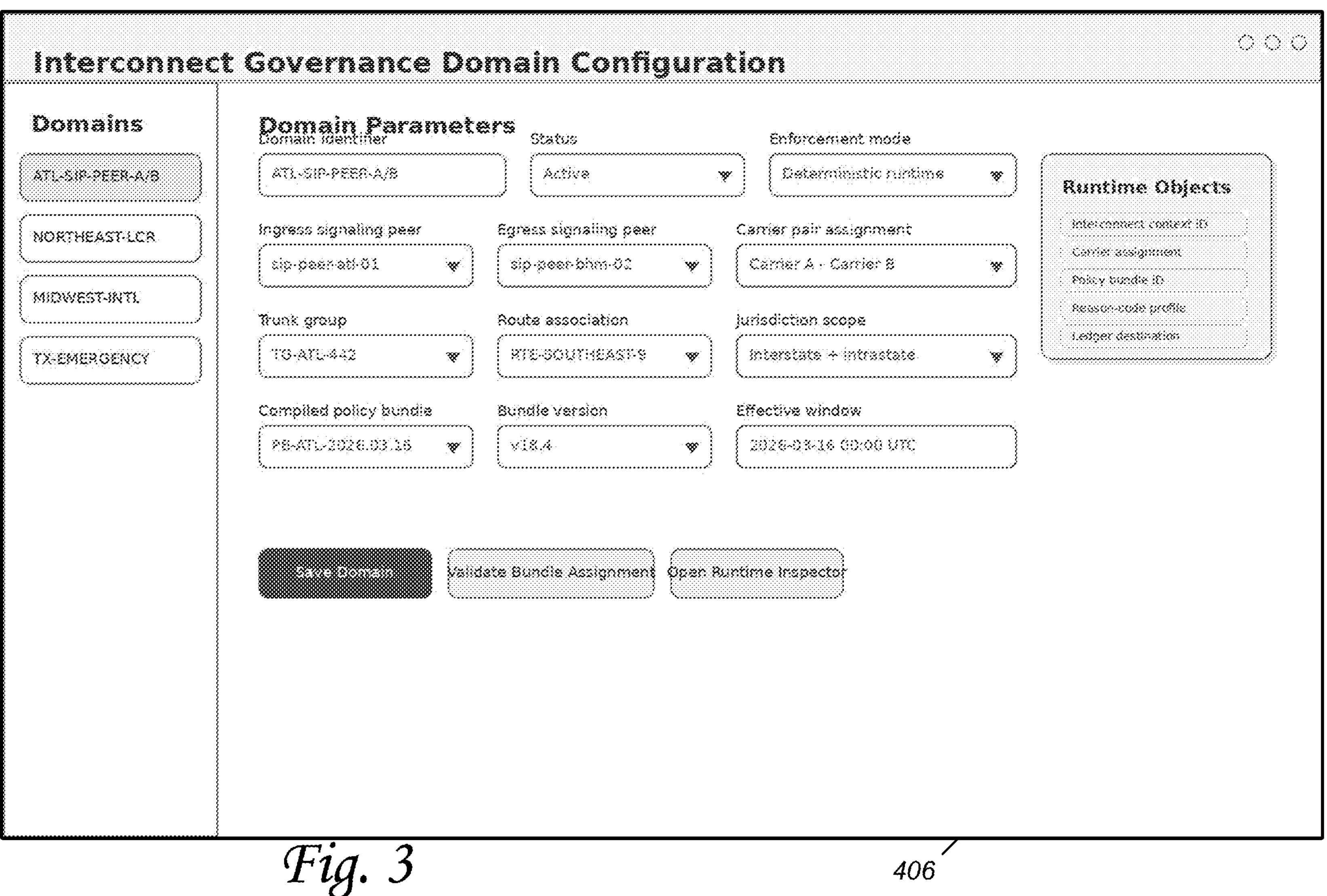
FIG. 3 illustrates one example of an interconnect governance domain configuration interface, including selectable domains, domain parameters, signaling peer assignments, routing associations, compiled policy bundle selection, and runtime object mapping for defining an interconnect governance domain.

Referring to FIG. 3, there is illustrated one example of an interconnect governance domain configuration interface 406 through which an operator can define, revise, and maintain configuration data associated with a selected interconnect governance domain used by the telecommunications signaling governance system.

In an exemplary embodiment, the interconnect governance domain configuration interface 406 can present a domain selection region that lists multiple available governance domains corresponding to different carrier relationships, routing scopes, or operational contexts. An operator can select one of the displayed domains, after which the interface 406 can populate a configuration workspace with parameters associated with that selected domain. The workspace can include a domain identifier, a status indicator, and an enforcement mode setting, thereby allowing the operator to establish whether the selected domain is active and whether runtime governance is to be applied in a deterministic enforcement mode.

The interface 406 can also include parameter fields associated with signaling ingress and signaling egress relationships. These fields can define signaling peers, carrier pair associations, trunk-group information, route associations, and jurisdictional scope. In that manner, the interface 406 can be used to define the interconnect attributes that later allow the runtime system to resolve an interconnect context identifier corresponding to the appropriate interconnect governance domain when a signaling message is received. Rather than relying on broad, globally applied settings, the configuration represented in the interface 406 can be tailored to the particular traffic exchange relationship reflected by the selected domain.

In some implementations, the interface 406 can further provide controls for associating a compiled interconnect policy bundle and bundle version with the selected interconnect governance domain, along with an effective time window governing when that policy configuration is to be applied. These settings can enable the telecommunications signaling governance system to retrieve the proper compiled policy artifact during runtime evaluation of a communication session. This can provide a technical improvement over prior approaches that treat policy selection as a manual or loosely coupled task, because the domain-specific bundle association can be established in advance and later consumed by the runtime governance pipeline in a deterministic manner.

The interface 406 can additionally present a runtime object summary region that shows how configuration data maps to internal runtime constructs used by the telecommunications signaling governance system. By exposing items such as interconnect context mapping, carrier assignment associations, policy bundle references, reason-code profiles, and ledger destinations, the interface 406 can help align operator-entered configuration with the machine-executed runtime architecture. This relationship between configuration-layer inputs and execution-layer objects can be important because it reduces ambiguity about how stored domain settings will affect signaling treatment when the system later receives live signaling traffic.

The interface 406 can also include controls for saving domain settings, validating a policy-bundle assignment, and opening a runtime inspection view. A save operation can persist the selected configuration to one or more configuration stores or policy stores for later retrieval by the runtime governance system. A validation operation can verify that the selected compiled policy bundle is compatible with the configured domain attributes and is properly associated with the selected interconnect relationship. A runtime inspection operation can provide visibility into how the stored configuration is being used during actual session evaluation, thereby improving operator understanding of the connection between configuration and runtime enforcement.

The technical problem addressed by the interface 406 involves the challenge of accurately configuring domain-specific signaling governance in multi-carrier environments without introducing ambiguity, configuration drift, or inconsistent runtime behavior. Prior approaches often rely on fragmented configuration files, generalized carrier-level settings, or disconnected policy-management tools that do not clearly map configured parameters to the runtime decision path. As a result, it can be difficult to ensure that the correct policy artifact is applied to the correct signaling relationship at the correct time.

The configuration architecture presented in FIG. 3 can address this problem by organizing interconnect-domain settings into a unified operator-facing control surface that is directly tied to the runtime governance model. Because the interface 406 can define signaling peers, routing associations, carrier relationships, jurisdictional scope, compiled policy bundle references, and activation timing together within a single domain-specific view, the resulting configuration can be more precise, more auditable, and more compatible with deterministic runtime enforcement. This structured arrangement can improve the technical functioning of the overall system by reducing misconfiguration risk and by enabling reliable mapping from operator-defined domain settings to machine-executed evaluation and enforcement behavior.

From a subject-matter eligibility perspective, the interface 406 is not merely presenting abstract information or generalized administrative preferences. Instead, the interface 406 can be used to create and manage structured configuration data that directly controls operation of a telecommunications signaling governance system deployed between carrier networks. The stored settings can influence how signaling attributes are interpreted, how an interconnect governance domain is resolved, which compiled policy bundle is retrieved, and how signaling is later treated prior to downstream propagation. The configuration activity therefore has a concrete technical effect on runtime network control and forms part of a practical, machine-implemented solution to carrier interconnect signaling governance.

Figure 4:
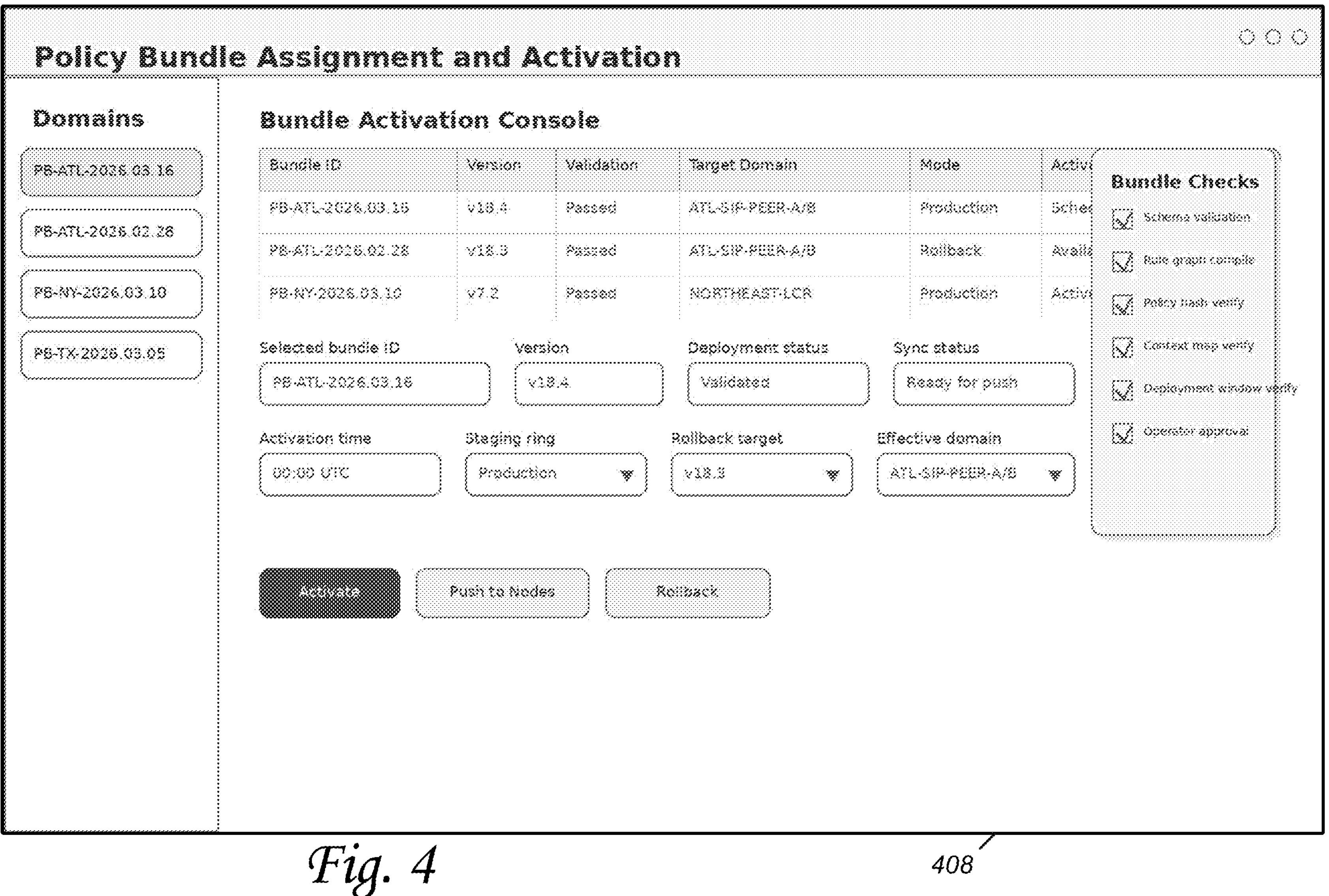
FIG. 4 illustrates one example of a policy bundle assignment and activation console including bundle selection, version control, validation status, deployment configuration, activation controls, and bundle verification checks for deploying a compiled interconnect policy bundle to a selected interconnect governance domain.

Referring to FIG. 4, there is illustrated one example of a policy bundle assignment and activation console 408 through which an operator can review, validate, stage, activate, distribute, and, when appropriate, roll back compiled interconnect policy bundles used by the telecommunications signaling governance system.

In an exemplary embodiment, the console 408 can present a selection region listing multiple compiled interconnect policy bundles available for deployment for the respective interconnect governance domains. A selected bundle can be displayed together with associated metadata such as version information, validation state, target domain, deployment mode, and current activation status. This arrangement can allow an operator to inspect not only which compiled policy artifact is available, but also whether that artifact is suitable for runtime use within a particular interconnect governance domain.

The console 408 can further include a bundle activation workspace in which the selected compiled interconnect policy bundle is associated with a chosen interconnect governance domain and prepared for deployment within the telecommunications signaling governance system. The workspace can present a selected bundle identifier, a version value, a deployment status indicator, a synchronization status indicator, an activation time setting, a staging-ring designation, a rollback target, and an effective domain assignment. In that manner, the console 408 can support controlled transition of governance logic from a prepared state into an active runtime state used by the signaling governance system during live session evaluation.

Unlike prior approaches that rely on static rule edits, manual file replacement, or loosely coordinated configuration updates, the console 408 can support a more technically disciplined deployment model in which a compiled interconnect policy bundle is validated and explicitly assigned before it becomes active. This can solve a significant operational problem in carrier signaling environments, namely that governance logic may need to be updated without introducing inconsistent treatment of signaling traffic across nodes, domains, or activation windows. By structuring the deployment process around compiled bundles and domain-specific activation controls, the present invention can help ensure that runtime governance remains consistent and deterministic during signaling processing, even as policies evolve over time.

The console 408 can also provide a validation region listing a series of bundle checks that are performed before activation. These checks can include schema validation, rule graph verification, policy hash verification, context mapping verification, deployment-window verification, and operator-approval confirmation. The purpose of these checks can be to ensure that the compiled interconnect policy bundle in machine-executable form is internally consistent, compatible with the selected interconnect governance domain, and correctly reflects governance conditions associated with that interconnect governance domain, and safe to distribute for runtime enforcement. This staged verification process can offer a technical advantage over prior approaches that may permit policy changes to be introduced without confirming compatibility between stored governance logic and actual runtime context resolution behavior.

In some implementations, the console 408 can include operator controls for activation, push-to-node distribution, and rollback. An activation control can cause the selected compiled interconnect policy bundle to become the active bundle associated with the selected interconnect governance domain. A push-to-nodes control can distribute the active or staged compiled interconnect policy bundle to one or more signaling enforcement nodes or governance evaluation instances operating within the telecommunications signaling governance system. A rollback control can re-associate the domain with an earlier compiled policy bundle version if an operational issue is detected after deployment. These controls can be particularly useful in distributed carrier environments where multiple runtime nodes must apply the same governance logic in a synchronized manner.

The console 408 can therefore serve as a bridge between policy preparation and live signaling governance. Once a compiled interconnect policy bundle is activated through the console 408, the runtime system can later retrieve that bundle based on a resolved interconnect context identifier and apply the bundle during evaluation of a communication session based on the interconnect context identifier corresponding to the interconnect governance domain. The activation and assignment process shown in FIG. 4 can thus be directly tied to later runtime steps involving policy bundle retrieval, dual-context qualification, deterministic evaluation, and signaling-layer enforcement. This relationship helps reinforce that the console 408 is not merely an administrative display, but part of a broader technical system for controlling telecommunications signaling behavior.

A further advantage of the console 408 is that it can support staged deployment and controlled activation timing. For example, a compiled interconnect policy bundle can be validated in advance, assigned to a staging ring, synchronized to distributed nodes, and then activated at a defined time window without interrupting ongoing signaling evaluation. This can reduce service disruption, avoid inconsistent node behavior, and allow governance changes to be introduced in a coordinated fashion. Prior approaches that depend on ad hoc policy replacement or unsynchronized updates may not provide this level of deployment control, especially in systems where signaling decisions must remain low-latency and reproducible across many concurrent communication sessions.

From a technical standpoint, the console 408 can facilitate generation and storage of structured deployment data that directly influences operation of the telecommunications signaling governance system. The selected bundle assignment, activation timing, synchronization state, and rollback relationships can all be stored in one or more machine-readable configuration structures that are later consumed by processors executing runtime enforcement logic. Those stored settings can determine which compiled policy artifact is retrieved for a given interconnect governance domain and when that artifact becomes effective for live signaling evaluation. The console 408 therefore contributes to the practical implementation of a domain-specific, compiled-policy-based signaling governance architecture.

FIG. 4 thus illustrates more than a general policy-management screen. It shows a concrete technical mechanism by which executable governance artifacts can be validated, assigned, staged, synchronized, activated, and rolled back within a telecommunications signaling governance system. Because the data and controls presented through the console 408 can directly affect runtime treatment of signaling messages exchanged between carrier networks, the functionality shown in FIG. 4 forms part of a machine-implemented network-control solution and can help support the technical character of the present invention for subject-matter eligibility purposes.

Figure 5:
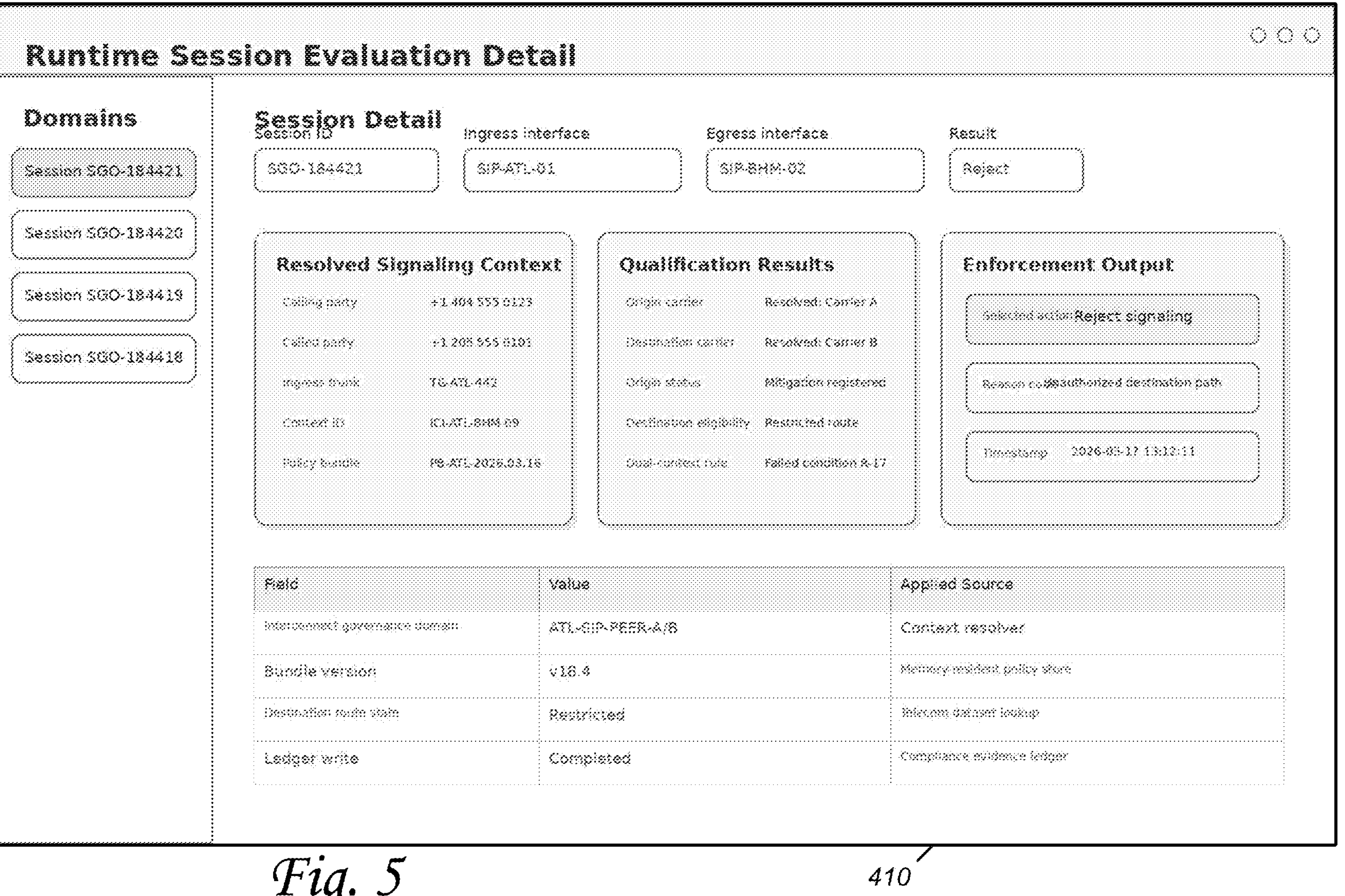
FIG. 5 illustrates one example of a runtime session evaluation detail interface, including session identification, resolved signaling context, qualification results, enforcement output, and associated data sources for inspecting governance evaluation outcomes for a communication session.

Referring to FIG. 5, there is illustrated one example of a runtime session evaluation interface 410 through which an operator can analyze and verify, in near real time or retrospectively, how a particular communication session was processed by the telecommunications signaling governance system.

In an exemplary embodiment, the interface 410 can present a session-focused view generated from runtime data structures of the telecommunications signaling governance system that includes a session identifier, signaling metadata, and a structured representation of the evaluated call context derived from an incoming signaling message. The interface 410 can display normalized calling and called party identifiers, signaling ingress and egress information, and one or more attributes derived from signaling headers. These values can correspond to the data populated within a session governance object during runtime processing and can reflect the same structured inputs used by the governance evaluation engine.

The interface 410 can further present a resolved interconnect context and associated domain information used during evaluation of the communication session. This can include a representation of the interconnect governance domain selected for the session based on the resolved interconnect context identifier and the compiled interconnect policy bundle applied during evaluation as determined from the interconnect context identifier. By exposing this mapping, the interface 410 can allow an operator to understand how signaling attributes were translated into a specific interconnect governance domain context and how that context influenced selection of governance rules.

In some implementations, the interface 410 can include a detailed evaluation results section that displays outcomes generated during application of the compiled interconnect policy bundle. These outcomes can include pass or fail indicators, rule-level evaluation states representing governance condition evaluation, and associated reason codes explaining why the communication session satisfied or failed particular governance conditions. The interface 410 can present these results in a structured and traceable format, enabling the operator to correlate evaluation logic with the underlying session attributes and dataset-derived values.

The interface 410 can also present a deterministic enforcement result derived from the evaluation of the compiled interconnect policy bundle associated with the communication session, such as allow, reject, throttle, or alternate handling. This enforcement result can be shown together with explanatory information indicating how the evaluation results led to the selected enforcement action. By linking evaluation outcomes to enforcement decisions, the interface 410 can provide a transparent view into the decision path executed by the telecommunications signaling governance system.

Unlike prior approaches that provide limited or fragmented visibility into signaling processing, the interface 410 can unify session data, context resolution, policy evaluation, and enforcement outcomes into a single, coherent display. This can address a technical problem in telecommunications systems where it is difficult to diagnose or verify how a signaling message was treated, particularly in environments involving multiple data sources, domain-specific policies, and real-time enforcement requirements.

The interface 410 can also include references to authoritative telecommunications datasets used during processing of the session. For example, the interface 410 can display carrier assignment information, portability results, jurisdiction classifications, and identity validation outcomes derived during the enrichment stage. By presenting these dataset-derived attributes used in governance evaluation alongside evaluation results, the interface 410 can allow operators to verify that external data inputs were correctly incorporated into the governance decision.

In an exemplary embodiment, the interface 410 can support filtering, search, and navigation features that allow operators to locate specific sessions or groups of sessions based on identifiers, time ranges, enforcement outcomes, or domain associations. This capability can be useful for troubleshooting, performance monitoring, and compliance analysis, particularly in high-volume signaling environments.

From a technical perspective, the interface 410 provides a mechanism for exposing internal runtime data structures and processing outcomes generated by the telecommunications signaling governance system within an interconnect governance domain. The data presented through the interface 410 can be sourced from session governance objects, evaluation outputs, and compliance evidence records stored within the system. By presenting this data in a structured and correlated manner, the interface 410 can facilitate understanding of system behavior and support verification of deterministic enforcement logic.

The runtime session evaluation interface 410, therefore, represents a concrete tool that interacts with underlying system components to retrieve, organize, and display data associated with processing of communication sessions within interconnect governance domains. The information presented is not merely descriptive, but is derived from machine-executed operations that influence signaling control between carrier networks. As such, the interface 410 contributes to a practical, technical solution for monitoring and validating signaling governance behavior within the telecommunications signaling governance system.

Figure 6:
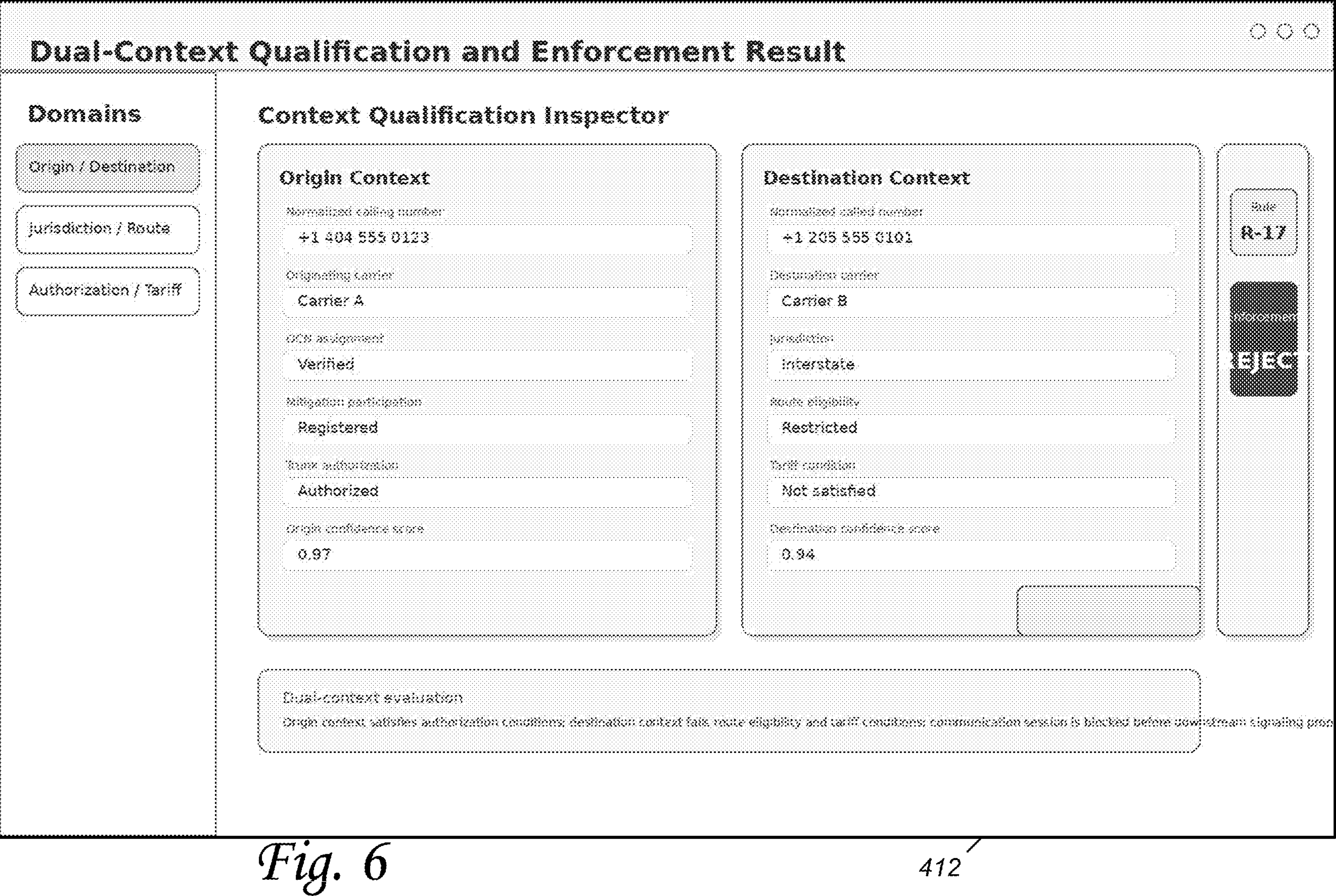
FIG. 6 illustrates one example of a dual-context qualification and enforcement interface, including an origin context, a destination context, and a rule-based enforcement result generated from evaluation of both contexts against a compiled interconnect policy bundle.

Referring to FIG. 6, there is illustrated one example of a dual-context qualification and enforcement interface 412 through which an operator can visualize how a communication session is evaluated using both an origin context and a destination context prior to application of a deterministic governance enforcement action.

In an exemplary embodiment, the interface 412 can present a side-by-side or otherwise coordinated display of an origin context and a destination context derived from signaling attributes and authoritative telecommunications dataset results associated with a communication session. The origin context can include normalized attributes associated with a calling party identifier, such as originating carrier identity, authorization status, mitigation participation, and other dataset-derived attributes. The destination context can include normalized attributes associated with a called party identifier, such as destination carrier identity, jurisdiction classification, routing eligibility, and tariff-related parameters. These context values can correspond to structured data fields populated within a session governance object during runtime processing.

The interface 412 can further present a rule evaluation region in which governance conditions defined within a compiled interconnect policy bundle associated with an interconnect governance domain are applied to both the origin context and the destination context. Each rule can reference one or more attributes from the origin context, the destination context, or both, and can produce a rule-level evaluation result. The interface 412 can display these results in a structured manner, such as pass or fail indicators accompanied by reason codes or descriptive outputs, thereby enabling the operator to trace how each rule contributes to the overall qualification outcome.

Unlike prior approaches that evaluate communication sessions based primarily on a single-sided view of signaling data without reference to interconnect-specific governance domains, the interface 412 reflects a technical implementation in which the system performs coordinated evaluation across two independently derived contexts. This dual-context approach addresses a limitation in systems that may rely only on originating-side checks or destination-side checks, which can allow partially compliant sessions to proceed. By requiring that both the origin context and the destination context satisfy applicable governance conditions, the telecommunications signaling governance system can enforce more precise and reliable control over signaling behavior.

The interface 412 can also present an aggregated qualification result that reflects whether the combined evaluation of the origin context and destination context satisfies the compiled interconnect policy bundle. This aggregated result is determined through a deterministic combination of rule-level outcomes, such as requiring that all mandatory conditions be satisfied or applying predefined logical relationships between rule results. The interface 412 can display this aggregated qualification result in a clear and interpretable form, providing immediate visibility into whether the communication session meets governance requirements.

In addition, the interface 412 can present a resulting enforcement action applied prior to downstream signaling propagation associated with the communication session, such as allow, reject, throttle, or alternate handling. The enforcement action can be directly linked to the aggregated qualification result, illustrating how the outcome of the dual-context evaluation drives signaling control decisions. This linkage can provide a transparent mapping between evaluation logic and enforcement behavior, enabling operators to understand and verify how the system arrives at a particular signaling outcome.

The dual-context qualification and enforcement interface 412 addresses a technical challenge associated with validating and troubleshooting complex governance logic that depends on multiple data sources and contextual factors. Prior approaches may not provide a unified view of how origin-side and destination-side attributes interact during evaluation, making it difficult to diagnose incorrect or unexpected enforcement outcomes. By presenting both contexts and their combined evaluation within a single interface, the present invention improves visibility and supports more effective analysis of signaling governance behavior.

From a systems perspective, the interface 412 can retrieve data from runtime components including the session governance object, authoritative dataset resolution outputs, and policy evaluation results. The interface 412 can organize this data into a coherent representation that reflects the actual processing performed by the telecommunications signaling governance system. This organization can facilitate debugging, validation, and optimization of governance policies and system configuration.

The interface 412, therefore, provides a concrete and technically meaningful representation of the dual-context qualification process executed by the telecommunications signaling governance system. By exposing structured origin and destination contexts, rule-level evaluation results, aggregated qualification outcomes, and corresponding enforcement actions, the interface 412 demonstrates how the system performs coordinated, deterministic evaluation of signaling data to control communication sessions between carrier networks. This functionality contributes to a practical implementation that enhances the operation and observability of signaling governance systems.

Figure 7:
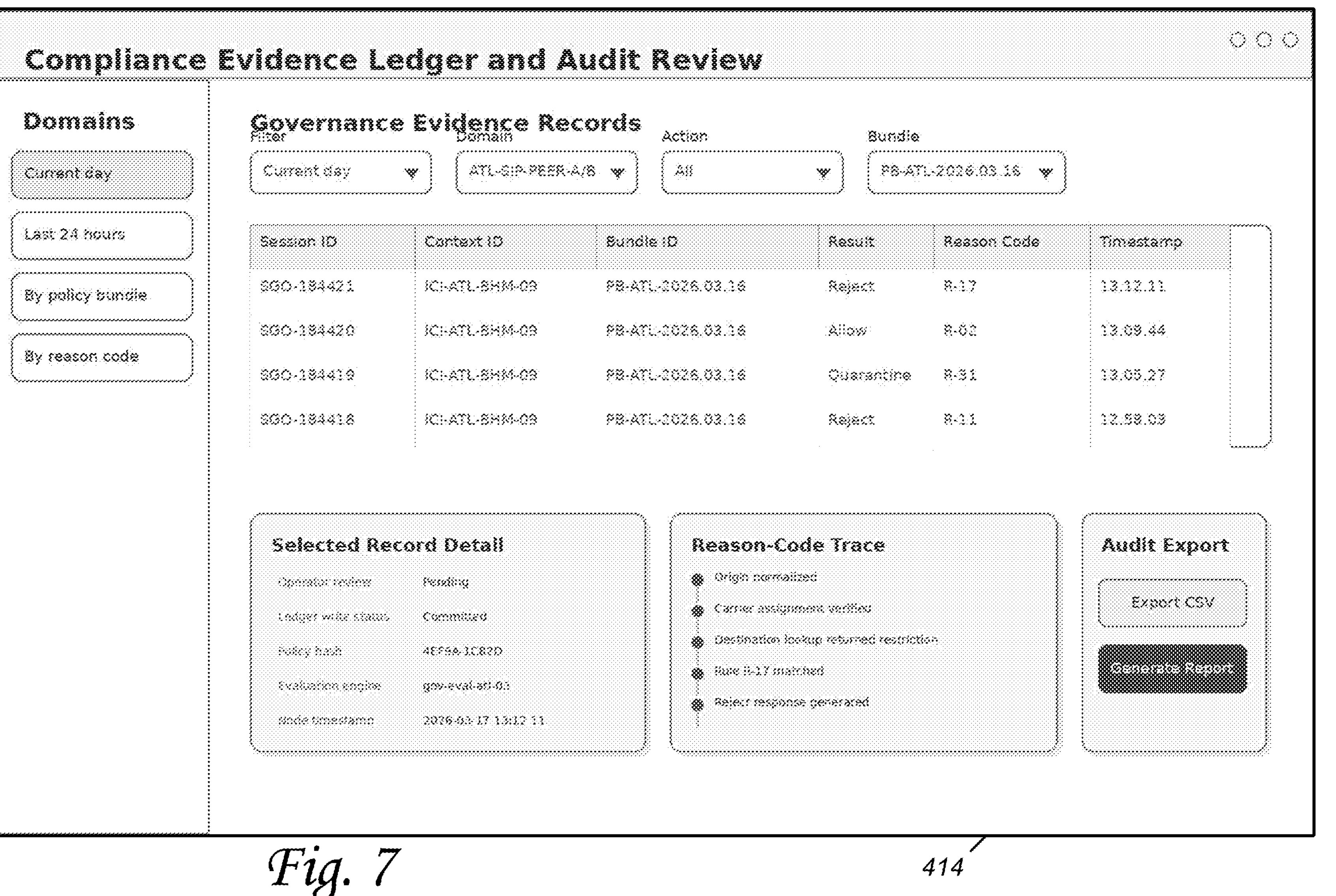
FIG. 7 illustrates one example of a compliance evidence ledger and audit review interface, including governance evidence records, filtering controls, selected record detail, reason-code trace information, and export functionality for auditing governance decisions.

Referring to FIG. 7, there is illustrated one example of a compliance evidence ledger and audit interface 414 through which an operator or authorized system can review, filter, and analyze governance records generated by the telecommunications signaling governance system during runtime processing of communication sessions.

In an exemplary embodiment, the interface 414 can present a ledger view that includes a plurality of governance event records corresponding to previously processed communication sessions. Each record can include structured data such as a session identifier, a timestamp, an interconnect context identifier corresponding to an interconnect governance domain, a policy bundle identifier, an evaluation outcome, an enforcement action, and one or more associated reason codes. These records can be generated as part of the execution of deterministic governance enforcement actions to a compliance evidence ledger during execution of deterministic governance enforcement actions.

The interface 414 can further include filtering and search controls that allow an operator to query governance event records based on criteria such as time ranges, carrier identifiers, enforcement outcomes, policy bundle versions, or domain associations. By enabling targeted retrieval of records, the interface 414 can support efficient investigation of specific signaling events or broader analysis of system behavior across multiple communication sessions.

In some implementations, the interface 414 can present a detailed record inspection view in which a selected governance event record is expanded to show additional context. This expanded view can include data elements corresponding to the original call context, resolved interconnect context, dataset-derived attributes, rule-level evaluation results, and enforcement reasoning. The interface 414 can therefore provide visibility not only into the final outcome of a governance decision but also into the underlying factors that contributed to that outcome.

Unlike prior approaches that rely on fragmented logs or unstructured event data without interconnect-domain-specific governance context, the interface 414 can present governance records in a normalized and correlated format that reflects the structured processing pipeline of the telecommunications signaling governance system. This can address a technical limitation in telecommunications environments where it is difficult to reconstruct how a signaling decision was made due to lack of consistent record structure or insufficient linkage between data sources.

The interface 414 can also support traceability by associating governance event records with specific compiled interconnect policy bundles associated with interconnect governance domains as determined from the interconnect context identifier and domain configurations. This association can allow an operator to determine which governance rules were in effect at the time of a communication session and how those rules influenced the resulting enforcement action. Such traceability can be particularly important for regulatory compliance and inter-carrier contractual enforcement, inter-carrier dispute resolution, and internal auditing processes.

In an exemplary embodiment, the interface 414 can include export or reporting functionality that enables governance event records to be transmitted to external systems or formatted into compliance reports. This functionality can support integration with regulatory reporting tools, data analytics platforms, or archival systems, thereby extending the utility of the compliance evidence ledger beyond real-time inspection.

The compliance evidence ledger and audit interface 414 addresses a technical problem associated with maintaining verifiable, consistent, structured, and queryable governance records of signaling governance decisions in high-volume carrier environments. Prior approaches may generate logs that are difficult to correlate, incomplete, or not aligned with the actual decision-making logic executed at runtime. By storing structured governance event records and presenting them through an organized interface, the present invention enables accurate reconstruction of signaling treatment and supports validation of system behavior.

From a systems perspective, the interface 414 can interact with a compliance evidence ledger that is implemented as a persistent data store, potentially distributed and append-only, in which governance event records are written at the time of enforcement. The interface 414 can query this ledger, retrieve relevant records, and present them in a structured format that reflects the relationships between session data, policy evaluation, and enforcement outcomes.

The interface 414, therefore, represents a concrete and technically grounded component of the telecommunications signaling governance system that facilitates inspection, verification, and analysis of runtime governance behavior. By enabling structured access to governance event records that directly correspond to machine-executed evaluation and enforcement processes, the interface 414 contributes to a practical implementation that improves transparency, auditability, and operational reliability of signaling governance across carrier networks.

Figure 8:
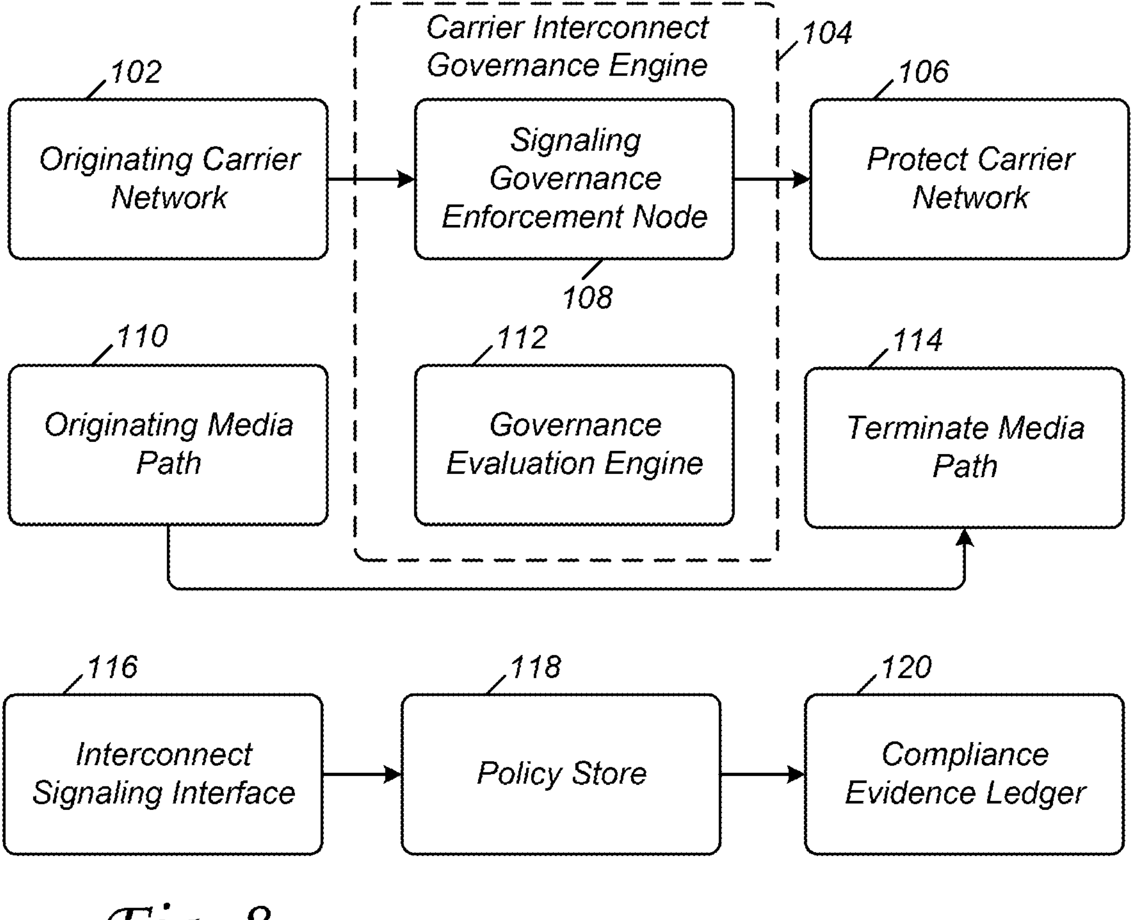
FIG. 8 illustrates one example of an overall deployment of a telecommunications signaling governance system positioned between a first carrier network and a second carrier network, including a signaling enforcement node, a governance evaluation engine, an interconnect signaling interface, a policy store, and a compliance evidence ledger, in which signaling associated with a communication session is intercepted and evaluated while a media path remains external to the governance system.

FIG. 8 there is illustrated one example of a telecommunications signaling governance system 100 deployed between an originating carrier network 102 and a protected carrier network 104, in which signaling associated with the establishment of a communication session is intercepted, evaluated, and governed prior to downstream propagation, while a media path may remain external to the governance system.

In an exemplary embodiment, the telecommunications signaling governance system 100 can include a signaling enforcement node 106 coupled to an interconnect signaling interface 108 that is configured to receive a signaling message associated with a communication session originating from the originating carrier network 102. The signaling enforcement node 106 can be positioned logically inline with a signaling path 110 such that signaling messages traverse the signaling enforcement node 106 prior to reaching the protected carrier network 104, while an originating media path 112 and a terminating media path 114 can bypass the signaling enforcement node 106 and flow directly between the carrier networks. This separation of signaling and media paths provides a technical architecture in which governance actions can be deterministically applied at the signaling layer without introducing latency or disruption to media transport.

In an exemplary embodiment, the signaling enforcement node 106 can include or be coupled to a governance evaluation engine 116 that is configured to process signaling messages received via the interconnect signaling interface 108. The governance evaluation engine 116 can be further coupled to a policy store 118 and a compliance evidence ledger 120. The policy store 118 can maintain compiled interconnect policy bundles that are associated with respective interconnect governance domains, while the compliance evidence ledger 120 can record evaluation outcomes, enforcement actions, and associated metadata generated during processing of signaling messages.

In operation, the signaling enforcement node 106 can receive a signaling message associated with the establishment of a communication session and can extract a call context comprising a calling party identifier and a called party identifier, along with signaling attributes such as ingress interface, peer identity, signaling path metadata, and network addressing information, including interconnect attributes derived from interconnect attributes rather than signaling content. The governance evaluation engine 116 can utilize these attributes to resolve an interconnect context identifier corresponding to a specific interconnect governance domain representing a defined interconnect boundary between carrier networks that represents a traffic exchange relationship between the originating carrier network 102 and the protected carrier network 104. This domain-specific resolution addresses a technical problem present in prior approaches, where signaling governance is applied generically without regard to the specific interconnect relationship, resulting in inconsistent or inaccurate enforcement across different carrier pairings.

In an exemplary embodiment, once the interconnect governance domain is resolved based on the interconnect context identifier, the governance evaluation engine 116 can retrieve, from the policy store 118, a compiled interconnect policy bundle associated with the interconnect governance domain and corresponding to the interconnect governance domain. The compiled interconnect policy bundle can represent an executable, pre-processed set of governance conditions that are optimized for low-latency evaluation during runtime. By utilizing compiled policy artifacts rather than static or interpretive rule sets, the telecommunications signaling governance system 100 can perform deterministic evaluation within signaling protocol timing constraints, thereby overcoming limitations of prior approaches that rely on external or asynchronous policy evaluation mechanisms.

In an exemplary embodiment, the governance evaluation engine 116 can further determine carrier assignment and governance attributes using authoritative telecommunications datasets, and can evaluate the extracted call context against the compiled interconnect policy bundle to determine whether the communication session satisfies domain-specific governance conditions. Based on this evaluation, the signaling enforcement node 106 can apply a deterministic signaling-layer governance enforcement action at the signaling layer prior to forwarding the signaling message toward the protected carrier network 104. Such enforcement actions can include allowing the communication session to proceed, rejecting the session, throttling signaling, or otherwise controlling signaling propagation in a manner that protects the downstream network.

The technical implementation illustrated in FIG. 8 provides several advantages over prior approaches. By positioning the telecommunications signaling governance system 100 inline with the signaling path 110 at an interconnect boundary between carrier networks and upstream of the protected carrier network 104, enforcement actions can be applied before the signaling message reaches downstream network elements, thereby preventing invalid or non-compliant signaling from consuming network resources or triggering undesired session establishment procedures. Additionally, by maintaining a separation between the signaling path 110 and the media paths 112 and 114, the system can govern signaling behavior without requiring media anchoring, thereby preserving network efficiency and scalability.

In an exemplary embodiment, the compliance evidence ledger 120 can record a governance record for each evaluated communication session, including the interconnect context identifier, an identifier of the compiled interconnect policy bundle retrieved from the policy store 118, evaluation results, enforcement actions, reason codes, and timestamps. This persistent recording of evaluation data provides an auditable and verifiable record of signaling governance decisions, enabling traceability and accountability that are not achievable in prior approaches that lack integrated runtime logging mechanisms.

From a technical perspective, the telecommunications signaling governance system 100 transforms a received signaling message into a governed signaling outcome based on interconnect-domain-specific governance conditions through a structured sequence of operations that include context extraction, domain resolution, compiled policy retrieval, data-driven evaluation, and deterministic enforcement. This transformation is performed within the signaling plane and prior to downstream propagation, thereby improving the functioning of telecommunications networks by reducing invalid signaling traffic, enforcing carrier-specific governance constraints, and ensuring consistent application of interconnect policies.

Accordingly, the arrangement illustrated in FIG. 8 is not merely an abstract evaluation of rules, but rather a concrete, machine-implemented system that operates on signaling messages at a protocol level, utilizes domain-specific compiled policy artifacts, and produces a controlled signaling output at an interconnect boundary that directly affects network operation. This provides a technical solution to the problem of inconsistent and non-deterministic signaling governance in inter-carrier communication environments.

Figure 9:
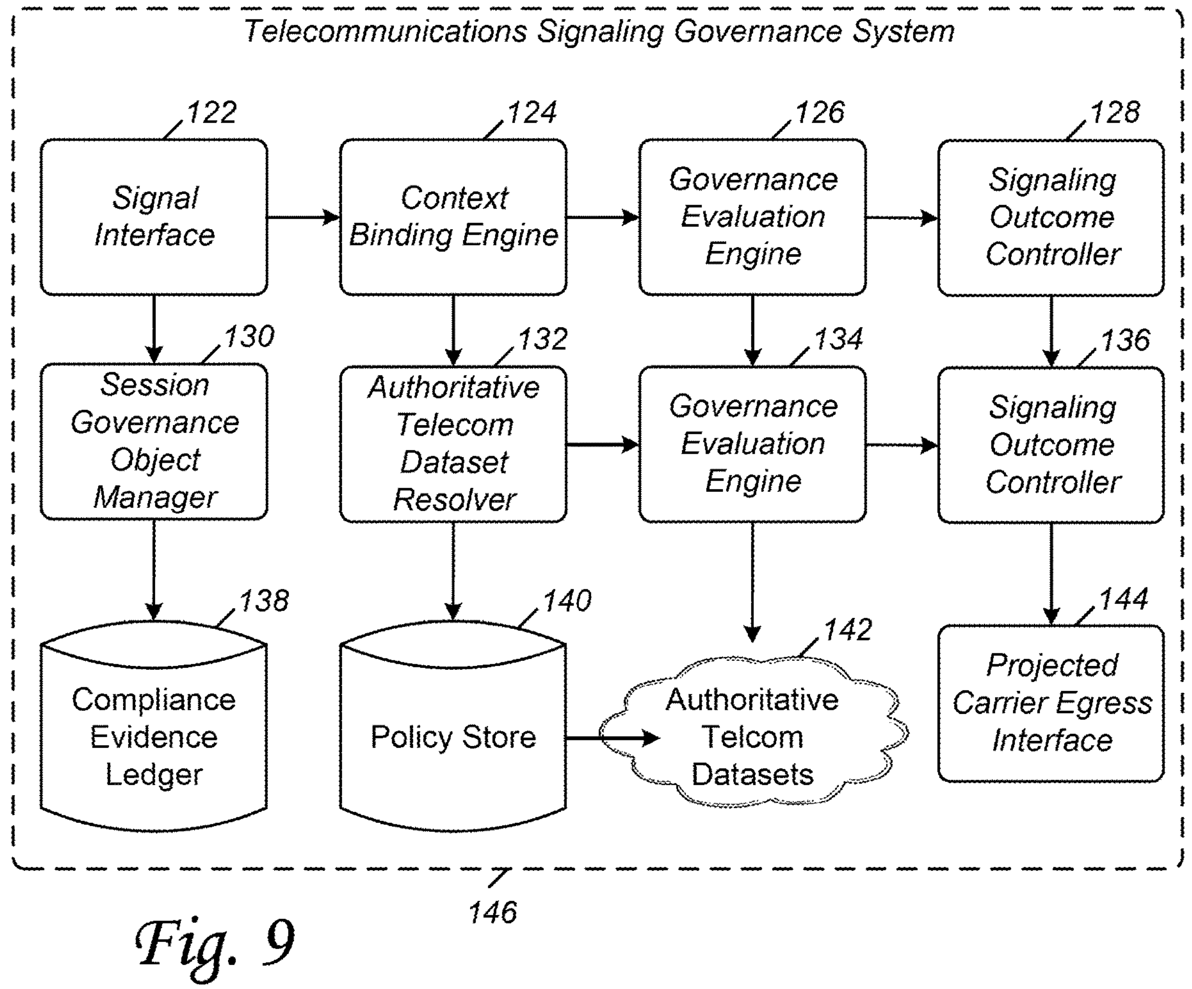
FIG. 9 illustrates one example of an internal architecture of the telecommunications signaling governance system, including a signaling interface, a context binding engine, a governance evaluation engine, a session governance object manager, an authoritative telecommunications dataset resolver, a signaling outcome controller, a policy store, and a compliance evidence ledger, configured to perform runtime evaluation and enforcement of signaling messages.

Referring to FIG. 9, there is illustrated one example of an internal architecture of a telecommunications signaling governance system 122, including a signaling interface 124, a context binding engine 126, a governance evaluation engine 128, a signaling outcome controller 130, a session governance object manager 132, an authoritative telecom dataset resolver 134, a compliance evidence ledger 136, a policy store 138, authoritative telecom datasets 140, and a projected carrier egress interface 146, arranged to perform signaling governance and enforcement during active session handling.

In an exemplary embodiment, the signaling interface 124 can be configured to receive a signaling message associated with establishment of a communication session and to normalize the signaling message into a structured format suitable for internal processing. The signaling interface 124 can extract signaling attributes such as a calling party identifier, a called party identifier, peer identity, route metadata, interface identifiers, and network addressing information, and can provide these attributes to the context binding engine 126 and the session governance object manager 132. In this architecture, such attributes are used to support interconnect context resolution and governance evaluation, which are performed independently of routing selection functions that may be implemented by separate network elements or, in some embodiments, integrated as a complementary capability. This initial transformation of raw signaling data into structured, machine-processable inputs addresses a technical limitation in prior approaches where signaling messages are processed in an ad hoc or protocol-specific manner without a unified internal representation.

In an exemplary embodiment, the session governance object manager 132 can instantiate a session governance object upon receipt of the signaling message and can populate the session governance object with the extracted signaling attributes. The session governance object can serve as a persistent, structured data construct that is updated throughout the lifecycle of the signaling evaluation process, thereby enabling coordinated processing across multiple subsystems without loss of state or context. This persistent object-based architecture provides a technical improvement over prior approaches that rely on stateless or loosely coupled processing stages, which can result in inconsistent or incomplete evaluation outcomes.

In an exemplary embodiment, the context binding engine 126 can receive signaling attributes from the signaling interface 124, including interconnect attributes independent of signaling payload data, and can determine an interconnect context identifier corresponding to an interconnect governance domain associated with a traffic exchange relationship representing an interconnect boundary between carrier networks. The context binding engine 126 can evaluate combinations of ingress interface identifiers in a deterministic multi-factor evaluation process, peer identities, route metadata, network domains, and carrier pair relationships to resolve the interconnect context identifier. This domain-specific binding provides a technical mechanism for associating each signaling message with a precise interconnect scope, thereby enabling governance rules to be applied in a contextually accurate manner, rather than relying on generalized or global rule sets as seen in prior approaches.

In an exemplary embodiment, the authoritative telecom dataset resolver 134 can access one or more authoritative telecom datasets 140, which may include numbering assignment records, local number portability data, routing databases, carrier identity registries, mitigation status repositories, and jurisdictional datasets. The authoritative telecom dataset resolver 134 can determine carrier assignment, identity validation, routing eligibility, and other governance attributes associated with the calling party identifier and the called party identifier. The resolved data can be written into the session governance object and provided to the governance evaluation engine 128. This integration of authoritative external datasets into the runtime evaluation pipeline provides a technically grounded basis for decision-making, addressing a key deficiency of prior approaches that rely on incomplete or static data sources.

In an exemplary embodiment, the governance evaluation engine 128 can retrieve, from the policy store 138, a compiled interconnect policy bundle associated with the interconnect context identifier determined by the context binding engine 126. The policy store 138 can be implemented as a high-performance, low-latency storage system that enables rapid retrieval of compiled policy bundles during signaling processing. The governance evaluation engine 128 can evaluate the session governance object against the compiled interconnect policy bundle, including performing dual-context qualification based on origin and destination attributes. By utilizing compiled, executable policy artifacts, the governance evaluation engine 128 can perform deterministic and repeatable evaluations within the timing constraints of signaling protocols, overcoming limitations of prior approaches that depend on interpreted or external rule evaluation.

In an exemplary embodiment, the signaling outcome controller 130 can receive evaluation results from the governance evaluation engine 128 and can generate a deterministic governance enforcement action that is applied to the signaling message prior to transmission through the projected carrier egress interface 146. The signaling outcome controller 130 can generate signaling-layer responses such as allow, reject, throttle, or divert signaling to a specialized handling path, and can modify or terminate signaling messages accordingly. This pre-propagation enforcement ensures that only compliant signaling messages are forwarded toward the protected carrier network, thereby improving network integrity and reducing exposure to invalid or unauthorized session establishment attempts.

In an exemplary embodiment, the compliance evidence ledger 136 can record a comprehensive governance record for each evaluated signaling message, including the interconnect context identifier, a policy bundle identifier, evaluation results, enforcement decisions, reason codes, and timestamps. The compliance evidence ledger 136 can be structured to support query, audit, and reporting functions, thereby providing a verifiable record of signaling governance operations. This persistent recording of evaluation outcomes provides a technical advantage over prior approaches that lack integrated, system-level auditability.

The architecture illustrated in FIG. 9 demonstrates a tightly integrated system in which each component performs a specific technical function within a coordinated runtime pipeline. The signaling interface 124 transforms incoming signaling messages into structured data, the context binding engine 126 resolves interconnect-specific domains, the authoritative telecom dataset resolver 134 enriches the session with validated external data, the governance evaluation engine 128 executes compiled policy logic, and the signaling outcome controller 130 applies deterministic enforcement actions. The session governance object managed by the session governance object manager 132 provides continuity across these stages, ensuring that data flows coherently through the system.

From a technical standpoint, this architecture provides a concrete implementation that improves the functioning of telecommunications networks by enabling real-time, domain-specific governance of signaling traffic. The system performs a sequence of machine-executed transformations on signaling data, grounded in authoritative datasets and compiled policy artifacts, to produce a controlled signaling outcome. This constitutes a practical application of computing technology within a telecommunications environment, rather than an abstract evaluation of rules, and provides a robust foundation for addressing potential subject matter eligibility concerns.

Figure 10:
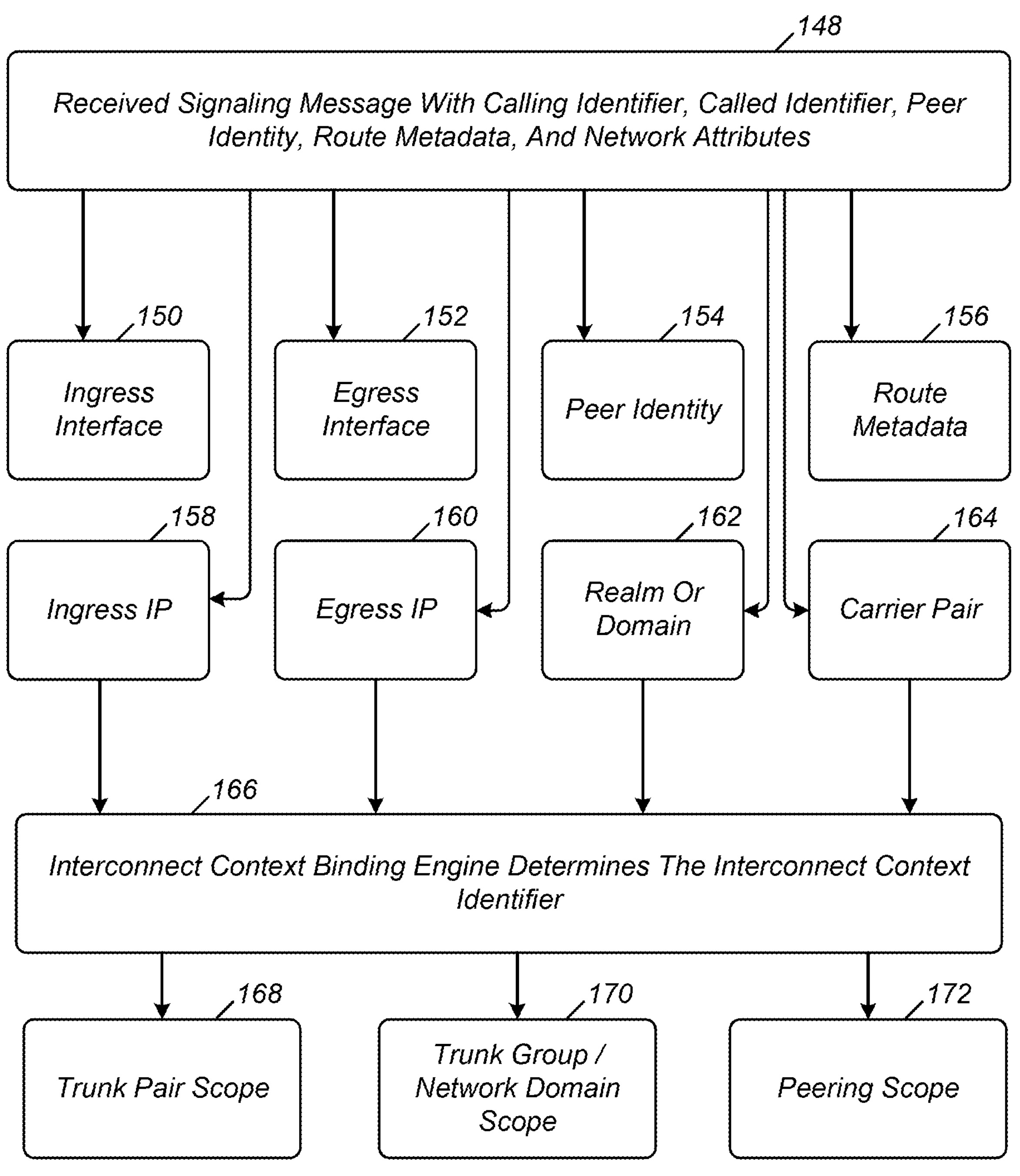
FIG. 10 illustrates one example of an interconnect context binding process in which signaling attributes, including a calling party identifier, a called party identifier, peer identity, route metadata, and network attributes, are used to determine an interconnect context identifier corresponding to an interconnect governance domain associated with a traffic exchange relationship between carrier networks.

Referring to FIG. 10, there is illustrated one example of an interconnect context binding process 148 in which a received signaling message 166 is analyzed and transformed to determine an interconnect context identifier corresponding to an interconnect governance domain, based on signaling-derived attributes, network topology indicators, and interconnect relationship characteristics.

In an exemplary embodiment, the received signaling message 166 can include a calling identifier 168, a called identifier 170, a peer identity 172, route metadata 152, and additional network attributes such as interface identifiers, transport-layer addressing, and signaling header fields. The signaling message 166 can be received via an ingress interface 150 and associated with a projected egress interface 154, each of which provides concrete, machine-readable indicators of how the signaling message traverses the telecommunications network. These attributes are not merely descriptive but can be used as structured inputs to a deterministic binding process that resolves the signaling event to a specific interconnect governance domain.

In an exemplary embodiment, the interconnect context binding process 148 can be executed by a context binding engine that evaluates multiple dimensions of the signaling message in parallel or in a staged sequence. The engine can extract and normalize peer identity 172, route metadata 152, ingress IP realm or domain 160, and egress IP domain or carrier pair 162, and can correlate these attributes with known interconnect configurations. The context binding engine can further evaluate scope definitions, including trunk pair scope 156, trunk group or routing realm scope 164, and peering scope 154, each of which can represent a different level of abstraction of the carrier interconnect relationship.

In an exemplary embodiment, the context binding engine can implement a hierarchical resolution model applied in a deterministic manner in which candidate interconnect governance domains are evaluated according to specificity and matching confidence. For example, a trunk pair scope 156, representing a specific physical or logical interconnect between two carriers, can be assigned a higher priority than a trunk group or routing realm scope 164, which may represent a broader routing configuration. Similarly, a peering scope 154 may represent an even higher-level abstraction that applies when more granular matches are not available. The engine can apply deterministic selection logic to choose the most specific applicable interconnect governance domain, thereby ensuring that governance rules are applied with precision aligned to the actual signaling path.

In an exemplary embodiment, the interconnect context binding process 148 can include correlation of route metadata 152 with known routing configurations and evaluation of ingress interface 150 and egress interface 154 identifiers to determine whether the signaling message traverses a known trunk group, a defined carrier pair, or a specific peering arrangement. The binding engine can also evaluate combinations of attributes, such as pairing peer identity 172 with ingress IP realm or domain 160, to disambiguate scenarios where individual attributes alone would not uniquely identify an interconnect governance domain. This multi-factor evaluation provides a technical mechanism for resolving ambiguity and ensures that the resulting interconnect context identifier accurately reflects the real-world traffic exchange relationship.

In an exemplary embodiment, the interconnect context binding process 148 can generate the interconnect context identifier as a structured value or key that is written into a session governance object and used to index into a policy store to retrieve a compiled interconnect policy bundle associated with the interconnect governance domain. The interconnect context identifier can therefore function as a direct linkage between the physical and logical characteristics of the signaling event and the executable governance logic applied during runtime evaluation. This tight coupling between context resolution and policy execution provides a deterministic and reproducible mapping that is not achievable in prior approaches that rely on loosely defined or manually configured rule associations.

In an exemplary embodiment, the context binding engine can operate in a protocol-agnostic manner, allowing the same binding logic to be applied across signaling protocols while relying on normalized representations of signaling attributes. This abstraction layer enables consistent domain resolution even in heterogeneous network environments and avoids dependency on protocol-specific parsing logic that can introduce variability or inconsistency in prior approaches.

The interconnect context binding process 148 addresses a technical problem in telecommunications systems where signaling governance decisions are often applied without precise knowledge of the specific interconnect relationship through which a signaling message is conveyed, and instead rely on signaling message content or static rule sets. Prior approaches may apply global or carrier-wide rules that do not account for differences between trunk pairs, routing realms, or peering agreements, leading to inconsistent enforcement and potential misclassification of signaling events. By contrast, the present invention uses concrete signaling attributes, interface-level identifiers, and routing metadata to derive a context-specific identifier that anchors subsequent evaluation to a defined interconnect governance domain.

From a systems perspective, the interconnect context binding process 148 can be viewed as a transformation stage that converts raw signaling data into an interconnect-domain-specific governance context that drives downstream processing. This transformation involves structured parsing, attribute normalization, multi-factor correlation, hierarchical evaluation, and deterministic selection of a context identifier. The resulting interconnect context identifier is not an abstract label but a machine-generated value that directly controls retrieval of a compiled interconnect policy bundle and influences the enforcement outcome applied to the signaling message.

In an exemplary embodiment, the interconnect context binding process 148 can further support extensibility by allowing additional attributes or scopes to be incorporated into the binding logic without altering existing interconnect governance domain mappings. For example, additional scope definitions or metadata sources can be introduced to refine context resolution in evolving network environments. This extensibility provides a technical advantage over rigid rule-based systems that require manual reconfiguration when network topology or interconnect relationships change.

Accordingly, the arrangement illustrated in FIG. 10 provides a technically grounded mechanism for resolving a signaling message to a specific interconnect governance domain using concrete signaling attributes and network-derived data. This mechanism enables precise, deterministic, and reproducible context binding that supports downstream evaluation and enforcement, improves the functioning of telecommunications signaling systems, and provides a non-abstract, machine-implemented solution that strengthens the technical character of the present invention.

Referring to FIG. 11, there is illustrated one example of a deterministic session governance evaluation lifecycle 174 in which a received signaling event is progressively processed through a sequence of runtime stages including ingress signal event receipt 176, session governance object creation 178, interconnect context binding 180, carrier assignment resolution 182, policy bundle lookup 184, dual-context qualification 186, policy evaluation 188, and deterministic governance enforcement 190, with associated governance data such as call context 192, interconnect context identifier and interconnect governance domain data 194, carrier assignment data 196, policy bundle data 198, reason codes 200, and timestamps 202 being accumulated and preserved across the lifecycle.

In an exemplary embodiment, FIG. 11 can illustrate how the telecommunications signaling governance system can transform a raw ingress signaling event receipt 176 into a governed signaling outcome through a technically ordered, machine-executed pipeline executed in a deterministic sequence rather than through a detached or post-event policy review. The lifecycle 174 can begin when a signaling message associated with the establishment or attempted establishment of a communication session is received at an ingress interface and made available for runtime processing. At this initial stage, the system can extract signaling-layer data sufficient to form the call context 192, which can include at least a calling party identifier, a called party identifier, and one or more signaling attributes indicative of how the signaling message entered the system and how the signaling message may be routed onward. This initial receipt stage can solve the technical problem of capturing signaling state early enough to permit governance before downstream propagation, which prior approaches often fail to do when they rely on later-stage monitoring or retrospective analytics.

In an exemplary embodiment, following ingress signal event receipt 176, the system can instantiate a session governance object at stage 178. The session governance object can be a persistent, structured runtime data construct used to coordinate execution across lifecycle stages that can carry forward state information derived from the signaling event as the communication session moves through subsequent processing stages. Rather than requiring each downstream subsystem to independently reconstruct session information from raw signaling traffic, the session governance object can centralize the accumulating runtime state and can provide a shared machine-readable data structure accessible to context binding, carrier assignment, policy retrieval, qualification, evaluation, and enforcement components. This object-centric lifecycle can address technical shortcomings of prior approaches in which state fragmentation across loosely coupled modules can produce inconsistent results, repeated lookup operations, or incomplete audit trails.

In an exemplary embodiment, at interconnect context binding stage 180, the system can process interconnect attributes, including interconnect-level attributes derived from network context, to determine the interconnect context identifier and interconnect governance domain data representing an interconnect boundary between carrier networks 194 associated with the traffic exchange relationship relevant to the signaling message. This stage can use concrete signaling attributes and network path indicators to select a governance domain that is specific to the actual interconnect relationship implicated by the communication session. By performing this resolution as an explicit runtime stage in the lifecycle 174, the system can avoid generalized policy application and instead can anchor subsequent governance logic to a domain-specific context. This can solve a technical problem present in prior approaches where governance actions are applied using broad carrier-level rules that do not account for the actual ingress and egress relationship reflected in the current signaling event.

In an exemplary embodiment, the carrier assignment resolution stage 182 can obtain or derive carrier assignment data 196 associated with at least one of the calling party identifier or the called party identifier. This stage can use authoritative telecommunications datasets and normalized identifiers to resolve originating carrier identity, terminating carrier identity, portability implications, jurisdictional attributes, mitigation status, or other network-relevant information that bears on session qualification. The carrier assignment resolution stage 182 can therefore enrich the lifecycle 174 with externally validated technical data that can be used downstream to produce consistent and reproducible enforcement outcomes. The use of authoritative data at this stage can solve the technical problem of incomplete or stale local assumptions about number ownership, routing entitlement, or regulatory status, which can otherwise lead to improper signaling propagation.

In an exemplary embodiment, the policy bundle lookup stage 184 based on the interconnect context identifier can retrieve policy bundle data 198 corresponding to the interconnect context identifier and associated interconnect governance domain resolved at stage 180. The retrieved policy bundle can be a compiled interconnect policy bundle, meaning an executable or machine-efficient governance artifact that can be consumed by the runtime evaluation pipeline without requiring interpretive policy generation during live signaling handling. This stage can provide a significant technical benefit because it can reduce runtime computational overhead and latency by decoupling policy compilation from signaling-time enforcement. Prior approaches that rely on interpreted rule processing, off-box lookups, or manually assembled rule chains may not achieve the deterministic timing and repeatability needed for carrier-scale signaling control.

In an exemplary embodiment, the dual-context qualification stage 186 can independently develop and assess origin-related and destination-related aspects of the communication session using the accumulated call context 192, carrier assignment data 196, and policy bundle data 198. The dual-context qualification stage 186 can determine whether the originating side of the communication session derived from signaling attributes and authoritative telecommunications dataset results satisfies one or more governance conditions and whether the destination side of the communication session separately satisfies one or more governance conditions. This stage can solve a technical problem in prior approaches that treat a communication session as a single undifferentiated event and therefore may overlook situations in which one side of the communication session is acceptable while the other side violates destination-specific, jurisdiction-specific, tariff-specific, or authorization-specific constraints. By making origin-side and destination-side qualification explicit runtime stages, the present invention can support more precise signaling governance.

In an exemplary embodiment, the policy evaluation stage 188 can apply the compiled interconnect policy bundle to the accumulated runtime state represented by the session governance object and the associated lifecycle data. The policy evaluation stage 188 can generate one or more intermediate and final rule results, reason codes 200, and timestamps 202 corresponding to the specific governance determinations made during evaluation. Rather than generating a vague or discretionary recommendation, the policy evaluation stage 188 can produce a deterministic evaluation result tied to the resolved governance domain, the retrieved policy bundle, the call context 192, and the carrier assignment data 196. This determinism can be important from a technical network-control standpoint because signaling systems often require consistent, low-latency, reproducible decisions in order to avoid unstable or contradictory handling of similar signaling events across nodes or time.

In an exemplary embodiment, the deterministic governance enforcement stage 190 can apply a deterministic signaling-layer governance enforcement outcome before downstream propagation of the signaling message. The enforcement stage 190 can use the results of policy evaluation 188 and the associated reason codes 200 and timestamps 202 to control signaling continuation, rejection, throttling, diverting signaling to a specialized handling path, rerouting, or another governed handling path. Because this enforcement can occur while the communication session remains in the signaling plane and before the session is propagated to a downstream carrier network, the system can prevent non-compliant or unauthorized signaling from consuming downstream carrier resources or triggering further session establishment activity. This pre-propagation control can be a significant technical advantage over prior approaches that permit the signaling message to traverse deeper into the network before intervention occurs.

In an exemplary embodiment, the data items shown beneath the lifecycle stages, including call context 192, interconnect context identifier and interconnect governance domain data 194, carrier assignment data 196, policy bundle data 198, reason codes 200, and timestamps 202, can represent stateful information that is progressively accumulated to avoid redundant recomputation across lifecycle stages, updated, or refined as the signaling event advances through lifecycle 174. This progressive enrichment can allow each stage to build upon prior technical determinations instead of redundantly re-performing earlier work. For example, the interconnect context identifier generated at stage 180 can be reused at stage 184 for policy bundle lookup, and the carrier assignment data 196 produced at stage 182 can be reused at stages 186 and 188 for qualification and evaluation. This shared-state lifecycle architecture can improve runtime efficiency, reduce duplicated processing, and increase consistency across the system.

In an exemplary embodiment, the lifecycle 174 can also support evidentiary and operational traceability within interconnect governance domains by preserving the reason codes 200 and timestamps 202 generated during the runtime sequence. These values can be written into a compliance evidence ledger and can allow later reconstruction of the technical path by which a particular signaling event was handled. This can be particularly advantageous in environments where carriers require auditable proof of why a signaling message was allowed, rejected, throttled, or otherwise governed. Prior approaches that produce only a final disposition without preserving intermediate technical determinations may not provide this level of reconstructable runtime transparency.

The arrangement shown in FIG. 11 can therefore be understood as a technical runtime pipeline that converts a received signaling event into a governed signaling outcome within an interconnect governance domain through a specific sequence of machine-implemented transformations. The lifecycle 174 does not merely apply abstract rules to generalized information. Instead, it can operate on signaling-plane inputs, generate a persistent session governance object, resolve interconnect-specific context, incorporate authoritative carrier assignment data, retrieve compiled policy artifacts, perform dual-context qualification, and produce a deterministic enforcement action that changes how the telecommunications network handles the communication session. This concrete transformation of live signaling traffic into a controlled network outcome can improve signaling governance, reduce improper session propagation, and reinforce the technical character of the present invention for subject matter eligibility purposes.

Figure 12:
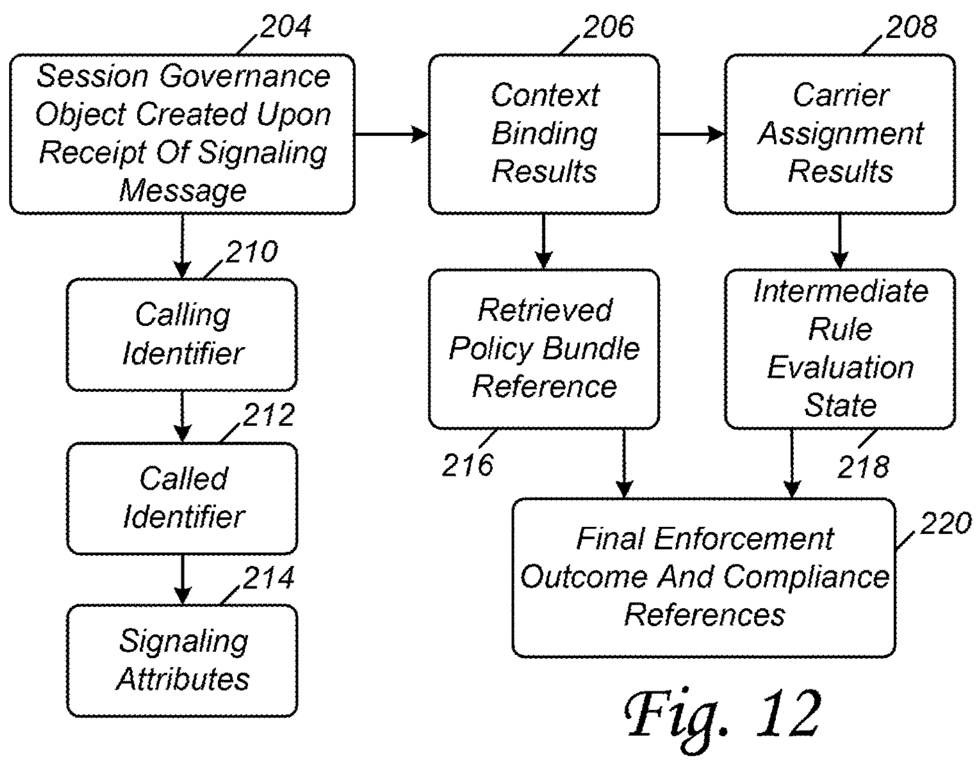
FIG. 12 illustrates one example of a session governance object that persists across the lifecycle of a communication session and is progressively enriched with call context data, signaling attributes, interconnect context binding results, carrier assignment results, a retrieved policy bundle reference, intermediate rule evaluation states, and a final enforcement outcome with associated compliance information.

Referring to FIG. 12, there is illustrated one example of a session governance object lifecycle 204 in which a session governance object created upon receipt of a signaling message is progressively populated and updated with runtime data including a calling identifier 206, a called identifier 208, signaling attributes 210, context binding results 212, carrier assignment results 214, a retrieved policy bundle reference 216, an intermediate rule evaluation state 218, and a final enforcement outcome and compliance references 220.

In an exemplary embodiment, the session governance object lifecycle 204 can provide a persistent runtime data structure and traceability of governance decisions used to coordinate and manage execution across governance evaluation stages that is instantiated early in signaling handling and then carried forward through successive evaluation stages so that the telecommunications signaling governance system can process a communication session using a unified and progressively enriched machine state. This can address a technical problem present in prior approaches where signaling processing is split across disconnected modules, temporary buffers, or separate transaction records, causing repeated parsing, inconsistent data views, and reduced traceability across the enforcement sequence.

The session governance object can be created as a structured data object in memory upon receipt of a signaling message and can initially include at least the calling identifier 206, the called identifier 208, and signaling attributes 210. The signaling attributes 210 can include interface-derived information, peer identity information, routing metadata, network addressing data, transport-related indicators, or other values extracted from the signaling layer. By storing these items together at the outset, the system can maintain a common runtime representation of the communication session rather than requiring downstream components to repeatedly inspect raw signaling traffic. This can reduce computational duplication and can also reduce the risk that different modules derive inconsistent interpretations from the same signaling message.

In some implementations, the calling identifier 206 and the called identifier 208 can be maintained in both received and normalized forms. For example, the session governance object can preserve the original received identifier values while also storing normalized representations used for downstream carrier assignment resolution, interconnect context evaluation, and policy qualification. This dual retention can be technically advantageous because it allows the system to support precise runtime comparison logic while preserving source-level evidentiary data for later audit, troubleshooting, or dispute resolution.

The signaling attributes 210 can form the technical bridge between raw signaling receipt and context-aware governance. Rather than treating signaling as a mere trigger for a rules decision, the present invention can use signaling attributes 210 to drive concrete network-control operations, including interconnect context binding, carrier determination, and enforcement path selection. This helps frame the invention as a practical telecommunications control system operating on protocol-level inputs, which can be important when distinguishing the present invention from abstract or generalized policy evaluation approaches.

As runtime processing proceeds, the session governance object lifecycle 204 can be enriched with context binding results 212. The context binding results 212 can include an interconnect context identifier representing an interconnect boundary between carrier networks, an interconnect governance domain indicator, a scope selection result, or one or more match-confidence values showing how the signaling event was associated with a particular traffic exchange relationship. Because the context binding results 212 are stored directly in the session governance object, later stages can rely on a stable domain resolution outcome without repeating the entire context binding operation. This can improve runtime efficiency and can also make the resulting governance process more deterministic and reproducible.

The carrier assignment results 214 can then be added to the same session governance object after authoritative telecommunications dataset resolution has been performed. These carrier assignment results 214 can include originating carrier identity, destination carrier identity, portability-related outcomes, jurisdiction-related values, mitigation participation status, authorization indicators, and other governance-relevant attributes tied to the calling identifier 206 and the called identifier 208. Storing the carrier assignment results 214 in the session governance object can allow later qualification and evaluation stages to work from externally grounded, runtime-derived network data rather than assumptions or static local mappings. This can solve a technical problem that arises in prior approaches where number ownership, routing eligibility, and carrier responsibility can shift over time or vary based on portability and jurisdictional conditions.

The retrieved policy bundle reference 216 determined based on the interconnect context identifier, can link the session governance object to a specific compiled interconnect policy bundle selected for the resolved interconnect governance domain. In that sense, the session governance object lifecycle 204 can serve not merely as a passive data record, but as an active runtime container that ties together signaling inputs, context resolution, carrier assignment, and executable governance logic. Once the retrieved policy bundle reference 216 is stored, the system can evaluate the communication session using a domain-specific compiled interconnect policy bundle without needing to re-resolve which policy artifact applies. This can support low-latency enforcement in carrier-scale signaling environments and can materially improve consistency across repeated signaling events that map to the same governance domain.

The intermediate rule evaluation state 218 can capture partial or staged outcomes produced during runtime evaluation. For example, the intermediate rule evaluation state representing evaluation of governance conditions 218 can include pass or fail values for origin-side qualification, destination-side qualification, tariff eligibility checks, authorization checks, mitigation-related checks, jurisdictional checks, or interconnect-specific restrictions. Preserving these intermediate technical determinations can provide a significant advantage over prior approaches that generate only a final disposition. By retaining the intermediate rule evaluation state 218, the system can support more transparent enforcement reasoning, easier debugging, improved auditability, and finer-grained operational tuning.

The final enforcement outcome and compliance references 220 can be added after the governance evaluation engine completes deterministic evaluation and the signaling outcome controller selects an enforcement action. The final enforcement outcome resulting from deterministic governance enforcement and compliance references 220 can include an allow result, a reject result, a throttle result, a quarantine result to segregate signaling for alternate handling, or another signaling-layer control action, along with reason codes, timestamps, ledger record identifiers, policy bundle identifiers, and other compliance-linked metadata. Because these items are written back into the same session governance object lifecycle 204, the object can ultimately represent a continuous technical history of how the system transformed an incoming signaling message into a governed signaling outcome.

From an architectural standpoint, FIG. 12 can illustrate how the session governance object lifecycle 204 forms the relational backbone between the systems and methods described elsewhere in the present invention. The calling identifier 206, the called identifier 208, and the signaling attributes 210 can support context resolution and carrier assignment. The context binding results 212 and the carrier assignment results 214 can in turn support policy selection and dual-context qualification. The retrieved policy bundle reference 216 can couple the session to a particular compiled interconnect policy bundle, while the intermediate rule evaluation state 218 and the final enforcement outcome and compliance references 220 can preserve both the runtime analytical path and the resulting network-control action. This progression helps show that the invention is not a loose collection of unrelated modules, but a coordinated runtime architecture that transforms signaling inputs into governed outcomes where each stage produces technical state consumed by later stages.

A further technical advantage of the session governance object lifecycle 204 is that it can support distributed or multi-component enforcement environments while maintaining deterministic and consistent governance outcomes without losing logical continuity of the communication session. For instance, one subsystem can populate signaling attributes 210, another can provide context binding results 212, another can enrich the object with carrier assignment results 214, and another can append the final enforcement outcome and compliance references 220, while all subsystems operate against a common structured runtime record. This kind of coordinated state propagation can be especially useful in carrier-grade systems where evaluation functions are partitioned for performance, resilience, or scale.

The session governance object lifecycle 204 can also improve evidentiary integrity. Because the object can preserve both source-derived values and later-stage derived values, the system can reconstruct not only what final outcome was applied, but how the outcome was reached. That capability can be particularly helpful in demonstrating why a given signaling message was permitted, blocked, or otherwise governed, and can differentiate the present invention from prior approaches that leave only incomplete or fragmented records across multiple systems.

FIG. 12 therefore illustrates more than a conceptual recordkeeping construct. It shows a concrete runtime data architecture in which the session governance object lifecycle 204 is used to accumulate, preserve, and propagate machine-generated session state that directly controls downstream signaling treatment within an interconnect governance domain. Through use of the calling identifier 206, the called identifier 208, signaling attributes 210, context binding results 212, carrier assignment results 214, retrieved policy bundle reference 216, intermediate rule evaluation state 218, and final enforcement outcome and compliance references 220, the telecommunications signaling governance system can improve processing efficiency, determinism, and auditability while producing a real network-operational effect on communication session handling.

Figure 13:
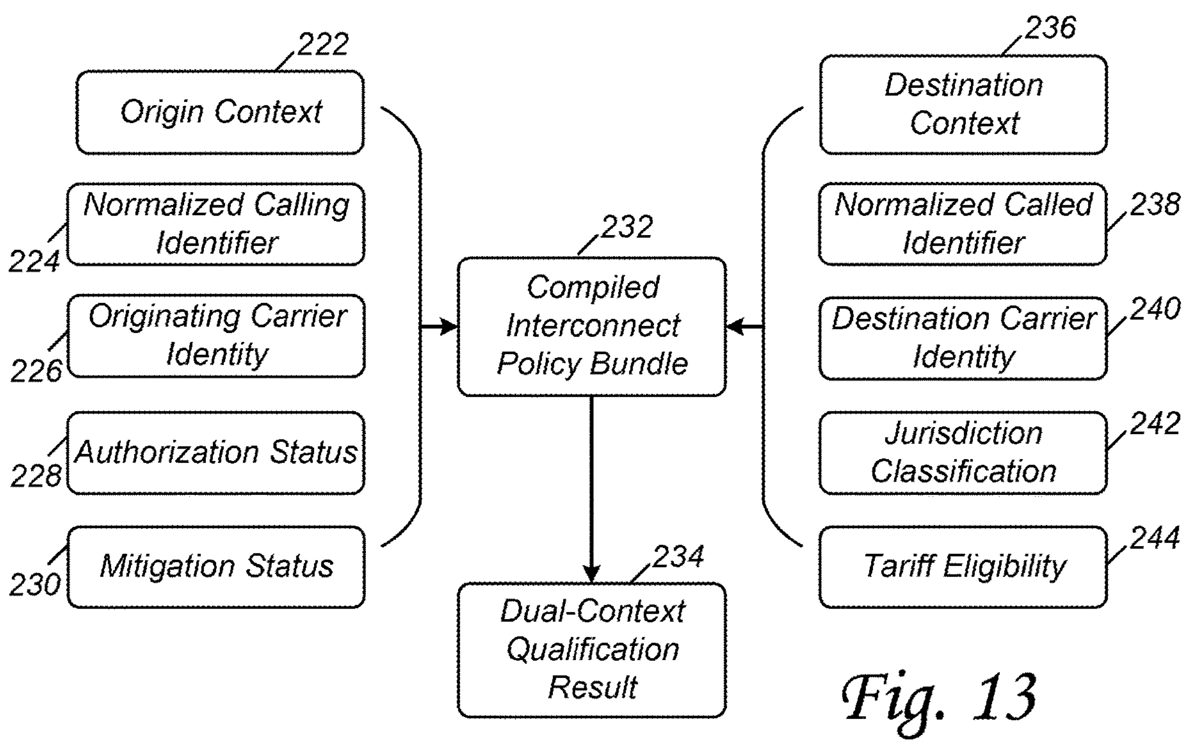
FIG. 13 illustrates one example of a dual-context qualification process in which an origin context associated with a calling party identifier and a destination context associated with a called party identifier are independently determined and evaluated against a compiled interconnect policy bundle to produce a qualification result governing the communication session.

Referring to FIG. 13, there is illustrated one example of a dual-context qualification process 222 in which constructing the origin context 224 and the destination context 226 from signaling attributes and authoritative telecommunications dataset results are independently determined and evaluated against a compiled interconnect policy bundle 228 to produce a dual-context qualification result 230 governing a communication session.

In an exemplary embodiment, the dual-context qualification process 222 can be performed using data maintained within a session governance object and can involve constructing the origin context 224 from attributes associated with a calling party identifier and constructing the destination context 226 from attributes associated with a called party identifier. The origin context 224 can include a normalized calling identifier 232, an originating carrier identity 234, an authorization status 236, and a mitigation status 238. The destination context 226 can include a normalized called identifier 240, a destination carrier identity 242, a jurisdiction classification 244, and a tariff eligibility value 246. Each of these attributes can be derived from signaling inputs and authoritative telecommunications datasets and can be stored as structured data fields that are available for deterministic evaluation.

Unlike prior approaches that treat a communication session as a single undifferentiated entity, the present invention can separately construct the origin context 224 and the destination context 226 independently constructed using authoritative data sources, normalization logic, and validation steps. For example, the normalized calling identifier 232 can be generated through canonicalization of the received calling identifier using numbering plan rules, while the normalized called identifier 240 can be derived using separate normalization logic that accounts for destination-specific formatting or routing considerations. Similarly, the originating carrier identity 234 and the destination carrier identity 242 can be independently resolved using authoritative telecommunications datasets, which can include number portability information, operating company number registries, or jurisdictional databases. This separation allows the system to capture asymmetries in the communication session that may not be detectable when using a single combined context.

The authorization status 236 and the mitigation status 238 within the origin context 224 can reflect whether the originating side of the communication session satisfies specific governance requirements such as participation in mitigation programs, compliance with regulatory frameworks, or authorization to originate traffic over a given interconnect. On the destination side, the jurisdiction classification 244 and tariff eligibility value 246 can indicate whether the communication session is permitted to terminate in a given geographic or regulatory domain and whether applicable tariff or routing conditions are satisfied. By structuring these attributes explicitly within the destination context 226, the system can evaluate destination-specific constraints that are often overlooked in prior approaches.

In an exemplary embodiment, the compiled interconnect policy bundle 228 associated with an interconnect governance domain can define a set of executable governance conditions that reference both origin-related attributes and destination-related attributes. The dual-context qualification process 222 can apply the compiled interconnect policy bundle 228 to the origin context 224 and the destination context 226 in a coordinated manner. For example, a given governance rule may require that the authorization status 236 be valid while also requiring that the tariff eligibility value 246 satisfy a defined condition. The dual-context qualification result 230 can therefore depend on the combined satisfaction of conditions applied to both contexts.

The dual-context qualification process 222 produces a qualification result 230 that indicates whether the communication session satisfies the governance conditions associated with the applicable interconnect governance domain. The qualification result 230 can be represented as a structured output that may include pass or fail indicators, confidence values, or rule-specific evaluation outcomes. This result can be written into the session governance object and can be used by downstream components to generate a deterministic governance enforcement action.

The technical approach illustrated in FIG. 13 addresses a significant limitation in prior approaches, where signaling governance is often based primarily on origin-side attributes or on limited destination-side checks without coordinated evaluation within an interconnect governance domain. Such approaches may allow signaling to proceed when only partial conditions are satisfied, thereby enabling non-compliant or unauthorized communication sessions to propagate through the network. By requiring coordinated evaluation of both the origin context 224 and the destination context 226, the present invention can enforce stricter and more accurate governance conditions that reflect the full set of requirements associated with a communication session.

From a systems perspective, the dual-context qualification process 222 can be integrated tightly with the session governance object lifecycle and the governance evaluation engine, each context representing distinct governance conditions associated with the interconnect governance domain. The origin context 224 and the destination context 226 can be constructed using data already present in the session governance object, including normalized identifiers, carrier assignment results, and dataset-derived attributes. The compiled interconnect policy bundle associated with the interconnect governance domain 228 can be retrieved based on the interconnect context identifier, ensuring that the dual-context qualification process is performed using domain-specific governance logic. The resulting qualification result 230 can then be consumed by a signaling outcome controller to generate a deterministic enforcement action.

The dual-context qualification process 222 can also improve system determinism and repeatability. Because both the origin context 224 and the destination context 226 are derived from structured data and evaluated using a compiled interconnect policy bundle 228, the resulting qualification outcome can be consistent across repeated signaling events that share similar attributes. This deterministic behavior across interconnect governance domains is particularly important in telecommunications systems, where inconsistent handling of signaling messages can lead to unpredictable routing behavior or network instability.

In addition, the explicit separation of origin and destination contexts can support enhanced auditability and transparency of governance decisions supporting auditability of governance decisions within interconnect governance domains. By preserving the attributes associated with the origin context 224 and the destination context 226, as well as the resulting qualification result 230, the system can provide a clear record of how each side of the communication session contributed to the final governance decision. This level of detail can be useful for regulatory compliance, inter-carrier dispute resolution, and operational analysis.

FIG. 13 therefore illustrates a concrete, machine-implemented process in which a communication session is evaluated using independently derived origin and destination contexts, each representing distinct governance conditions and a compiled interconnect policy bundle associated with an interconnect governance domain to produce a deterministic qualification outcome. This process operates on structured signaling data and externally validated attributes to generate a technical result that directly influences signaling behavior within the network, thereby reinforcing the practical and non-abstract nature of the present invention.

Figure 14:
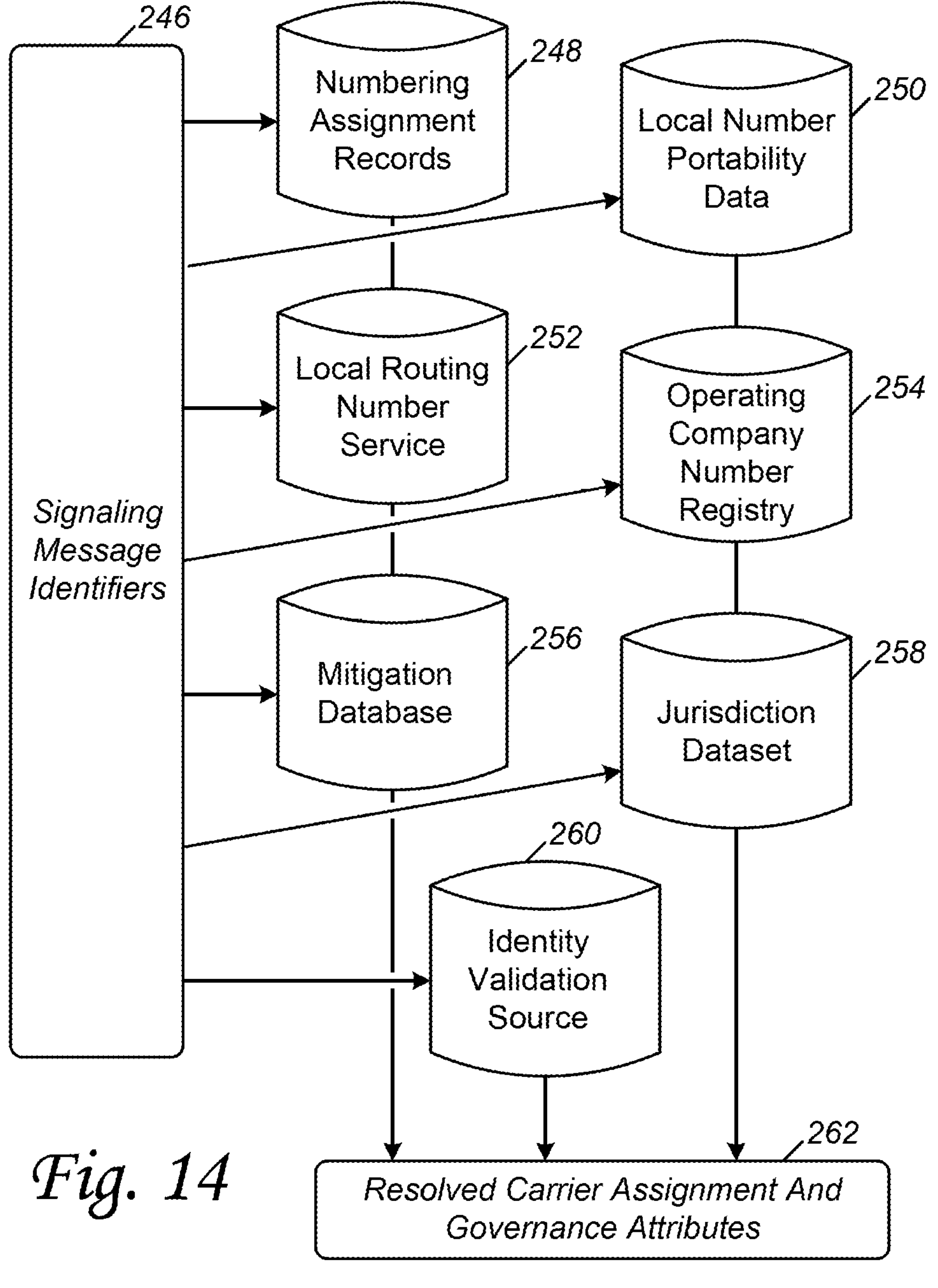
FIG. 14 illustrates one example of the use of authoritative telecommunications datasets, including numbering assignment records, local number portability data, local routing number services, operating company number registries, mitigation databases, and jurisdiction datasets, to determine carrier assignment and governance attributes associated with a signaling message.

Referring to FIG. 14, there is illustrated one example of an authoritative telecommunications dataset resolution process 246 in which signaling message identifiers and associated signaling attributes and interconnect attributes 248 are used to derive resolved carrier assignment and governance attributes 262 associated with an interconnect governance domain through interaction with multiple authoritative telecommunications datasets, including numbering assignment records 250, local number portability data 252, a local routing number service 254, an operating company number registry 256, a mitigation database 258, a jurisdiction dataset 260, and an identity validation source 262.

In an exemplary embodiment, the authoritative telecommunications dataset resolution process 246 can be executed by an authoritative telecom dataset resolver that receives signaling message identifiers 248 extracted from a signaling message, such as a calling party identifier, a called party identifier, and optionally one or more intermediate identifiers or identity tokens present in signaling headers. These identifiers can be normalized and formatted into query-ready representations that are suitable for interaction with external and internal telecommunications data sources. This normalization step can include canonical formatting of telephone numbers, extraction of country and area codes, removal of protocol-specific formatting, and generation of lookup keys compatible with the authoritative datasets.

The dataset resolver can then perform a series of structured queries against the authoritative telecommunications datasets, each of which provides a distinct class of information relevant to carrier assignment and governance evaluation. The numbering assignment records 250 can be queried to determine the original allocation of a telephone number, including assignment to a specific carrier or numbering block. The local number portability data 252 can be used to determine whether the number has been ported and, if so, the current serving carrier. The local routing number service 254 can provide routing-specific information that identifies the appropriate network destination for the communication session.

The operating company number registry 256 can be used to map identifiers to carrier entities, allowing the system to associate signaling message identifiers with specific originating or terminating carriers. The mitigation database 258 can provide information regarding participation in mitigation frameworks, compliance status, or other governance-related attributes associated with a carrier or signaling source. The jurisdiction dataset 260 can provide geographic or regulatory classifications associated with the called identifier or calling identifier, which can influence routing eligibility, tariff applicability, or regulatory compliance requirements.

In addition, the identity validation source 262 can be queried to verify identity tokens or authentication-related fields present in the signaling message, providing an additional layer of validation for the origin of the communication session. The identity validation source 262 can support verification of cryptographic tokens, signature-based identity assertions, or other forms of signaling authentication that may be present in the signaling protocol.

The dataset resolver can correlate the results obtained from these datasets to produce the resolved carrier assignment and governance attributes 262. These attributes can include originating carrier identity, terminating carrier identity, portability-adjusted routing information, jurisdiction classification, mitigation participation status, authorization indicators, and identity validation outcomes. The resolved attributes can be written into the session governance object and used by downstream components within the interconnect governance domain such as the dual-context qualification process and the governance evaluation engine.

This multi-dataset resolution process addresses a technical problem in telecommunications systems where carrier assignment and governance attributes cannot be reliably determined from a single data source or from signaling message content alone. Prior approaches may rely on static mappings, incomplete datasets, or locally cached information that can become outdated or inconsistent with actual network conditions. By integrating multiple authoritative datasets to derive governance-relevant attributes and correlating their outputs, the present invention can produce a more accurate and current representation of carrier assignment and governance-relevant attributes.

In some implementations, the dataset resolver can apply precedence rules or reconciliation logic applied in a deterministic manner when conflicting information is returned from different datasets. For example, portability data may override original numbering assignment records, or identity validation results may influence trust levels associated with a given signaling message. This reconciliation process can be performed deterministically based on predefined logic, ensuring that the resulting carrier assignment and governance attributes 262 are consistent and reproducible.

The dataset resolution process can also be optimized for runtime performance by caching frequently accessed data, precomputing lookup tables, or using distributed query mechanisms that allow parallel retrieval from multiple datasets. These optimizations can enable the system to perform complex, multi-source data resolution within the timing constraints of signaling protocols, thereby supporting real-time governance enforcement.

From a systems perspective, the authoritative telecommunications dataset resolution process 246 provides a critical link between raw signaling identifiers and the structured, validated data required for accurate governance evaluation. The signaling message identifiers 248 serve as inputs to the dataset resolver, and the resolved carrier assignment and governance attributes 262 serve as outputs that inform subsequent stages such as dual-context qualification and policy evaluation. This transformation of identifiers into actionable network attributes within an interconnect governance domain represents a concrete, machine-executed operation that directly influences how the system governs signaling traffic.

The process shown in FIG. 14 therefore illustrates a technical mechanism for enriching signaling-derived data with authoritative, externally validated information, enabling more precise and reliable governance decisions within interconnect governance domains. By combining multiple datasets and resolving their outputs into a unified set of attributes, the telecommunications signaling governance system can improve the accuracy, consistency, and determinism of signaling evaluation, while providing a practical and non-abstract implementation that enhances the functioning of telecommunications networks.

Figure 15:
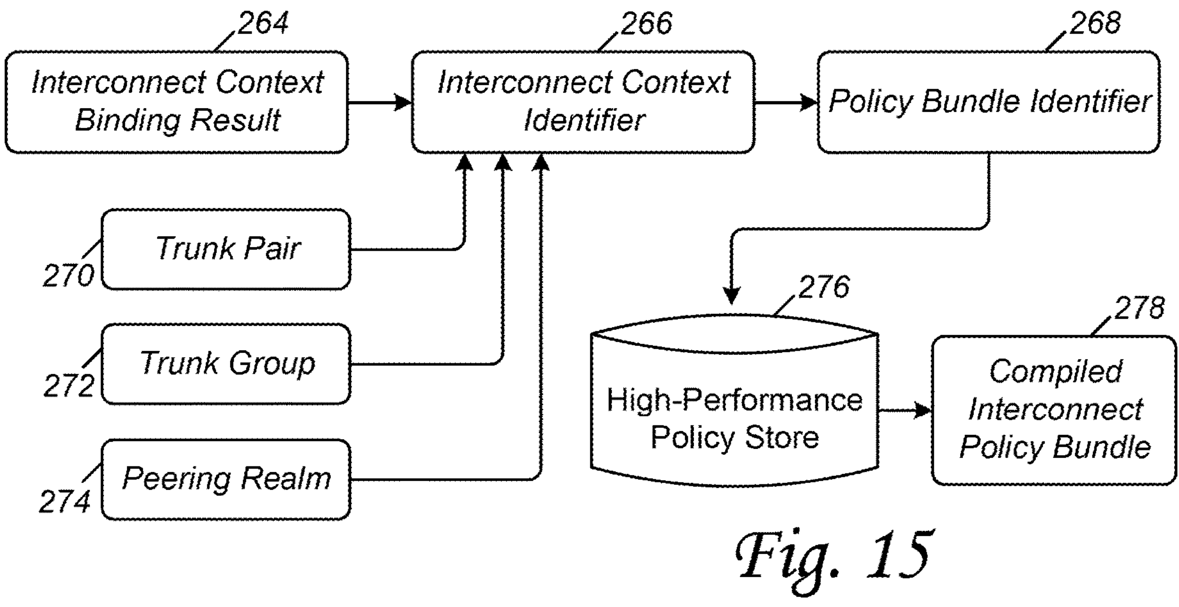
FIG. 15 illustrates one example of the resolution of an interconnect context identifier to a policy bundle identifier and retrieval of a compiled interconnect policy bundle from a high-performance policy store, wherein the compiled interconnect policy bundle is associated with a defined interconnect governance domain.

Referring to FIG. 15, there is illustrated one example of a policy bundle resolution and retrieval process 264 in which an interconnect context binding result 266 is used to determine an interconnect context identifier corresponding to an interconnect governance domain 268 that maps to a policy bundle identifier 270, enabling retrieval of a compiled interconnect policy bundle 276 from a high-performance policy store 280 associated with one or more interconnect governance domains such as a trunk pair 272, a trunk group 274, or a peering realm 278.

In an exemplary embodiment, the interconnect context binding result 266 can be produced by a context binding engine that evaluates signaling-derived attributes to determine the appropriate interconnect governance domain associated with a communication session. The interconnect context identifier 268 can be a structured key or value that uniquely represents that domain within the telecommunications signaling governance system. This identifier can encapsulate the specific traffic exchange relationship, including factors such as ingress interface, egress interface, peer identity, routing realm, or carrier pair association.

Once the interconnect context identifier 268 is determined, the system can use the identifier to resolve a corresponding policy bundle identifier 270 in a deterministic mapping. The policy bundle identifier 270 can represent a reference to a compiled interconnect policy bundle 276 that has been pre-associated with the interconnect governance domain. This mapping between the interconnect context identifier 268 and the policy bundle identifier 270 can be maintained in a lookup structure or index that allows efficient translation from context resolution output to executable policy artifacts.

The high-performance policy store 280 can be configured to store compiled interconnect policy bundles 276 in a format optimized for rapid retrieval and execution during runtime signaling processing. The policy store 280 can be implemented using in-memory data structures, distributed caching systems, or other low-latency storage mechanisms that enable the telecommunications signaling governance system to access the compiled interconnect policy bundle 276 within the timing constraints of signaling protocols. This architectural choice addresses a technical limitation in prior approaches, where policy evaluation may depend on external systems or interpretive processing that introduces latency and variability.

The compiled interconnect policy bundle 276 can represent a pre-processed and executable set of governance conditions that are specific to the interconnect governance domain. Rather than storing policies as loosely defined rules that must be interpreted at runtime, the compiled interconnect policy bundle 276 can be generated through a prior compilation process that resolves dependencies, optimizes evaluation order, and encodes governance conditions in a machine-efficient format that is directly executable during runtime evaluation. This enables the governance evaluation engine to apply the policy bundle directly to runtime data without performing additional parsing or transformation steps.

In an exemplary embodiment, the mapping between interconnect governance domains representing distinct interconnect boundaries and compiled interconnect policy bundles 276 can support multiple levels of granularity. For example, a trunk pair 272 may have a dedicated compiled interconnect policy bundle 276 that reflects a specific bilateral agreement between two carriers, while a trunk group 274 may have a different compiled interconnect policy bundle 276 that applies to a broader set of routing paths. A peering realm 278 may represent an even higher-level grouping that shares a common policy bundle across multiple interconnect relationships. The system can select the appropriate compiled interconnect policy bundle 276 based on the specificity of the interconnect context identifier 268, ensuring that governance conditions are applied at the correct level of abstraction.

The policy bundle resolution and retrieval process 264 provides a technical mechanism for linking the outcome of interconnect context binding to executable governance logic. By using the interconnect context identifier 268 as a key into the policy store 280, the system can deterministically retrieve the compiled interconnect policy bundle 276 associated with the relevant interconnect governance domain. This direct mapping eliminates ambiguity in policy selection compared to systems that rely on generalized or globally applied rule sets and ensures that the same signaling context will consistently result in retrieval of the same policy bundle.

In some implementations, the policy store 280 can support versioning, allowing multiple compiled interconnect policy bundles 276 to be associated with a single interconnect governance domain over time. The policy bundle identifier 270 can include version information, enabling the system to select the appropriate version based on effective dates, deployment status, or runtime configuration. This capability can allow controlled rollout of governance changes while maintaining deterministic behavior for signaling events.

The policy bundle resolution process 264 can also support caching strategies in which frequently accessed compiled interconnect policy bundles for interconnect governance domains 276 are maintained in memory for immediate access. This can further reduce latency and ensure that policy retrieval does not become a bottleneck in the signaling processing pipeline. In high-throughput environments, such optimizations can be critical to maintaining system performance and scalability.

From a systems perspective, the process illustrated in FIG. 15 transforms an interconnect context binding result 266 into a concrete executable artifact within an interconnect governance domain in the form of the compiled interconnect policy bundle 276. This transformation is a key step in enabling deterministic governance evaluation, as it ensures that the system applies a well-defined, pre-associated set of governance conditions to each communication session. The use of compiled policy bundles 276 also reinforces the technical nature of the system by demonstrating that governance logic is implemented as executable data structures rather than abstract or manually interpreted rules.

The arrangement shown in FIG. 15 therefore provides a technically grounded mechanism for associating signaling context with executable governance logic and retrieving that logic in a manner that supports processing within signaling protocol timing constraints. By combining interconnect context binding, identifier-based mapping, and high-performance policy storage, the telecommunications signaling governance system can achieve low-latency, deterministic policy retrieval for interconnect governance domains that directly influences signaling enforcement outcomes and improves the operation of telecommunications networks.

Figure 16:
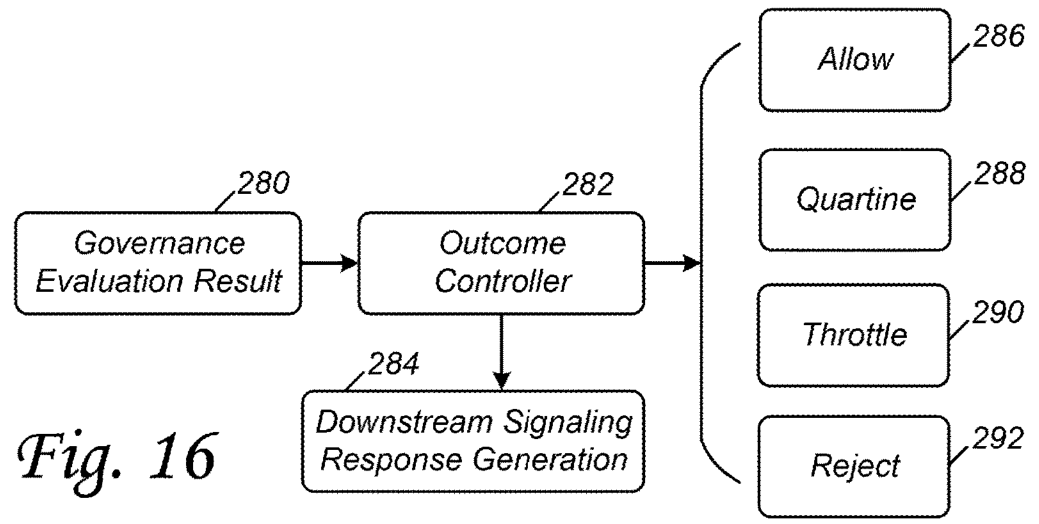
FIG. 16 illustrates one example of deterministic governance enforcement outcomes applied at a signaling layer prior to downstream signaling propagation, including allowing, rejecting, throttling, or diverting signaling to a specialized handling path associated with a communication session based on an evaluation result.

Referring to FIG. 16, there is illustrated one example of a deterministic governance enforcement process 282 in which a governance evaluation result 284 is processed by an outcome controller 286 to generate a downstream signaling response 292, including one or more enforcement actions such as allow 288, reject 290, throttle 292, or segregate signaling for specialized handling 294, applied prior to or in lieu of downstream signaling propagation.

In an exemplary embodiment, the governance evaluation result 284 can be produced by a governance evaluation engine that has applied a compiled interconnect policy bundle associated with an interconnect governance domain rather than generalized rule sets to a session governance object enriched with call context, interconnect context, and carrier assignment data. The governance evaluation result 284 can include structured outputs such as pass or fail indicators, rule-specific outcomes, aggregated evaluation states, and associated reason codes that describe the basis for the evaluation. These outputs can be provided to the outcome controller 286 as machine-readable inputs that drive selection of a deterministic enforcement action.

The outcome controller 286 can be configured to translate the governance evaluation result 284 into a concrete signaling-layer action that directly affects the handling of the communication session. Rather than producing a recommendation or advisory output and without relying on routing-based decision logic, the outcome controller 286 can generate a deterministic signaling-layer governance response 292 that is applied prior to downstream signaling propagation to a downstream carrier network. This distinction addresses a technical limitation in prior approaches where evaluation systems may identify issues but rely on separate systems or delayed processes to enforce decisions, resulting in non-deterministic or inconsistent signaling behavior.

In an exemplary embodiment, the outcome controller 286 can implement a mapping between evaluation states and enforcement actions defined by governance conditions within the compiled interconnect policy bundle. For example, a successful evaluation may result in an allow action 288 that permits the communication session to proceed, while a failed evaluation may result in a reject action 290 that terminates the signaling message before further propagation. Additional enforcement actions can include throttle 292, in which signaling associated with the communication session is rate-limited or delayed, and quarantine 294 for alternatine processing, in which the signaling message is isolated or diverted for further analysis or handling. The mapping between evaluation outcomes and enforcement actions can be defined in a deterministic manner such that identical evaluation inputs will produce identical enforcement outputs.

The downstream signaling response 292 generated by the outcome controller 286 can be implemented as a modification, termination, or generation of signaling messages within the signaling protocol. For example, a reject action 290 can involve generating a protocol-specific rejection response, while an allow action 288 can involve forwarding the signaling message unchanged or with additional annotations. A throttle action 292 can involve introducing controlled delays or limiting the rate of signaling transmission, and a quarantine action 294 can involve redirecting the signaling message to a specialized handling system. These actions can be applied at the signaling layer without requiring intervention at the media layer, thereby maintaining separation between signaling control and media transport.

The deterministic governance enforcement process 282 addresses a technical problem in telecommunications systems where signaling messages may be evaluated but not consistently controlled or may rely on post-processing or advisory mechanisms prior to reaching downstream network elements. In prior approaches, enforcement may occur after the signaling message has already triggered resource allocation or session setup in a downstream network, leading to inefficiencies, potential misuse, or exposure to non-compliant traffic. By applying enforcement actions at the signaling layer and prior to downstream propagation, the present invention ensures that only signaling messages that satisfy governance conditions are permitted to proceed, thereby improving network integrity and resource utilization.

In an exemplary embodiment, the outcome controller 286 can also generate and associate reason codes associated with the interconnect governance domain with each enforcement action. These reason codes can indicate the specific governance conditions that were satisfied or violated and can be included in the downstream signaling response 292 or recorded in a compliance evidence ledger. The use of reason codes provides a structured mechanism for explaining enforcement decisions and supports traceability and auditability of signaling governance operations.

The deterministic nature of the enforcement process across interconnect governance domains 282 is a key technical feature. Because the governance evaluation result 284 is derived from structured inputs and compiled policy bundles, and because the outcome controller 286 applies a defined mapping to generate enforcement actions, the resulting downstream signaling response 292 can be consistent and reproducible across similar signaling events. This determinism is important in carrier-grade systems, where inconsistent handling of signaling messages can lead to unpredictable routing behavior or operational instability.

From a systems perspective, the deterministic governance enforcement process 282 represents the final transformation stage in the runtime pipeline, converting evaluation results into actionable signaling outcomes within an interconnect governance domain. The governance evaluation result 284 serves as the input, the outcome controller 286 performs the transformation, and the downstream signaling response 292 represents the output that directly influences network behavior. This transformation is performed during active handling of the communication session and within the signaling path, demonstrating a concrete, machine-implemented operation that affects the functioning of the telecommunications network.

The configuration shown in FIG. 16 therefore provides a technically grounded mechanism for enforcing governance decisions within interconnect governance domains in a deterministic and timely manner. By integrating evaluation and enforcement within the signaling processing pipeline and by applying enforcement actions prior to downstream propagation, the telecommunications signaling governance system can improve consistency, reduce propagation of non-compliant signaling, and provide a practical implementation that addresses real-world challenges in carrier interconnect environments.

Referring to FIG. 17, there is illustrated one example of a compliance evidence recording and audit process 296 in which a governance event record 298 generated during runtime evaluation and enforcement is written to a compliance evidence ledger 300, enabling structured retrieval through an audit interface 304 and long-term traceability of signaling governance actions.

In an exemplary embodiment, the governance event record 298 can be generated as part of execution of a deterministic governance enforcement action and can include structured data elements associated with the communication session. These elements can include an interconnect context identifier corresponding to an interconnect governance domain 306, a policy bundle identifier 308 corresponding to the compiled interconnect policy bundle applied during evaluation, one or more evaluation results 310, one or more enforcement reason codes 312, one or more timestamps 314, and optionally identifiers associated with the calling party, the called party, and the signaling path. The governance event record 298 can be formatted as a structured data object that is suitable for storage, indexing, and retrieval.

The compliance evidence ledger 300 can be implemented as a persistent, append-only data store configured to record governance event records 298 in a manner that preserves ordering, integrity, and traceability. In some implementations, the compliance evidence ledger 300 can be distributed across multiple storage nodes and can employ replication, partitioning, or consensus mechanisms to ensure durability and availability. The append-only structure can prevent modification of previously recorded governance event records 298, thereby supporting evidentiary integrity and ensuring immutability of governance records, thus reducing the risk of data tampering.

Unlike prior approaches that rely on fragmented logging systems or unstructured event records, the present invention can store governance event records 298 in a normalized and schema-defined format linked to an interconnect context identifier and corresponding compiled interconnect policy bundle within the compliance evidence ledger 300. This structured storage enables efficient querying and correlation of governance events across multiple communication sessions and interconnect governance domains. For example, the interconnect context identifier 306 can be used as a key to retrieve all governance event records 298 associated with a particular traffic exchange relationship, while the policy bundle identifier 308 can be used to identify events evaluated under a specific compiled interconnect policy bundle.

In an exemplary embodiment, the compliance evidence ledger 300 can support indexing and query capabilities that allow rapid retrieval of governance event records 298 based on various criteria, including time ranges, carrier identities, enforcement actions, or evaluation outcomes. The audit interface 304 can provide a mechanism for operators, regulatory entities, or automated systems to access and analyze the stored governance event records 298. The audit interface 304 can present the data in a structured format and can support filtering, aggregation, and reporting functions that facilitate compliance verification and operational analysis.

The compliance evidence recording and audit process 296 addresses a technical problem in telecommunications systems where it is difficult to reconstruct or verify how signaling governance decisions were made. In prior approaches, logs may be incomplete, inconsistent, or difficult to correlate with specific communication sessions, or lack interconnect-domain-specific governance context, making it challenging to demonstrate compliance with regulatory requirements or to investigate disputes between carriers. By recording comprehensive governance event records 298 in a centralized and structured compliance evidence ledger 300, the present invention enables precise reconstruction of governance decisions and their underlying inputs.

In some implementations, the governance event record 298 can include cryptographic elements such as hashes, signatures, or integrity checks that can be used to verify that the record has not been altered after being written to the compliance evidence ledger 300. These features can further enhance the evidentiary value of the stored data and can support use cases involving regulatory audits or legal proceedings.

The integration of the compliance evidence ledger 300 with the runtime governance pipeline including interconnect context resolution, policy bundle retrieval, and deterministic enforcement, interconnect context resolution, policy bundle retrieval, and deterministic enforcement provides a direct linkage between evaluation, enforcement, and recordkeeping. Because the governance event record 298 is generated as part of the same execution flow that produces the deterministic governance enforcement action, the recorded data can accurately reflect the state of the system at the time of decision-making. This tight coupling reduces the risk of discrepancies between operational behavior and recorded evidence.

From a systems perspective, the process illustrated in FIG. 17 converts runtime governance outcomes into persistent, structured and queryable governance records that can be used for downstream analysis and compliance verification. The governance event record 298 serves as the data unit, the compliance evidence ledger 300 serves as the storage mechanism, and the audit interface 304 serves as the access point for retrieving and analyzing the data. This end-to-end pipeline demonstrates a concrete technical implementation that extends beyond abstract decision-making to include durable data management and retrieval.

The configuration shown in FIG. 17 therefore provides a technically robust mechanism for capturing and preserving governance decisions within interconnect governance domains in a telecommunications signaling environment. By combining structured record generation, append-only storage, and accessible audit interfaces, the telecommunications signaling governance system can improve transparency, support compliance obligations, and provide a verifiable record of how signaling messages are evaluated and controlled, reinforcing the practical and non-abstract nature of the present invention.

Referring to FIG. 18, there is illustrated one example of a session governance object lifecycle process 316 in which a session governance object 318 is instantiated, populated, enriched, evaluated, and finalized through a sequence of runtime stages corresponding to processing of a communication session.

In an exemplary embodiment, the session governance object 318 can be instantiated at an initiation stage 320 in response to receipt of a signaling message at a signaling interface. The instantiation can allocate a structured data container within memory used to coordinate execution across governance evaluation stages that is uniquely associated with the communication session. The session governance object 318 can be assigned a session identifier 322 that allows correlation of all subsequent processing steps, ensuring that data derived at different stages of the pipeline is consistently associated with the same communication session.

Following instantiation, the session governance object 318 can enter a population stage 324 in which core signaling attributes are extracted and stored. These attributes can include a calling party identifier 326, a called party identifier 328, and one or more signaling attributes 330 derived from the signaling message. The signaling attributes 330 can include ingress interface identifiers, peer identifiers, routing metadata, or protocol-specific fields. The population stage 324 can normalize these values and store them in structured fields within the session governance object 318, enabling consistent downstream access.

The session governance object 318 can then proceed to an enrichment stage 332 in which additional data is incorporated from external and internal sources. During the enrichment stage 332, the system can determine an interconnect context identifier 334 corresponding to an interconnect governance domain representing an interconnect boundary between carrier networks, and can retrieve carrier assignment data and other governance-related attributes using authoritative telecommunications datasets. These enriched attributes can be added to the session governance object 318, expanding the dataset available for evaluation. This stage allows the object to evolve from a representation of raw signaling input to a comprehensive, context-aware representation of the communication session.

At a governance evaluation stage 336, the session governance object 318 can be processed using a compiled interconnect policy bundle 338 associated with the interconnect governance domain. The governance evaluation stage 336 can involve applying governance conditions defined within the compiled interconnect policy bundle retrieved based on the interconnect context identifier 338 to the data contained in the session governance object 318. The result of this evaluation can include one or more evaluation outcomes 340 and associated reason codes that reflect whether the communication session satisfies the governance conditions.

Following evaluation, the session governance object 318 can enter an enforcement stage 342 in which a deterministic governance enforcement action 344 is determined and applied. The enforcement stage 342 can utilize the evaluation outcomes 340 stored within the session governance object 318 to select an appropriate signaling response, such as allowing, rejecting, throttling, or otherwise controlling the communication session. The enforcement action 344 applied prior to downstream signaling propagation can be recorded within the session governance object 318 to provide a complete record of the decision.

Finally, the session governance object 318 can enter a finalization stage 346 in which the object is prepared for persistence and audit. During this stage, a governance event record can be generated from the data stored within the session governance object 318 and written to a compliance evidence ledger. The session governance object 318 can then be released from active memory or archived, depending on system configuration.

The lifecycle process 316 illustrated in FIG. 18 addresses a technical challenge in coordinating multiple stages of signaling governance processing in a consistent and traceable manner. Prior approaches may rely on loosely coupled processing steps or transient data structures that do not maintain a coherent representation of the communication session across its lifecycle without a unified session-level governance model. This can lead to inconsistencies, loss of context, or difficulty in reconstructing how a governance decision was made.

By maintaining the session governance object 318 as a persistent, structured representation of the communication session throughout its lifecycle, in contrast to stateless signaling processing systems, the present invention enables consistent access to all relevant attributes at each stage of processing. Each stage, including instantiation 320, population 324, enrichment 332, evaluation 336, enforcement 342, and finalization 346, can operate on the same data structure, ensuring that no information is lost or misaligned between stages.

The session governance object 318 can also facilitate modular system design. Different components of the telecommunications signaling governance system, such as the signaling interface, dataset resolver, policy retrieval engine, and enforcement controller, can interact with the session governance object 318 as a shared data structure. This allows each component to contribute data or consume data without requiring tight coupling between components, improving system scalability and maintainability.

In addition, the lifecycle process 316 can support deterministic behavior by ensuring that each stage operates on well-defined inputs and produces well-defined outputs that are stored within the session governance object 318. Because the object retains all intermediate and final data, repeated processing of similar signaling messages can produce consistent results, reinforcing the reliability of the system.

From a technical standpoint, the session governance object lifecycle process 316 represents a concrete, machine-executed workflow in which data is progressively transformed and enriched to produce a governed signaling outcome within an interconnect governance domain to support governance evaluation and enforcement. The use of a structured object that persists across processing stages provides a tangible implementation that improves the functioning of telecommunications signaling systems by enabling coordinated, traceable, and deterministic handling of communication sessions.

The configuration shown in FIG. 18 therefore demonstrates how the telecommunications signaling governance system can manage the full lifecycle of a communication session within an interconnect governance domain using a unified data structure, enabling precise control over signaling behavior and providing a verifiable record of all processing steps and governance decisions, thereby supporting both operational effectiveness and compliance requirements.

Referring to FIG. 19, there is illustrated one example of a signaling-only enforcement architecture 348 in which a telecommunications signaling governance system 350 operates as a signaling-layer intermediary between a first carrier network 352 and a second carrier network 354, while a media path 356 associated with a communication session bypasses the telecommunications signaling governance system 350.

In an exemplary embodiment, the telecommunications signaling governance system 350 can be deployed as an in-line or logically in-path signaling control element that receives, processes, and transmits signaling messages associated with establishment and control of a communication session. In such an embodiment, the telecommunications signaling governance system operates as a signaling enforcement node in which governance control is applied independently of routing selection, including embodiments in which routing decisions are performed by separate systems or incorporated as an additional function. The telecommunications signaling governance system 350 can include a signaling interface 358 configured to receive signaling from the first carrier network 352 and to transmit corresponding signaling toward the second carrier network 354 under governance control within an interconnect governance domain. This signaling termination and re-origination behavior can be implemented using a signaling control architecture that provides programmatic control over signaling flows between carrier networks.

The media path 356, which carries the actual communication payload such as voice or data streams, can be established directly between the first carrier network 352 and the second carrier network 354 without traversing the telecommunications signaling governance system 350. This separation between signaling and media paths addresses a technical limitation in prior approaches where enforcement systems may require in-line processing of both signaling and media, introducing latency, bandwidth constraints, or points of failure.

The telecommunications signaling governance system 350 can intercept signaling messages from the first carrier network 352 and can perform governance evaluation and enforcement associated with the interconnect governance domain prior to forwarding signaling to the second carrier network 354. Because the system operates at the signaling layer, it can influence whether a communication session is established, modified, or terminated without directly handling the media stream. This allows the system to control session behavior while minimizing impact on media performance.

In an exemplary embodiment, the signaling interface 358 can maintain session-level state information associated with signaling processing received from the first carrier network 352 and signaling messages transmitted to the second carrier network 354. The telecommunications signaling governance system 350 can create and manage session state information independent of routing selection functions, including session identifiers, routing information, and governance evaluation results, enabling consistent handling of signaling messages throughout the lifecycle of the communication session.

The signaling-only enforcement architecture 348 provides a technical solution to the challenge of implementing governance controls in high-throughput telecommunications environments without degrading media performance and without reliance on routing-based decision logic. By isolating governance processing to the signaling layer, the system can perform complex evaluation and enforcement operations while allowing the media path 356 to remain direct and optimized for throughput and latency.

In contrast to prior approaches that may rely on passive monitoring or post-session analysis, the telecommunications signaling governance system 350 can actively control signaling in real time in a deterministic manner. The system can apply deterministic governance enforcement actions before signaling messages reach the second carrier network 354, ensuring that non-compliant or unauthorized communication sessions are prevented from being established.

The separation of signaling and media paths without requiring media anchoring also enhances scalability. Because the telecommunications signaling governance system 350 does not process media streams, it can handle a larger volume of signaling transactions while maintaining deterministic governance enforcement without requiring proportional increases in bandwidth or processing capacity for media handling. This architecture enables deployment in large-scale carrier environments where signaling volume is high but media processing is distributed across network elements.

In some implementations, the telecommunications signaling governance system 350 can also inject additional signaling information or modify signaling headers to include governance-related data, such as reason codes or policy identifiers. These modifications can be performed without affecting the media path 356, further demonstrating the independence of signaling control from media transport.

From a systems perspective, the signaling-only enforcement architecture 348 illustrates how the telecommunications signaling governance system 350 can be integrated into existing carrier networks without requiring significant changes to media routing infrastructure. The first carrier network 352 and the second carrier network 354 can continue to exchange media directly, while the telecommunications signaling governance system 350 provides a centralized control point for signaling governance that transforms signaling inputs into governed outcomes.

The configuration shown in FIG. 19 therefore represents a concrete and practical implementation of signaling governance within interconnect governance domains that addresses both performance and control requirements. By separating signaling enforcement from media transport and by applying deterministic governance actions at the signaling layer, the present invention improves the efficiency and reliability of telecommunications networks while providing a technically grounded solution that extends beyond abstract decision-making.

Referring to FIG. 20, there is illustrated one example of a logically isolated interconnect governance domain architecture 360 in which a plurality of interconnect governance domains 362, 364, and 366 are maintained in a logically isolated manner such that compiled interconnect policy bundles 368, 370, and 372 associated with each domain are independently applied to communication sessions corresponding to distinct traffic exchange relationships.

In an exemplary embodiment, each interconnect governance domain 362, 364, 366 can correspond to a specific carrier-to-carrier relationship representing an interconnect boundary between carrier networks, such as a trunk pair, a trunk group, a routing domain, or a peering relationship. Each domain can be represented by a distinct interconnect context identifier 374, 376, 378 used to select a compiled interconnect policy bundle for evaluation that uniquely identifies the traffic exchange relationship within the telecommunications signaling governance system. These identifiers can be used to associate communication sessions with the appropriate interconnect governance domain during runtime processing.

The compiled interconnect policy bundles 368, 370, and 372 can be stored in a policy store in a manner that preserves logical isolation between domains. Logical isolation can be achieved by partitioning policy data structures, using separate namespaces, or applying access controls that prevent policies associated with one interconnect governance domain from being applied to another. This ensures that governance conditions defined for a particular carrier relationship are not inadvertently applied to unrelated communication sessions.

Unlike prior approaches that may rely on global policy sets or shared rule bases that are not scoped to interconnect governance domains, the present invention can maintain domain-specific compiled interconnect policy bundles 368, 370, 372 that reflect the unique contractual, regulatory, and operational requirements associated with each interconnect governance domain. For example, a first interconnect governance domain 362 may require strict authorization checks and mitigation compliance for originating traffic, while a second interconnect governance domain 364 may emphasize destination-based routing restrictions, and a third interconnect governance domain 366 may include specialized tariff or jurisdictional rules.

In an exemplary embodiment, the telecommunications signaling governance system can determine the appropriate interconnect governance domain 362, 364, or 366 for a communication session based on signaling attributes, carrier assignment data, and routing information. Once the interconnect context identifier 374, 376, or 378 is resolved, the system can retrieve the corresponding compiled interconnect policy bundle 368, 370, or 372 and apply it to the session within the selected interconnect governance domain without considering policies from other domains.

The logical isolation of interconnect governance domains 360 addresses a technical problem in telecommunications systems where policy interactions across different carrier relationships can lead to unintended consequences. In prior approaches, shared policy frameworks may cause rules intended for one interconnect relationship to affect traffic in another, leading to inconsistent enforcement, policy conflicts, unintended cross-domain governance enforcement, or unintended blocking or allowance of communication sessions. By isolating domains and their associated compiled interconnect policy bundles, the present invention ensures that governance decisions are made within the correct contextual scope.

The isolation architecture can also support independent lifecycle management of compiled interconnect policy bundles 368, 370, and 372. Each policy bundle can be updated, versioned, or replaced without affecting other domains. This allows operators to modify governance conditions for a specific carrier relationship without introducing risk to unrelated traffic. Version control mechanisms can ensure that changes are applied in a controlled manner and that historical versions of policy bundles can be retained for audit purposes.

From a technical implementation perspective, logical isolation can be enforced through data structure design and runtime access controls. For example, the policy store can organize compiled interconnect policy bundles 368, 370, and 372 into separate partitions keyed by interconnect context identifiers 374, 376, and 378. The governance evaluation engine can be configured to access only the partition corresponding to the resolved interconnect context identifier, preventing cross-domain access. Memory segmentation, access tokens, or namespace scoping can further reinforce this isolation.

The architecture shown in FIG. 20 also enhances scalability. As the number of interconnect governance domains increases, additional compiled interconnect policy bundles can be added without increasing the complexity of policy evaluation for individual communication sessions. Each session is evaluated only against the policy bundle associated with its domain, ensuring deterministic evaluation within each interconnect governance domain and allowing the system to scale linearly with the number of domains.

In addition, logical isolation supports improved auditability and traceability. Because each governance decision within interconnect governance domains is associated with a specific interconnect governance domain and its corresponding compiled interconnect policy bundle, it is possible to trace decisions back to the exact set of rules that were applied. This can be valuable for compliance verification, dispute resolution, and operational analysis.

From a systems perspective, the logically isolated interconnect governance domain architecture 360 provides a structured framework for organizing and applying governance logic in a multi-carrier environment. The interconnect governance domains 362, 364, and 366 serve as distinct contexts, the interconnect context identifiers 374, 376, and 378 provide a mapping mechanism, and the compiled interconnect policy bundles 368, 370, and 372 provide executable governance logic.

The configuration shown in FIG. 20 therefore demonstrates a concrete technical solution for managing complex, domain-specific governance requirements in telecommunications signaling systems. By ensuring that policies are applied within the correct interconnect governance domain and by preventing cross-domain interference, the telecommunications signaling governance system can improve accuracy, consistency, and scalability of signaling governance while providing a practical and non-abstract implementation that enhances network operation.

Figure 21:
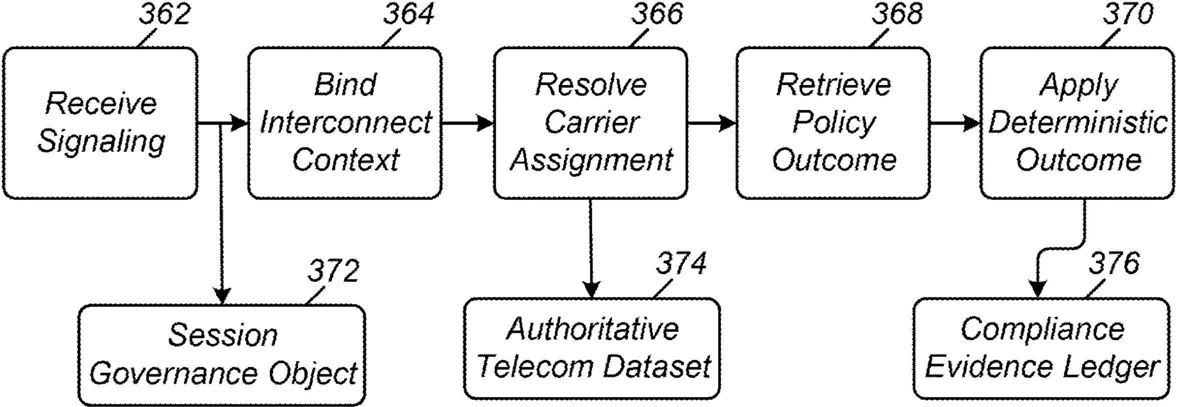
FIG. 21 illustrates one example of a simplified end-to-end runtime governance process in which a signaling message is received, an interconnect context is determined, carrier assignment is resolved, a policy bundle is retrieved, and a deterministic governance enforcement action is applied, with reference to a session governance object, authoritative telecommunications datasets, and a compliance evidence ledger.

Referring to FIG. 21, there is illustrated one example of an end-to-end runtime signaling governance pipeline 380 in which a signaling message 382 traverses a sequence of coordinated processing stages including signaling ingestion 384, context extraction 386, interconnect context resolution 388, authoritative dataset enrichment 390, policy bundle retrieval 392, governance evaluation 394, deterministic enforcement 396, and compliance recording 398 within a telecommunications signaling governance system.

In an exemplary embodiment, the signaling ingestion stage 384 can be performed by a signaling interface that receives the signaling message 382 associated with establishment of a communication session between carrier networks. The signaling message 382 can be parsed to extract protocol-specific fields and to prepare the message for downstream processing. The context extraction stage 386 can generate a normalized call context that includes a calling party identifier and a called party identifier, along with one or more signaling attributes such as ingress interface identifiers, routing metadata, or peer identifiers.

The interconnect context resolution stage 388 can determine an interconnect context identifier corresponding to an interconnect governance domain representing an interconnect boundary between carrier networks associated with the communication session. This determination can be based on interconnect attributes, including attributes based on network-level context rather than message content, derived during context extraction 386 and can involve mapping the attributes to a specific carrier-to-carrier relationship, such as a trunk pair or routing domain. The interconnect context identifier can be used to guide subsequent processing stages, ensuring that domain-specific governance logic is applied.

The authoritative dataset enrichment stage 390 can augment the call context with additional attributes derived from authoritative telecommunications datasets. These attributes can include carrier assignment information, jurisdiction classifications, mitigation statuses, and identity validation results. The enrichment process can involve querying multiple datasets, normalizing results, and resolving conflicts to produce a consistent set of attributes that are incorporated into a session governance object.

The policy bundle retrieval stage 392 can use the interconnect context identifier to determine a policy bundle identifier and retrieve a compiled interconnect policy bundle associated with the interconnect governance domain. The compiled interconnect policy bundle can be obtained from a high-performance policy store and can represent executable governance conditions that have been precompiled for efficient runtime evaluation. This stage ensures that the appropriate set of rules is available for evaluating the communication session.

The governance evaluation stage 394 can apply the compiled interconnect policy bundle associated with the interconnect governance domain to the enriched session data to determine whether the communication session satisfies the defined governance conditions. This stage can involve dual-context qualification, rule execution, and aggregation of evaluation outcomes. The result of this stage can include structured evaluation outputs and reason codes that describe the outcome of the evaluation.

The deterministic enforcement stage 396 can translate the evaluation results into a deterministic signaling-layer governance enforcement action that is applied prior to or in lieu of downstream signaling propagation to a receiving carrier network. This stage can involve generating a signaling response that allows, rejects, throttles, or otherwise controls the communication session. The enforcement action can be applied in a deterministic manner, ensuring consistent behavior across similar signaling events.

The compliance recording stage 398 can generate a governance event record that captures the key elements of the processing pipeline, including the interconnect context identifier, the policy bundle identifier, evaluation results, enforcement actions, and timestamps. This record can be written to a compliance evidence ledger, enabling traceability and auditability of governance decisions.

The end-to-end runtime pipeline 380 addresses a technical problem in coordinating multiple processing stages within a signaling governance system while maintaining low latency and high determinism. Prior approaches may implement these stages in a fragmented or loosely coupled manner, leading to inconsistent behavior, increased latency, or difficulty in tracing how decisions are made. By organizing the processing stages into a structured pipeline, the present invention ensures that each stage operates on well-defined inputs and produces well-defined outputs that feed into subsequent stages.

The pipeline architecture also enables optimization and parallelization of processing steps. For example, dataset enrichment 390 can be performed using parallel queries to multiple authoritative datasets, while policy bundle retrieval 392 can leverage caching mechanisms to reduce latency. These optimizations can allow the system to process signaling messages within the timing constraints required for communication session establishment within signaling protocol timing constraints.

From a systems perspective, the end-to-end runtime pipeline 380 represents a concrete implementation in which signaling data is progressively transformed within an interconnect governance domain, enriched, evaluated, and acted upon to control communication sessions. Each stage in the pipeline corresponds to a specific technical operation performed by one or more components of the telecommunications signaling governance system, and the overall pipeline demonstrates how these operations are integrated to produce a deterministic and actionable outcome within interconnect governance domains.

The configuration shown in FIG. 21 therefore illustrates a comprehensive and technically grounded signaling governance workflow that improves the functioning of telecommunications networks. By providing a structured, low-latency pipeline executed in a deterministic sequence that integrates context extraction, data enrichment, policy evaluation, enforcement, and compliance recording, the present invention delivers a practical solution that addresses real-world challenges in managing inter-carrier signaling traffic while reinforcing the non-abstract, machine-implemented nature of the system.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A telecommunications signaling governance system configured for deployment between carrier networks, comprising:

a signaling interface configured to receive a signaling message associated with establishment of a communication session between a first carrier network and a second carrier network;

one or more processors; and a non-transitory memory storing instructions that, when executed by the one or more processors, cause the telecommunications signaling governance system to:

extract from the signaling message a call context comprising a calling party identifier, a called party identifier and one or more additional signaling or governance-related attributes associated with the communication session;

determine one or more interconnect attributes associated with the signaling message, wherein the interconnect attributes include attributes independent of signaling message content;

resolve, based at least in part on the one or more interconnect attributes, an interconnect context identifier corresponding to an interconnect governance domain associated with a traffic exchange relationship between the first carrier network and the second carrier network;

determine, using one or more authoritative telecommunications datasets, a carrier assignment associated with at least one of the calling party identifier or the called party identifier;

retrieve, from a policy store, a compiled interconnect policy bundle associated with the interconnect governance domain;

evaluate the call context against the compiled interconnect policy bundle to determine whether the communication session satisfies one or more governance conditions defined for the interconnect governance domain; and apply, prior to determining a signaling disposition relative to downstream signaling propagation to the second carrier network, a deterministic governance enforcement action governing establishment or continuation of the communication session.

2. The telecommunications signaling governance system of claim 1, wherein the one or more interconnect attributes comprise network-layer attributes, including attributes independent of signaling message content, and include at least one of an ingress signaling interface identifier, an egress signaling interface identifier, an ingress network address, an egress network address, a signaling peer identifier, a route identifier, routing metadata, transport-layer addressing information, or interconnect relationship identifiers.

3. The telecommunications signaling governance system of claim 1, wherein the interconnect governance domain corresponds to at least one of a trunk pair, a trunk group, a carrier pair relationship, a routing domain, a logical signaling relationship, or a peering relationship between the first carrier network and the second carrier network, and represents an interconnect boundary between the first carrier network and the second carrier network.

4. The telecommunications signaling governance system of claim 1, wherein the one or more authoritative telecommunications datasets comprise at least one of a numbering assignment record, a local number portability data source, including a database or an external query-based lookup service, a local routing number service, an operating company number registry, a robocall mitigation database, one or more data sources usable to determine jurisdiction of the communication session, an identity validation source, a compliance database, or an interconnect authorization data source.

5. The telecommunications signaling governance system of claim 1, wherein the deterministic governance enforcement action comprises at least one of allowing the communication session, rejecting the communication session, throttling signaling associated with the communication session by controlling signaling flow rate, timing, or session initiation rate, segregating signaling associated with the communication session for specialized handling, redirecting signaling associated with the communication session, or modifying one or more signaling attributes associated with the communication session.

6. The telecommunications signaling governance system of claim 1, wherein the instructions further cause the telecommunications signaling governance system to record, in a compliance evidence ledger, a policy bundle identifier associated with the interconnect context identifier, wherein the compiled interconnect policy bundle comprises a machine-executable representation of governance conditions, a policy bundle identifier associated with the interconnect context identifier, an evaluation result representing one or more governance condition outcomes, and the deterministic governance enforcement action.

7. The telecommunications signaling governance system of claim 1, wherein evaluating the call context comprises performing a dual-context qualification including an origin context and a destination context derived from signaling attributes and authoritative telecommunications datasets, wherein both the origin context and the destination context are required to satisfy the compiled interconnect policy bundle.

8. A method of using the system of claim 1, the method comprising the steps of:

receiving, by the telecommunications signaling governance system, the signaling message associated with establishment of the communication session between the first carrier network and the second carrier network;

extracting, by the telecommunications signaling governance system, a call context from the signaling message comprising a calling party identifier, a called party identifier, and one or more additional signaling or governance-related attributes;

determining, by the telecommunications signaling governance system, one or more interconnect attributes associated with the signaling message, wherein the interconnect attributes include attributes independent of signaling message content;

resolving, by the telecommunications signaling governance system and based at least in part on the one or more interconnect attributes, the interconnect context identifier corresponding to the interconnect governance domain associated with the traffic exchange relationship between the first carrier network and the second carrier network;

determining, by the telecommunications signaling governance system using one or more authoritative telecommunications datasets, a carrier assignment associated with at least one of the calling party identifier or the called party identifier;

retrieving, by the telecommunications signaling governance system and based on the interconnect context identifier, the compiled interconnect policy bundle associated with the interconnect governance domain;

evaluating, by the telecommunications signaling governance system, the call context against the compiled interconnect policy bundle to determine whether the communication session satisfies one or more governance conditions defined for the interconnect governance domain; and applying, by the telecommunications signaling governance system and prior to determining a signaling disposition relative to downstream signaling propagation to the second carrier network, the deterministic governance enforcement action governing establishment or continuation of the communication session.

9. A telecommunications signaling governance system configured for deployment between carrier networks, comprising:

a signaling interface configured to receive a signaling message associated with establishment of a communication session between a first carrier network and a second carrier network;

one or more processors; and a non-transitory memory storing instructions that, when executed by the one or more processors, cause the telecommunications signaling governance system to:

extract from the signaling message a call context comprising a calling party identifier, a called party identifier and one or more additional signaling or governance-related attributes associated with the communication session;

identify an interconnect governance domain associated with a traffic exchange relationship between the first carrier network and the second carrier network;

retrieve, from a policy store, a compiled interconnect policy bundle associated with the interconnect governance domain;

determine, using one or more authoritative telecommunications datasets, an origin context associated with the calling party identifier and a destination context associated with the called party identifier;

perform a dual-context qualification by evaluating the origin context and the destination context against the compiled interconnect policy bundle; and apply, prior to determining a signaling disposition relative to downstream signaling propagation to the second carrier network, a deterministic governance enforcement action based on the dual-context qualification.

10. The telecommunications signaling governance system of claim 9, wherein the origin context comprises one or more attributes derived from the calling party identifier using one or more authoritative telecommunications datasets, including at least one of a normalized calling party identifier, an originating carrier identity, an operating company number ownership value, a regulatory compliance status, a robocall mitigation participation status, or a trunk authorization status.

11. The telecommunications signaling governance system of claim 9, wherein the destination context comprises one or more attributes derived from the called party identifier using one or more authoritative telecommunications datasets, including at least one of a normalized called party identifier, a destination carrier identity, a jurisdiction classification determined from one or more data sources, a routing eligibility value, or a tariff eligibility value.

12. The telecommunications signaling governance system of claim 9, wherein the dual-context qualification requires that both the origin context and the destination context satisfy the compiled interconnect policy bundle associated with the interconnect governance domain before the telecommunications signaling governance system allows the communication session to proceed in a deterministic manner.

13. The telecommunications signaling governance system of claim 9, wherein the compiled interconnect policy bundle comprises a machine-executable representation of governance conditions associated with the interconnect governance domain, including at least one of a carrier authorization rule, a destination eligibility rule, a tariff eligibility rule, a jurisdiction restriction, or an interconnect-specific authorization rule.

14. The telecommunications signaling governance system of claim 9, wherein the interconnect governance domain is logically isolated from another interconnect governance domain such that governance conditions associated with the interconnect governance domain are applied only to communication sessions corresponding to the traffic exchange relationship represented by the interconnect governance domain.

15. The telecommunications signaling governance system of claim 9, wherein the deterministic governance enforcement action associated with the interconnect governance domain comprises generation of a signaling-layer response comprising at least one rejection response, an allow continuation response, a governance alert, an alternate handling action, or modification of one or more signaling attributes associated with the communication session.

16. The telecommunications signaling governance system of claim 9, wherein the interconnect governance domain is identified based on one or more interconnect attributes derived from network-level context independent of signaling message content.

17. A telecommunications signaling governance system configured for deployment between carrier networks, comprising:

a signaling interface configured to receive a signaling message associated with establishment of a communication session between a first carrier network and a second carrier network;

a governance evaluation engine coupled to the signaling interface;

a policy store accessible by the governance evaluation engine and storing compiled interconnect policy bundles associated with respective interconnect governance domains;

one or more processors; and a non-transitory memory storing instructions that, when executed by the one or more processors, cause the telecommunications signaling governance system to:

instantiate a session governance object for the communication session in response to receipt of the signaling message;

populate the session governance object with the calling party identifier, the called party identifier, and one or more signaling attributes derived from the signaling message;

determine, using the governance evaluation engine, an interconnect context identifier and a corresponding interconnect governance domain for the communication session;

retrieve, from the policy store, a compiled interconnect policy bundle comprising a machine-executable representation of governance conditions associated with the corresponding interconnect governance domain;

evaluate the communication session using the session governance object and the compiled interconnect policy bundle; and apply, prior to determining a signaling disposition relative to downstream signaling propagation to the second carrier network, a deterministic governance enforcement action governing establishment or continuation of the communication session.

18. The telecommunications signaling governance system of claim 17, wherein the governance evaluation engine is implemented using a signaling control architecture that provides programmatic control over signaling flows, including one or more of a signaling proxy, a back-to-back user agent, a signaling gateway, or a cloud-hosted signaling enforcement service.

19. The telecommunications signaling governance system of claim 17, wherein the telecommunications signaling governance system is configured in a signaling-only enforcement mode in which signaling associated with the communication session is terminated and re-originated by the telecommunications signaling governance system while media associated with the communication session bypasses the telecommunications signaling governance system, such that governance control is applied at a signaling layer without processing the media path.

20. The telecommunications signaling governance system of claim 17, wherein the telecommunications signaling governance system processes signaling independently of whether media associated with the communication session is processed.

21. The telecommunications signaling governance system of claim 17, wherein the interconnect context identifier is determined based on one or more interconnect attributes derived from network-level context independent of signaling message content.

22. The telecommunications signaling governance system of claim 17, wherein the instructions further cause the telecommunications signaling governance system to record, in a compliance evidence ledger, a structured governance record comprising the interconnect context identifier corresponding to the interconnect governance domain, a policy bundle identifier of the compiled interconnect policy bundle comprising a machine-executable representation of governance conditions, one or more evaluation results representing governance condition outcomes, one or more enforcement reason codes, and one or more timestamps.

23. The telecommunications signaling governance system of claim 17, wherein the policy store comprises a distributed in-memory policy store configured to support configured to support retrieval of the compiled interconnect policy bundle within a time interval sufficient to permit evaluation of the communication session before determining whether and how the signaling message is propagated downstream.

24. The telecommunications signaling governance system of claim 17, wherein the policy store maintains logically isolated compiled interconnect policy bundles for a plurality of interconnect governance domains associated with different carrier traffic exchange relationships, such that governance conditions associated with each interconnect governance domain are applied only to applicable communication sessions corresponding to the respective traffic exchange relationship.

* * * * *